United States Patent
Kim et al.

(10) Patent No.: US 12,554,450 B2
(45) Date of Patent: Feb. 17, 2026

(54) DISPLAY APPARATUS AND METHOD OF OPERATING THE DISPLAY APPARATUS

(71) Applicant: SAMSUNG ELECTRONICS CO., LTD., Suwon-si (KR)

(72) Inventors: Donguk Kim, Suwon-si (KR); Yongwoo Shin, Suwon-si (KR); Sehyun Kim, Suwon-si (KR); Jongin Lee, Suwon-si (KR); Donghwa Jeong, Suwon-si (KR); Yeonwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/679,105

(22) Filed: May 30, 2024

(65) Prior Publication Data
US 2024/0402970 A1    Dec. 5, 2024

Related U.S. Application Data

(63) Continuation of application No. PCT/KR2024/006774, filed on May 20, 2024.

(30) Foreign Application Priority Data

May 30, 2023  (KR) .................. 10-2023-0069448

(51) Int. Cl.
*G06F 3/14*   (2006.01)
*H04B 7/15*   (2006.01)
*G06F 3/0482*   (2013.01)

(52) U.S. Cl.
CPC ................. *G06F 3/14* (2013.01); *H04B 7/15* (2013.01); *G06F 3/0482* (2013.01)

(58) Field of Classification Search
CPC ............ G06F 3/14; G06F 3/0482; H04B 7/15
See application file for complete search history.

(56) References Cited

U.S. PATENT DOCUMENTS

| 7,877,788 B1 * | 1/2011 | Topp ....................... G06F 21/44 |
| | | 726/17 |
| 8,447,910 B1 | 5/2013 | Yi et al. |

(Continued)

FOREIGN PATENT DOCUMENTS

| CN | 1725342 A | 1/2006 |
| CN | 115589428 A | 1/2023 |

(Continued)

OTHER PUBLICATIONS

Erich Styger, "DIY USB HID Joystick Device and Game Controller", Jun. 4, 2017, 13 pages, https://mcuoneclipse.com/2017/06/04/diy-usb-hid-joystick-device-and-game-controller/.

(Continued)

*Primary Examiner* — Jose R Soto Lopez
(74) *Attorney, Agent, or Firm* — Sughrue Mion, PLLC

(57) ABSTRACT

A display apparatus may include: a communication interface including a first communication interface and a second communication interface; at least one memory storing at least one instruction; and at least one processor configured to execute the at least one instruction to cause the display apparatus to: control the first communication interface to connect the display apparatus to a control device for providing a control signal; control the second communication interface to connect the display apparatus to a source device; control the first communication interface to receive the control signal from the control device; and control the display apparatus using the control signal or control the second communication interface to relay the control signal to the source device to allow a content application being (Continued)

executed in the source device to be controlled based on the control signal.

9 Claims, 35 Drawing Sheets

(56) References Cited

U.S. PATENT DOCUMENTS

| | | | |
|---|---|---|---|
| 10,135,892 B2 | 11/2018 | Zimring et al. | |
| 10,162,788 B2 | 12/2018 | Shetty et al. | |
| 10,521,879 B2* | 12/2019 | Yeh | A63F 13/537 |
| 10,630,773 B2* | 4/2020 | Holmes | G10L 15/22 |
| 10,773,156 B2 | 9/2020 | Colenbrander | |
| 2007/0174539 A1* | 7/2007 | Shitomi | G06F 3/0683 |
| | | | 711/100 |
| 2008/0183651 A1* | 7/2008 | Hunter | G06F 3/002 |
| | | | 706/47 |
| 2010/0317443 A1* | 12/2010 | Cook | A63F 13/323 |
| | | | 463/43 |
| 2012/0260168 A1* | 10/2012 | Friedlander | G06F 3/0485 |
| | | | 715/716 |
| 2014/0372661 A1 | 12/2014 | Chandra et al. | |
| 2014/0380451 A1* | 12/2014 | Kim | G06F 21/35 |
| | | | 726/9 |
| 2016/0055009 A1* | 2/2016 | Sakamoto | G06F 1/3287 |
| | | | 710/14 |
| 2016/0277652 A1* | 9/2016 | Mori | H04N 7/18 |
| 2018/0048753 A1 | 2/2018 | Chan et al. | |
| 2019/0321732 A1* | 10/2019 | Zimring | A63F 13/235 |
| 2019/0346977 A1* | 11/2019 | Chen | H04N 21/485 |
| 2020/0090624 A1* | 3/2020 | Miyasaka | H04N 21/436 |
| 2020/0346107 A1 | 11/2020 | Urbanus et al. | |
| 2020/0366852 A1* | 11/2020 | Ueno | H04N 23/632 |
| 2021/0200326 A1* | 7/2021 | Huang | A63F 13/22 |
| 2023/0100652 A1* | 3/2023 | Jang | A63F 13/5378 |
| | | | 463/31 |
| 2023/0336699 A1* | 10/2023 | Duan | H04N 9/64 |
| 2023/0385084 A1* | 11/2023 | Zhu | G06F 3/0482 |
| 2024/0004600 A1* | 1/2024 | Lee | H04N 21/4781 |
| 2024/0231743 A1* | 7/2024 | Sun | H04L 69/08 |
| 2024/0238670 A1 | 7/2024 | Choi et al. | |
| 2024/0267592 A1* | 8/2024 | Lee | H04N 21/443 |
| 2024/0377895 A1* | 11/2024 | Kim | G06F 3/04817 |
| 2024/0414391 A1* | 12/2024 | von Kugelgen | H04W 84/18 |

FOREIGN PATENT DOCUMENTS

| | | |
|---|---|---|
| KR | 10-2019-0039017 A | 4/2019 |
| KR | 10-2021-0090656 A | 7/2021 |
| KR | 10-2455508 B1 | 10/2022 |
| KR | 10-2023-0046800 A | 4/2023 |
| KR | 10-2582545 B1 | 9/2023 |

OTHER PUBLICATIONS

"Device Class Definition for Human Interface Devices (HID)", Universal Serial Bus (USB), Firmware Specification, Version 1.11, Jun. 27, 2001, 97 pages.

"HID Usage Tables", Universal Serial Bus (USB), Version 1.12, Oct. 28, 2004, 168 pages.

Communication dated Sep. 2, 2024, issued by the International Searching Authority in International Application No. PCT/KR2024/006774 (PCT/ISA/220, PCT/ISA/210, and PCT/ISA/237).

\* cited by examiner

DISPLAY APPARATUS AND METHOD OF OPERATING THE DISPLAY APPARATUS

CROSS-REFERENCE TO RELATED APPLICATIONS

This application is a continuation application of International Application No. PCT/KR2024/006774 designating the United States, filed on May 20, 2024, in the Korean Intellectual Property Receiving Office, which claims priority from Korean Patent Application No. 10-2023-0069448, filed on May 30, 2023, in the Korean Intellectual Property Office, the disclosures of which are hereby incorporated by reference herein in their entireties.

BACKGROUND

1. Technical Field

The disclosure relates to a display apparatus and a method of operating the same. Specifically, the disclosure relates to a display apparatus configured to connect a control device to a source device and a method of operating the display apparatus.

2. Description of Related Art

As the number of devices connectable to an image display apparatus such as a television, a personal computer, a monitor, etc. increases, and types of devices vary, usage scenarios may become complex and varying. For example, a set-top box or a game console may be connected to a television as a device for providing an image to the television. As another example, a remote controller or a game pad may be connected to the television as a device for controlling the television.

A display apparatus such as a television, a personal computer, a monitor, etc., and a source device or a control device connectable thereto, may be connected by using various communication technologies. For example, the display apparatus and the source device or the control device connectable thereto may be connected using a wired communication technology or a wireless communication technology. As another example, the display apparatus and the source device or the control device connectable thereto may be connected using a Bluetooth communication technology, a universal serial bus (USB) communication technology, a Wi-Fi communication technology, or the like.

SUMMARY

According to one or more embodiments of the disclosure, a display apparatus may include: a communication interface may include a first communication interface and a second communication interface; at least one memory storing at least one instruction; and at least one processor configured to execute the at least one instruction to cause the display apparatus to: control the first communication interface to connect, according to a wired or wireless communication technology, the display apparatus to a control device for providing a control signal; control the second communication interface to connect the display apparatus to a source device, according to a wired or wireless communication technology; control the first communication interface to receive the control signal from the control device; and control the display apparatus using the control signal or control the second communication interface to relay the control signal to the source device to allow a content application being executed in the source device to be controlled based on the control signal.

The at least one processor may be further configured to execute the at least one instruction to cause the display apparatus to: identify that the control device and the display apparatus are connected via a downstream universal serial bus (USB) port, and the source device and the display apparatus are connected via an upstream USB port; and based on the identifying, control the control signal which is received via the downstream USB port to be bypassed to the upstream USB port so as to be transmitted to the source device via the upstream USB port.

The at least one processor may be further configured to execute the at least one instruction to cause the display apparatus to: identify that the control device and the display apparatus are connected via a first Bluetooth communication module, and the source device and the display apparatus are connected via a second Bluetooth communication module; and based on the identifying, control the control signal, which is received via the first Bluetooth communication module, to be bypassed to the second Bluetooth communication module so as to be transmitted to the source device via the second Bluetooth communication module.

The at least one processor is further configured to execute the at least one instruction to cause the display apparatus to: identify that the control device and the display apparatus are connected via a Bluetooth communication module, and the source device and the display apparatus are connected via a downstream universal serial bus (USB) port by using virtual USB device software configured to perform an operation for allowing the display apparatus to be recognized as a human interface device (HID) with respect to the source device; based on the identifying, convert the control signal, which is received via the Bluetooth communication module, into a converted control signal with a format according to a USB communication protocol by using the virtual USB device software; and control the converted control signal to be transmitted to the source device via an upstream USB port.

The first communication interface and the second communication interface may be implemented as one hardware module or different hardware modules.

The at least one processor may be further configured to execute the at least one instruction to cause the display apparatus to: identify whether an input source providing content to the display apparatus is the source device; based on the input source being the source device, control the control signal to be relayed to the source device; and based on the input source being not the source device, control the display apparatus to use the control signal received via the first communication interface.

The at least one processor may be further configured to execute the at least one instruction to cause the display apparatus to: identify whether the control signal corresponds to a specified button of the control device; based on the control signal being identified to correspond to the specified button, control the control signal not to be relayed to the source device but to be used by the display apparatus; and based on the control signal being identified not to correspond to the specified button, control the control signal to be relayed to the source device.

The specified button may indicate to output a specified graphical user interface to a display, and the specified graphical user interface may include an on screen display (OSD) or a home screen.

The at least one processor may be further configured to execute the at least one instruction to cause the display apparatus to: identify whether the specified graphical user interface is displayed on the display; based on the specified graphical user interface being displayed on the display, control the control signal not to be relayed to the source device but to be used by the display apparatus; and based on the specified graphical user interface being not displayed, control the control signal to be relayed to the source device.

According to one or more embodiments of the disclosure, a method of operating a display apparatus may include a communication interface may include a first communication interface and a second communication interface, may include: controlling the first communication interface to connect, according to a wired or wireless communication technology, the display apparatus to a control device for providing a control signal; controlling the second communication interface to connect the display apparatus to a source device, according to a wired or wireless communication technology; controlling the first communication interface to receive the control signal from the control device; and controlling the display apparatus using the control signal or controlling the second communication interface to relay the control signal to the source device to allow a content application being executed in the source device to be controlled based on the control signal.

The method further may include: identifying that the control device and the display apparatus are connected via a downstream universal serial bus (USB) port, and the source device and the display apparatus are connected via an upstream USB port; and based on the identifying, controlling the control signal which is received via the downstream USB port to be bypassed to the upstream USB port so as to be transmitted to the source device via the upstream USB port.

The method further may include: identifying that the control device and the display apparatus are connected via a first Bluetooth communication module, and the source device and the display apparatus are connected via a second Bluetooth communication module; and based on the identifying, controlling the control signal which is received via the first Bluetooth communication module to be bypassed to the second Bluetooth communication module so as to be transmitted to the source device via the second Bluetooth communication module.

The method further may include: identifying that the control device and the display apparatus are connected via a Bluetooth communication module, and the source device and the display apparatus are connected via a downstream universal serial bus (USB) port by using virtual USB device software configured to perform an operation for allowing the display apparatus to be recognized as a human interface device (HID) with respect to the source device; based on the identifying, converting the control signal, which is received via the Bluetooth communication module, into a converted control signal with a format according to a USB communication protocol by using the virtual USB device software; and controlling the converted control signal to be transmitted to the source device via an upstream USB port.

The first communication interface and the second communication interface may be implemented as one hardware module or different hardware modules.

The method further may include: identifying whether an input source providing content to the display apparatus is the source device; based on the input source being the source device, controlling the control signal to be relayed to the source device; and based on the input source being not the source device, controlling the display apparatus to use the control signal received via the first communication interface.

The method further may include: identifying whether the control signal corresponds to a specified button of the control device; based on the control signal being identified to correspond to the specified button, control the control signal not to be relayed to the source device but to be used by the display apparatus; and based on the control signal being identified not to correspond to the specified button, controlling the control signal to be relayed to the source device.

The specified button may indicate to output a specified graphical user interface to a display, and the specified graphical user interface may include an on screen display (OSD) or a home screen.

The method further may include: identifying whether the specified graphical user interface is displayed on the display; based on the specified graphical user interface being displayed on the display, control the control signal not to be relayed to the source device but to be used by the display apparatus; and based on the specified graphical user interface being not displayed, controlling the control signal to be relayed to the source device.

According to one or more embodiments of the disclosure, a non-transitory computer-readable recording medium having recorded thereon at least one instruction executable by at least one processor of a display apparatus to cause the display apparatus may include a first communication interface and a second communication interface to: control the first communication interface to connect, according to a wired or wireless communication technology, the display apparatus to a control device for providing a control signal; control the second communication interface to connect the display apparatus to a source device, according to a wired or wireless communication technology; control the first communication interface to receive the control signal from the control device; and control the display apparatus using the control signal or control the second communication interface to relay the control signal to the source device to allow a content application being executed in the source device to be controlled based on the control signal.

The at least one processor is further configured to execute the at least one instruction to cause the display apparatus to: identify that the control device and the display apparatus are connected via a downstream universal serial bus (USB) port, and the source device and the display apparatus are connected via an upstream USB port; and based on the identifying, control the control signal which is received via the downstream USB port to be bypassed to the upstream USB port so as to be transmitted to the source device via the upstream USB port.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
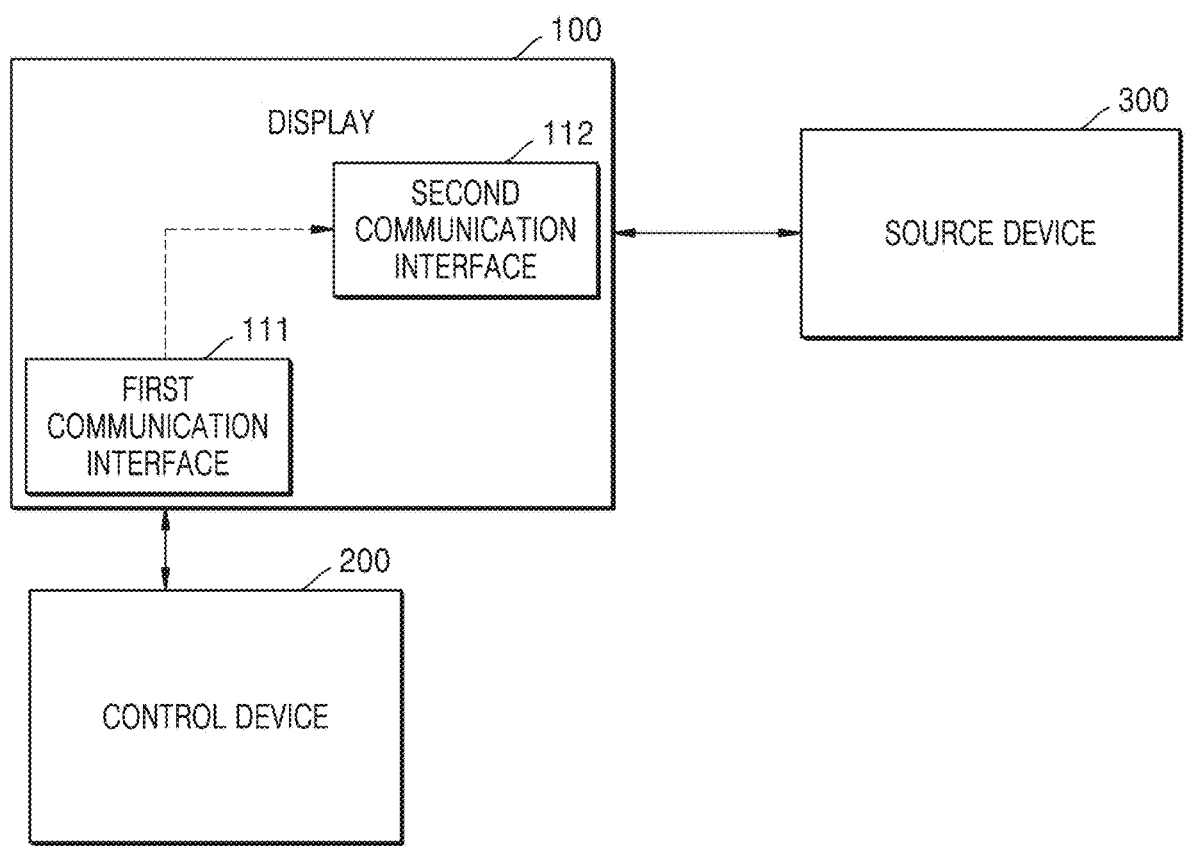
FIG. 1 is a reference diagram for describing operations of a display apparatus, a control device, and a source device, according to various embodiments of the disclosure.

The terms used in the disclosure will be briefly defined, and one or more embodiments of the disclosure will be described in detail.

All terms including descriptive or technical terms which are used in the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

Throughout the specification, when a part "includes" or "comprises" an element, unless there is a particular description contrary thereto, the part may further include other elements, not excluding the other elements. Elements described as "module," "unit," or "part" may be physically implemented by analog and/or digital circuits including one or more of a logic gate, an integrated circuit, a microprocessor, a microcontroller, a memory circuit, a passive electronic component, an active electronic component, and the like.

Hereinafter, the disclosure will now be described more fully with reference to the accompanying drawings for one of ordinary skill in the art to be able to perform embodiments of the disclosure without difficulty. The disclosure may, however, be embodied in many different forms and should not be construed as being limited to the embodiments of the disclosure set forth herein. In addition, in the drawings, parts irrelevant to the description are omitted for clarity, and like components are denoted by like reference numerals throughout the specification.

As used herein, the term "user" refers to a person, which controls functions or operations of a computing device or an electronic device by using a control device, and may include a viewer, a manager, or an installation engineer.

FIG. 1 is a reference diagram for describing operations of a display apparatus, a control device, and a source device, according to various embodiments of the disclosure.

Referring to FIG. 1, a display apparatus 100 may display a plurality of pieces of content received from various sources. For example, the display apparatus 100 may be provided content from the various sources, and may display the provided content on a display. The display apparatus 100 may include a television, a monitor, a personal computer, or the like. The display apparatus 100 may be connected to a source device 300 as one of various sources that provide content. The display apparatus 100 may be connected to a control device 200 that provides a control signal for controlling the display apparatus 100.

The source device 300 may indicate an electronic device that provides content to the display apparatus 100, according to a request from the display apparatus 100. The source device 300 may include the electronic device such as a personal computer, a game console, a set-top box, or the like. The source device 300 may execute a content application according to a request from the display apparatus 100, and may transmit a result screen image according to execution of the content application to the display apparatus 100 via a communication network. For example, when the source device 300 is a game console, the source device 300 may execute a game application, based on a game application execution request being received from the display apparatus 100, and may transmit a result screen image or a result image which is rendered according to execution of the game application, to the display apparatus 100 via a communication network. The display apparatus 100 may transmit an execution request of a content application to the source device 300, may receive, from the source device 300, a result screen image according to the content application being executed in response to the execution request, and may display the received result screen image on a display.

The control device 200 may indicate an electronic device that provides the display apparatus 100 with a control signal corresponding to a user input. For example, the control device 200 may include a remote controller, a game pad, a smartphone, or the like for controlling the display apparatus 100.

According to one or more embodiments of the disclosure, the display apparatus 100 may receive, from the control device 200, a control signal corresponding to a user input, and may process the received control signal according to a situation, an environment, or a condition of the display apparatus 100.

According to one or more embodiments of the disclosure, the display apparatus 100 may directly consume a control signal from the control device 200, according to a situation, an environment, or a condition of the display apparatus 100. That the display apparatus 100 directly consumes a control signal may indicate that the display apparatus 100 does not relay the control signal from the control device 200 to other external device, i.e., the source device 300 connected to the display apparatus 100, but directly performs an operation based on the control signal.

According to one or more embodiments of the disclosure, the display apparatus 100 may not directly consume a control signal from the control device 200, according to a situation, an environment, or a condition of the display apparatus 100 but may relay the control signal to the source device 300 connected to the display apparatus 100 so as to allow the source device 300 to perform an operation based on the control signal.

According to one or more embodiments of the disclosure, the display apparatus 100 may identify that an input source providing content to the display apparatus 100 is not a source device connected by using a wired/wireless communication technology, and according to the identifying, may consume a control signal from a control device.

According to one or more embodiments of the disclosure, the display apparatus 100 may identify a control signal corresponding to a specified button of a control device, and according to the identifying, may consume the control signal corresponding to the specified button without bypassing the control signal to a source device. The control signal corresponding to the specified button may include a control signal corresponding to calling of a predesignated user interface screen or a control signal corresponding to a function of a predesignated display apparatus. In other words, the specified button may indicate to output a specified graphical user interface to a display. The predesignated user interface screen may include an on screen display (OSD) screen of a display apparatus, a home screen of the display apparatus, or the like.

According to one or more embodiments of the disclosure, the display apparatus 100 may identify whether a predesignated user interface screen is displayed on a display, and according to the identifying, may consume a control signal from the control device without bypassing the control signal to the source device.

The display apparatus 100 may be connected to the source device 300 and the control device 200 by using a wired communication technology or a wireless communication technology. The display apparatus 100 may be connected to the control device 200 by using a first communication interface and may be connected to the source device 300 by using a second communication interface. The first communication interface or the second communication interface may include a wired communication module or a wireless communication module.

According to one or more embodiments of the disclosure, the first communication interface used in connection to the control device 200 and the second communication interface used in connection to the source device 300 may be configured as one communication module or may be configured as a plurality of communication modules.

According to one or more embodiments of the disclosure, the first communication interface used in connection to the control device 200 and the second communication interface used in connection to the source device 300 may be communication modules of the same type.

According to one or more embodiments of the disclosure, the display apparatus 100 may connect to the control device 200 by using a downstream universal serial bus (USB) communication module as the first communication interface, and may connect to the source device 300 by using an upstream USB communication module as the second communication interface. Here, the display apparatus 100 may relay a control signal, which is received from the control device 200 by using the downstream USB communication module, to the upstream USB communication module by using virtual USB device software, thereby relaying the control signal to the source device 300 by using the upstream USB communication module.

According to one or more embodiments of the disclosure, the display apparatus 100 may connect to the control device 200 by using a first frequency of a Wi-Fi communication module as the first communication interface, and may connect to the source device 300 by using a second frequency different from the first frequency of the Wi-Fi communication module as a second communication interface. Accordingly, the display apparatus 100 may bypass the control signal, which is received from the control device 200 by using the first frequency of the Wi-Fi communication module, to the source device 300 by using the second frequency of the Wi-Fi communication module.

According to one or more embodiments of the disclosure, the display apparatus 100 may connect to the control device 200 and the source device 300 by time-division operating one Bluetooth communication module in a master mode and a slave mode as the first communication interface and the second communication interface. Accordingly, the display apparatus 100 may bypass the control signal, which is received from the control device 200 by using the Bluetooth communication module operating in the master mode, to the source device 300 by using the Bluetooth communication module operating in the slave mode.

According to one or more embodiments of the disclosure, the display apparatus 100 may connect to the control device 200 by using a first Bluetooth communication module as the first communication interface, and may connect to the source device 300 by using a second Bluetooth communication module as the second communication interface, the second Bluetooth communication module being different from the first Bluetooth communication module. Accordingly, the display apparatus 100 may bypass the control signal, which is received from the control device 200 by using the first Bluetooth communication module, to the source device 300 by using the second Bluetooth communication module.

According to one or more embodiments of the disclosure, the display apparatus 100 may connect to the control device 200 by using the downstream USB communication module as the first communication interface, and may connect to the source device 300 by using the downstream USB communication module as the second communication interface. Here, the display apparatus 100 may bypass, to the downstream USB communication, the control signal received from the control device 200 by using the downstream USB communication module, thereby relaying the control signal to the source device 300 by using the upstream USB communication module. Here, the display apparatus 100 may use virtual USB device software for the source device 300 connected via the downstream USB communication module to recognize the display apparatus 100 as a human interface device (HID).

According to one or more embodiments of the disclosure, the first communication interface used in connection to the control device 200 and the second communication interface used in connection to the source device 300 may be communication modules of different types.

According to one or more embodiments of the disclosure, the display apparatus 100 may connect to the control device 200 by using a Bluetooth communication module as the first communication interface, and may connect to the source device 300 by using the downstream USB communication module as the second communication interface. According to one or more embodiments of the disclosure, the display apparatus 100 may bypass the control signal, which is received from the control device 200 by using the Bluetooth communication module, to the downstream USB communication module, thereby relaying the control signal to the source device 300. Here, the display apparatus 100 may use virtual USB device software for the source device 300 connected via the upstream USB communication module to recognize the display apparatus 100 as a HID.

According to one or more embodiments of the disclosure, the display apparatus 100 may generate virtual USB device software configured to perform an operation for allowing the display apparatus 100 to be recognized as a HID for a source device, may convert a control signal of a control device according to a Bluetooth communication protocol, which is received via a Bluetooth communication module, into a control signal with a format according to a USB communication protocol by using the virtual USB device software, and may relay the control signal with the converted format to the source device via an upstream USB module by transmitting the control signal with the converted format to the upstream USB module.

According to one or more embodiments of the disclosure, the display apparatus 100 may connect to the control device 200 by using a Bluetooth communication module as the first communication interface, and may connect to the source device 300 by using an upstream USB communication module as the second communication interface. Accordingly, the display apparatus 100 may bypass a control signal, which is received from the control device 200 by using the Bluetooth communication module, to the source device 300 by using the upstream USB communication module.

According to one or more embodiments of the disclosure, the display apparatus 100 may connect to the control device 200 by using a downstream USB communication module as the first communication interface, and may connect to the source device 300 by using a Bluetooth communication module as the second communication interface. Accordingly, the display apparatus 100 may bypass a control signal, which is received from the control device 200 by using the downstream USB communication module, to the source device 300 by using the Bluetooth communication module.

According to one or more embodiments of the disclosure, the display apparatus 100 may connect to the control device 200 by using a Bluetooth communication module as the first communication interface, and may connect to the source device 300 by using a Wi-Fi communication module as the second communication interface. Accordingly, the display apparatus 100 may bypass a control signal, which is received from the control device 200 by using the Bluetooth communication module, to the source device 300 by using the Wi-Fi communication module.

According to one or more embodiments of the disclosure, the display apparatus 100 may connect to the control device 200 by using a Wi-Fi communication module as the first communication interface, and may connect to the source device 300 by using a Bluetooth communication module as the second communication interface. Accordingly, the display apparatus 100 may bypass a control signal, which is received from the control device 200 by using the Wi-Fi communication module, to the source device 300 by using the Bluetooth communication module.

Figure 2:
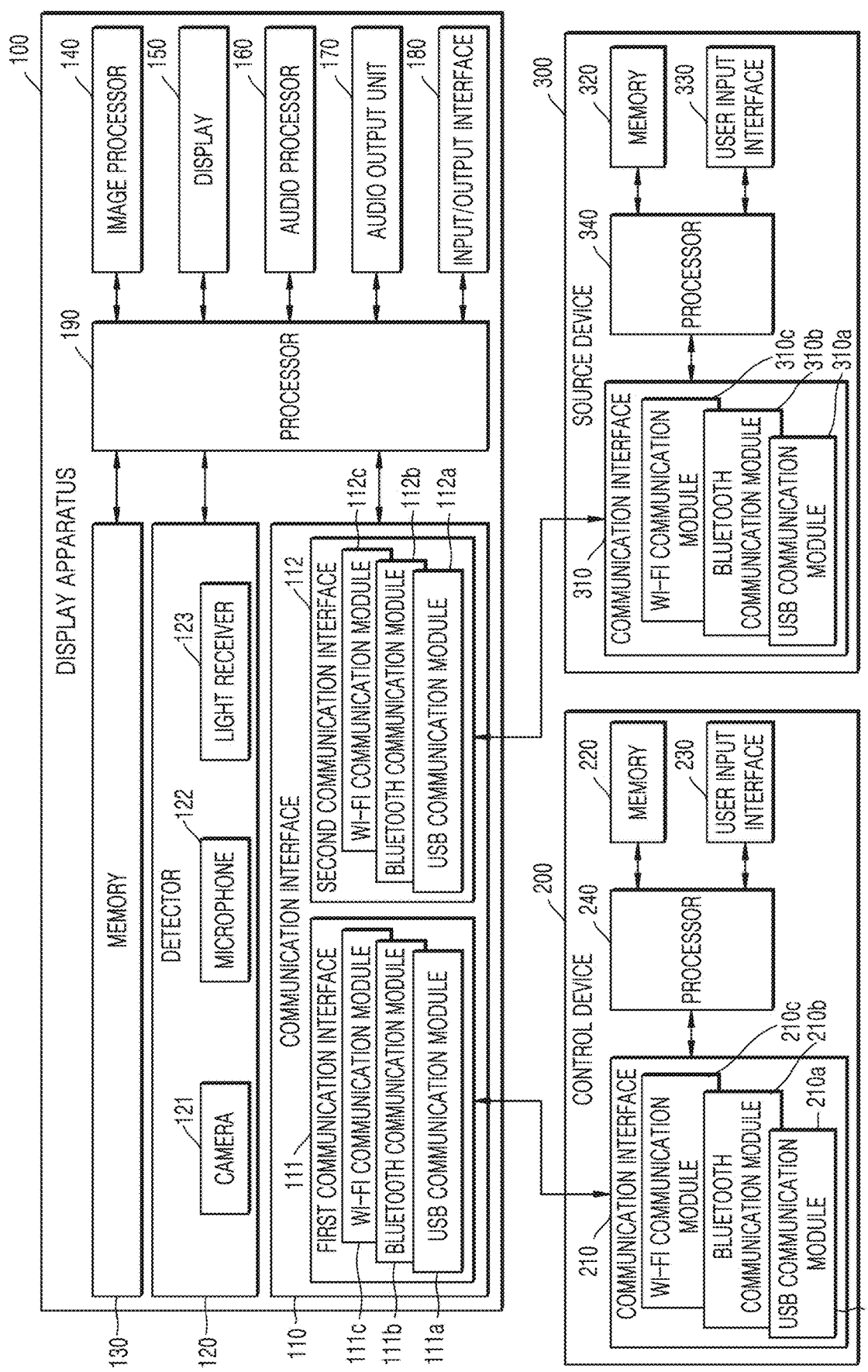
FIG. 2 illustrates an example of a display apparatus system according to one or more embodiments of the disclosure.

FIG. 2 illustrates an example of a display apparatus system according to one or more embodiments of the disclosure.

Referring to FIG. 2, the display apparatus system may include the display apparatus 100, the control device 200, and the source device 300 which are connected via a communication network.

The display apparatus 100 is a device configured to display an image or data according to a user request, and may include a communication interface 110, a detector 120, (at least one) memory 130, a display 150, an audio output unit 170, an input/output interface 180, an image processor 140, an audio processor 160, and a processor 190 (i.e. at least one processor).

The communication interface 110 may include one or modules configured to enable a wireless communication between the display apparatus 100 and a wireless communication system or a wireless communication between the display apparatus 100 and a network in which other device exists.

According to one or more embodiments of the disclosure, the communication interface 110 may include a first communication interface 111 configured to communicate with the control device 200 and a second communication interface 112 configured to communicate with the source device 300. The first communication interface 111 and the second communication interface 112 may be configured as one communication interface or may be implemented as two different communication interfaces.

According to one or more embodiments of the disclosure, the first communication interface 111 may include one or more of a USB communication module 111*a* configured to perform communication according to a USB communication protocol, a Bluetooth communication module 111*b* configured to perform a communication according to a Bluetooth communication protocol, and a Wi-Fi communication module 111*c* configured to perform a communication according to a Wi-Fi communication protocol.

According to one or more embodiments of the disclosure, the first communication interface 111 may perform a communication with the control device 200 by using at least one of a USB communication module, a Bluetooth communication module, or a Wi-Fi communication module, according to control by the processor 190.

According to one or more embodiments of the disclosure, the second communication interface 112 may include one or more of a USB communication module 112*a* configured to perform communication according to a USB communication protocol, a Bluetooth communication module 112*b* configured to perform a communication according to a Bluetooth communication protocol, and a Wi-Fi communication module 112*c* configured to perform a communication according to a Wi-Fi communication protocol.

According to one or more embodiments of the disclosure, the second communication interface 112 may perform a communication with the source device 300 by using at least one of a USB communication module, a Bluetooth communication module, or a Wi-Fi communication module, according to control by the processor 190.

While it is illustrated in FIG. 2 that a communication interface includes a Wi-Fi communication module, a Bluetooth communication module, and a USB communication module, the communication interface may selectively further include an additional communication module. For example, the communication interface may further include a mobile communication module configured to exchange a wireless signal with at least one of a base station on a mobile communication network, an external terminal, or a server, a wireless Internet module configured to wirelessly connect to Internet, or a short-range communication module. As a wireless internet technology, Wireless Local Area Network (WLAN including Wi-Fi), Wireless broadband (WiBro), World Interoperability for Microwave Access (WiMax), High Speed Downlink Packet Access (HSDPA), or the like may be used. The short-range communication module may include, as well as the Wi-Fi communication module, the Bluetooth communication module, and the USB communication module, a communication module configured to use a short-range communication technology including Bluetooth, Bluetooth Low Energy (BLE), Radio Frequency Identification (RFID), infrared Data Association (IrDA), Ultra Wideband (UWB), ZigBee, or the like.

The detector 120 is provided to detect a user's voice, a user image, or a user's interaction, and may include a camera 121, a microphone 122, and a light receiver 123.

The camera 121 may receive a video (e.g., consecutive frames) corresponding to a user's motion including a gesture within a camera-recognition range. The processor 190 may select a menu displayed on the display apparatus 100 by using a received motion recognition result or may perform a control corresponding to the motion recognition result.

The microphone 122 receives a user's uttered voice. The microphone 122 may convert the received user's voice into an electric signal and may output the electric signal to the processor 190. The user's voice may include a voice corresponding to a menu or a function of the display apparatus 100.

The light receiver 123 receives a light signal (including a control signal) received from an external control device. The light receiver 123 may receive a light signal corresponding to a user input (e.g., a touch, a pressure, a touch gesture, a voice, or a motion) from a control device. A control signal may be extracted from the received light signal, by control by the processor 190.

The memory 130 may store a program for processing and controlling by the processor 190, and may store data being input to the display apparatus 100 or output from the display apparatus 100. Also, the memory 130 may store a plurality of pieces of data requested for an operation of the display apparatus 100.

The memory 130 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc.

The image processor 140 may process an image signal and may output a processed image signal to the display 150, according to control by the processor 190.

The display 150 may output an image or data processed by the display apparatus 100.

The audio processor 160 may convert an audio signal into an analog audio signal and may output the analog audio signal to the audio output unit 170, according to control by the processor 190.

The audio output unit 170 may output input audio (e.g., a voice, sound, etc.). Also, the audio output unit 170 may output audio stored in the memory 130, according to control by the processor 190. The audio output unit 170 may include at least one of a speaker, a headphone output terminal, or a Sony/Philips Digital Interface (S/PDIF) output terminal, or a combination thereof.

The input/output interface 180 may receive a video (for example, a moving image or the like), audio (for example, a voice, music, or the like), auxiliary information (for example, an electronic program guide (EPG) or the like), and the like from outside the display apparatus 100, by control by the processor 190. The input/output interface 180 may include one of a High-Definition Multimedia Interface (HDMI) port, a component jack, a personal computer (PC) port, and a USB port or may include a combination of one or more thereof. The input/output interface 180 may further include a DisplayPort (DP), Thunderbolt, and a Mobile High-Definition Link (MHL), as well as the HDMI port.

The display apparatus 100 may further include a user input interface. The user input interface may indicate any interface means capable of receiving a user input. For example, the user input interface may include operation buttons provided at a portion of the display apparatus 100 so as to receive a user input, a touch-sensitive display configured to detect a touch input, a microphone capable of receiving a speech utterance of a user, or the like.

The processor 190 controls all operations of the display apparatus 100. For example, the processor 190 may execute one or more instructions stored in the memory 130 to perform a function of the display apparatus 100 disclosed in the disclosure. The processor 190 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In one or more embodiments of the disclosure, the processor 190 may store one or more instructions in an internal memory, and may execute one or more instructions stored in the internal memory to control operations of a display apparatus to be performed. That is, the processor 190 may execute at least one instruction or program stored in the internal memory of the processor 190 or the memory 130 to perform a specified operation.

The processor 190 performs a function of controlling all operations of the display apparatus 100 and signal flow between internal elements of the display apparatus 100 and processing data. When an input from the user is provided or a preset and stored condition is satisfied, the processor 190 may execute an operating system (OS) and various applications which are stored in the memory 130.

The processor 190 may include a graphics processing unit for graphic processing corresponding to a video. The graphics processing unit generates a screen including various objects such as an icon, an image, text, or the like by using a calculator and a renderer. The calculator calculates an attribute value of each object to be displayed such as a coordinate value, a shape, a size, and a color according to a layout of the screen by using user interaction detected by the detector 120. The renderer generates a screen of various layouts including an object, based on the attribute value calculated by the calculator.

According to one or more embodiments of the disclosure, the processor 190 may execute one or more instructions stored in the memory 130 to perform an operation of the display apparatus 100 disclosed in the disclosure.

According to one or more embodiments of the disclosure, the processor 190 may execute one or more instructions stored in the memory 130 to control the first communication interface 111 to connect the display apparatus 100 to a control device configured to provide a control signal, according to a wire or wireless communication technology.

According to one or more embodiments of the disclosure, the processor 190 may execute one or more instructions stored in the memory 130 to control the second communication interface 112 to connect a source device to the display apparatus 100 according to a wire or wireless communication technology.

According to one or more embodiments of the disclosure, the processor 190 may execute one or more instructions stored in the memory 130 to control the first communication interface to receive a control signal from the control device.

According to one or more embodiments of the disclosure, the processor 190 may execute one or more instructions stored in the memory 130 to control the second communication interface to relay the control signal to the source device so as to allow the control signal to be used in control of the display apparatus or to allow a content application to be controlled, the content application being executed in the source device based on the control signal.

According to one or more embodiments of the disclosure, the processor 190 may execute one or more instructions stored in the memory 130 to identify that the control device and the display apparatus are connected via a downstream USB port, and the source device and the display apparatus are connected via an upstream USB port.

According to one or more embodiments of the disclosure, the processor 190 may execute one or more instructions stored in the memory 130 to control, based on the identifying, a control signal of the control device which is received via the downstream USB port to be bypassed to the upstream USB port so as to be transmitted to the source device via the upstream USB port.

According to one or more embodiments of the disclosure, the processor 190 may execute one or more instructions stored in the memory 130 to identify that the control device and the display apparatus are connected via a first Bluetooth communication module, and the source device and the display apparatus are connected via a second Bluetooth communication module.

According to one or more embodiments of the disclosure, the processor 190 may execute one or more instructions stored in the memory 130 to control, based on the identifying, a control signal of the control device which is received via the first Bluetooth communication module to be bypassed to the second Bluetooth communication module so as to be transmitted to the source device via the second Bluetooth communication module.

According to one or more embodiments of the disclosure, the processor 190 may execute one or more instructions stored in the memory 130 to identify that the control device and the display apparatus are connected via a Bluetooth communication module, and the source device and the display apparatus are connected via a downstream USB port by using virtual USB device software configured to perform an operation for allowing the display apparatus to be recognized as an HID with respect to the source device.

According to one or more embodiments of the disclosure, the processor 190 may execute one or more instructions stored in the memory 130 to convert a control signal of the control device according to a Bluetooth communication protocol, which is received via the Bluetooth communication module, into a control signal with a format according to a USB communication protocol by using the virtual USB device software.

According to one or more embodiments of the disclosure, the processor 190 may execute one or more instructions stored in the memory 130 to control the control signal with the converted format to be transmitted to the downstream USB port so as to be transmitted to the source device via the downstream USB port.

According to one or more embodiments of the disclosure, the processor 190 may execute one or more instructions stored in the memory 130 to identify whether an input source providing content to the display apparatus is the source device.

According to one or more embodiments of the disclosure, the processor 190 may execute one or more instructions stored in the memory 130 to relay the control signal to the source device when it is identified that the input source is the source device.

According to one or more embodiments of the disclosure, the processor 190 may execute one or more instructions stored in the memory 130 to control the display apparatus to consume the control signal received via the first communication interface, when it is identified that the input source is not the source device.

According to one or more embodiments of the disclosure, the processor 190 may execute one or more instructions stored in the memory 130 to identify whether a control signal of the control device corresponds to a specified button of the control device.

According to one or more embodiments of the disclosure, the processor 190 may execute one or more instructions stored in the memory 130 to control the control signal not to be relayed to the source device but to be consumed by the display apparatus, when it is identified that the control signal corresponds to the specified button.

According to one or more embodiments of the disclosure, the processor 190 may execute one or more instructions stored in the memory 130 to control the control signal to be relayed to the source device, when it is identified that the control signal does not correspond to the specified button.

According to one or more embodiments of the disclosure, the processor 190 may execute one or more instructions stored in the memory 130 to identify whether the specified graphical user interface is displayed on the display.

According to one or more embodiments of the disclosure, the processor 190 may execute one or more instructions stored in the memory 130 to control the control signal not to be relayed to the source device but to be consumed by the display apparatus, when it is identified that the specified graphical user interface is displayed.

According to one or more embodiments of the disclosure, the processor 190 may execute one or more instructions stored in the memory 130 to control the control signal to be relayed to the source device, when it is identified that the specified graphical user interface is not displayed.

The display apparatus 100 may be any apparatus including a processor and a memory to perform a function. The display apparatus 100 may be a stationary-type apparatus or a mobile-type apparatus. For example, the display apparatus 100 may refer to an apparatus with a display to display image content, video content, game content, graphic content, or the like. The display apparatus 100 may output or display an image or content received from the source device 300. The display apparatus 100 may include various types of electronic apparatuses including a television (TV) such as a network TV, a smart TV, an Internet TV, a web TV, or an IPTV, a computer such as a desktop computer, a laptop computer, or a tablet computer, various smart devices such as a smartphone, a cellular phone, a game player, a music player, a video player, medical equipment, home appliances, or the like, which can receive and output content. The display apparatus 100 may be referred to as a display apparatus in that the display apparatus 100 receives and displays content, and may also be referred to as a content receiving apparatus, a sink apparatus, an electronic apparatus, a computing apparatus, or the like.

A block diagram of the display apparatus 100 shown in FIG. 2 is a block diagram for one or more embodiments of the disclosure. Each of the elements in the block diagram may be integrated, added, or omitted according to the specification of the display apparatus 100 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Hereinafter, the control device 200 will now be described.

The control device 200 may include a communication interface 210, a memory 220, a user input interface 230, and a processor 240. However, the control device 200 may be embodied with more elements than the shown elements, and the disclosure is not limited thereto.

The communication interface 210 may include one or more modules for allowing wireless communication between the control device 200 and a wireless communication system or between the controller (control device 200) and a network in which other device exists.

The communication interface 210 according to one or more embodiments of the disclosure may perform a communication with the display apparatus 100, according to a short-range communication technology. The short-range communication technology may include a Bluetooth communication, a Wi-Fi communication, a USB communication, or the like.

According to one or more embodiments of the disclosure, the communication interface 210 may include one or more of a USB communication module 210*a* configured to perform communication according to a USB communication protocol, a Bluetooth communication module 210*b* configured to perform a communication according to a Bluetooth communication protocol, and a Wi-Fi communication module 210*c* configured to perform a communication according to a Wi-Fi communication protocol.

The memory 220 may store a program for processing and controlling by the processor 240, and may store data being input to the control device 200 or output from the control device 200.

The memory 220 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc.

The user input interface 230 may indicate any interface means capable of receiving a user input. For example, the user input interface 230 may include operation buttons provided at a portion of the control device 200 so as to receive a user input, a touch-sensitive display configured to detect a touch input, a microphone capable of receiving a speech utterance of a user, or the like.

The processor 240 controls all operations of the control device 200. For example, the processor 240 may execute one or more instructions stored in the memory 220 to perform a function of the control device 200 disclosed in the disclosure.

In one or more embodiments of the disclosure, the processor 240 may store one or more instructions in an internal memory, and may execute one or more instructions stored in the internal memory to control operations of a display apparatus to be performed. That is, the processor 240 may execute at least one instruction or program stored in the internal memory of the processor 240 or the memory 220 to perform a specified operation.

According to one or more embodiments of the disclosure, the processor 240 may execute one or more instructions stored in the memory 220 to perform communication connection to the display apparatus 100 by using a short-range wireless communication technology. The short-range wireless communication technology may include a Bluetooth communication technology or a Wi-Fi direct technology.

According to one or more embodiments of the disclosure, the processor 240 may execute one or more instructions stored in the memory 220 to control the communication interface 210 to transmit a control signal according to an appropriate communication protocol, the control signal corresponding to a user input received via the user input interface 230.

The control device 200 may indicate any device including a processor and a memory so as to perform a function. The control device 200 may include various electronic apparatuses such as a remote controller, a game controller, a smartphone, or the like.

A block diagram of the control device 200 shown in FIG. 2 is a block diagram for one or more embodiments of the disclosure. Each of the elements in the block diagram may be integrated, added, or omitted according to the specification of the control device 200 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Hereinafter, the source device 300 will now be described.

The source device 300 may include a communication interface 310, a memory 320, an input/output interface 330, and a processor 340. However, the source device 300 may be embodied with more elements than the shown elements, and the disclosure is not limited thereto. For example, the source device 300 may further include a separate image processor to perform image processing on an image of an application executed by the source device 300.

The communication interface 310 may include one or more modules for allowing wireless communication between the source device 300 and a wireless communication system or between the source device 300 and a network in which other device exists.

According to one or more embodiments of the disclosure, the communication interface 310 may perform a communication with the display apparatus 100, according to a short-range communication technology. The short-range communication technology may include a Bluetooth communication, a Wi-Fi communication, a USB communication, or the like.

According to one or more embodiments of the disclosure, the communication interface 310 may receive a control signal of the control device 200 from the display apparatus 100.

According to one or more embodiments of the disclosure, the communication interface 310 may provide the display apparatus 100 with a result screen image according to execution of an application by the source device 300.

According to one or more embodiments of the disclosure, the communication interface 310 may include one or more of a USB communication module 310a configured to perform communication according to a USB communication protocol, a Bluetooth communication module 310b configured to perform a communication according to a Bluetooth communication protocol, and a Wi-Fi communication module 310c configured to perform a communication according to a Wi-Fi communication protocol.

The memory 320 may store a program for processing and controlling by the processor 340, and may store data being input to the source device 300 or output from the source device 300.

The memory 320 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc.

The input/output interface 330 may output a video (for example, a moving image or the like), audio (for example, a voice, music, or the like), auxiliary information, and the like to the outside of the source device 300, by control by the processor 340. The input/output interface 330 may include one of a HDMI port, a component jack, a PC port, and a USB port or may include a combination of one or more thereof. The input/output interface 330 may further include a DP, Thunderbolt, and a MHL, as well as the HDMI port. For example, when the source device 300 is implemented as a game console, the source device 300 may provide a result screen image of game content executed in the source device 300 to the display apparatus 100 via an HDMI or the like.

The source device 300 may further include a user input interface. The user input interface may indicate any interface means capable of receiving a user input. For example, the user input interface may include operation buttons provided at a portion of the source device 300 so as to receive a user input, a touch-sensitive display configured to detect a touch input, a microphone capable of receiving a speech utterance of a user, or the like.

The processor 340 controls all operations of the source device 300. For example, the processor 340 may execute one or more instructions stored in the memory 320 to perform a function of the source device 300 disclosed in the disclosure.

In one or more embodiments of the disclosure, the processor 340 may store one or more instructions in an internal memory, and may execute one or more instructions stored in the internal memory to control operations of a display apparatus to be performed. That is, the processor 340 may execute at least one instruction or program stored in the internal memory of the processor 340 or the memory 320 to perform a specified operation.

According to one or more embodiments of the disclosure, the processor 340 may execute one or more instructions stored in the memory 320 to receive a request for execution of a content application from the display apparatus 100, and to transmit result content obtained by executing the execution-requested content application to the display apparatus 100.

According to one or more embodiments of the disclosure, the processor 340 may execute one or more instructions stored in the memory 320 to control the communication interface to transmit execution result content to the display apparatus, the execution result content being obtained by executing a content application.

A block diagram of the source device 300 shown in FIG. 2 is a block diagram for one or more embodiments of the disclosure. Each of the elements in the block diagram may be integrated, added, or omitted according to the specification of the source device 300 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Figure 3:
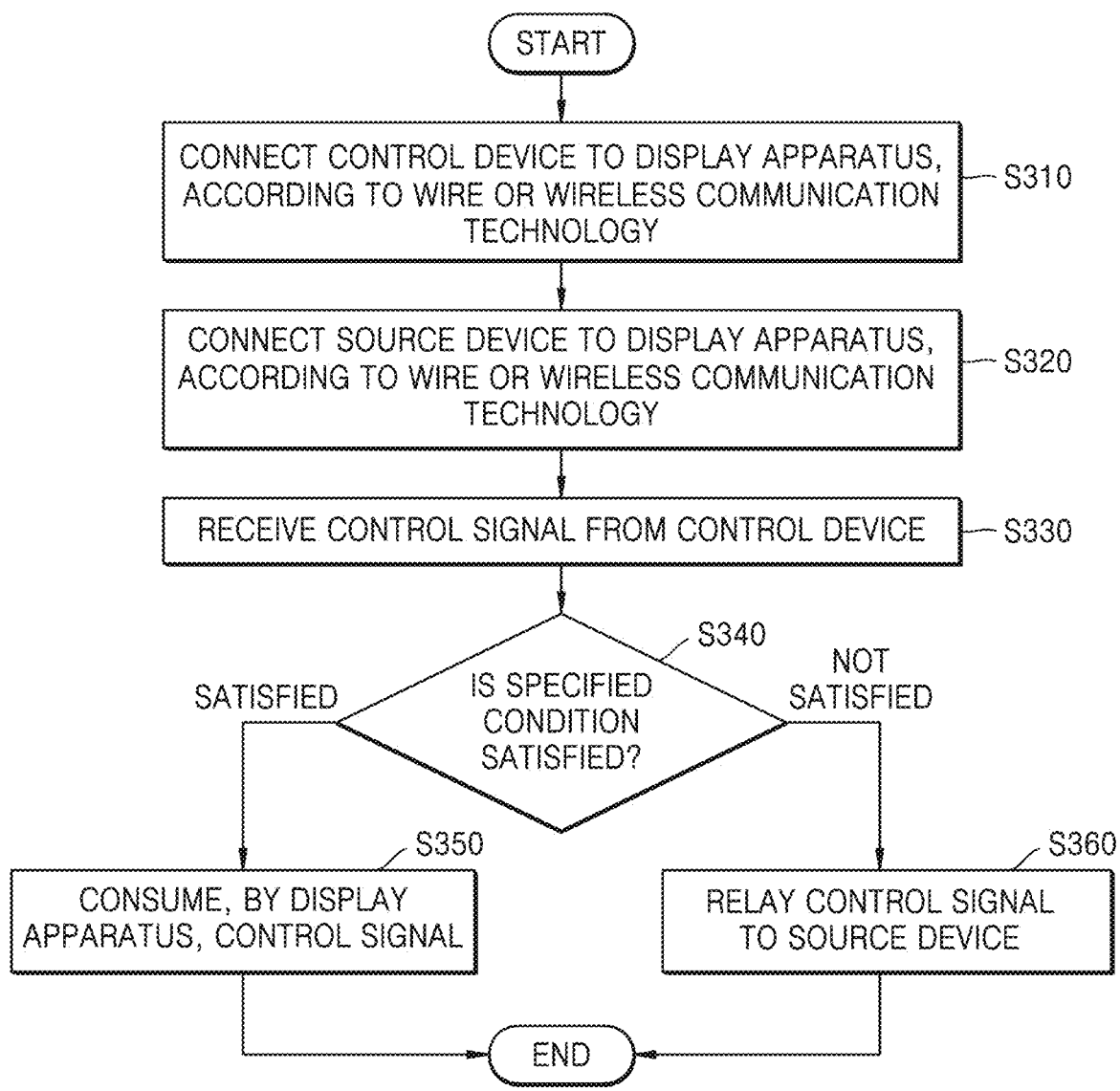
FIG. 3 illustrates an example of a flowchart of a method of operating a display apparatus, according to one or more embodiments of the disclosure.

FIG. 3 illustrates an example of a flowchart of a method of operating a display apparatus according to one or more embodiments of the disclosure.

Referring to FIG. 3, in operation S310, the display apparatus 100 may connect the display apparatus 100 to the control device 200 configured to provide a control signal, according to a wire or wireless communication technology.

According to one or more embodiments of the disclosure, the display apparatus 100 may communication-connect to the control device 200 according to a wire or wireless communication technology by using the first communication interface 111 of the communication interface 110.

According to one or more embodiments of the disclosure, the display apparatus 100 may connect to the control device 200 by using one of a USB communication module, a Bluetooth communication module, and a Wi-Fi communication module.

In operation S320, the display apparatus 100 may connect the source device 300 to the display apparatus 100, according to a wire or wireless communication technology.

According to one or more embodiments of the disclosure, the display apparatus 100 may communication-connect to the source device 300 according to a wire or wireless communication technology by using the second communication interface 112 of the communication interface 110.

According to one or more embodiments of the disclosure, the display apparatus 100 may connect to the source device 300 by using one of a USB communication module, a Bluetooth communication module, and a Wi-Fi communication module.

The first communication interface 111 and the second communication interface 112 may be configured as one communication module or may be configured as separate communication modules being different from each other.

According to one or more embodiments of the disclosure, a first communication interface used in connection to the control device 200 and a second communication interface used in connection to the source device 300 may be communication modules of a same type.

According to one or more embodiments of the disclosure, the display apparatus 100 may connect to the control device 200 by using a downstream USB communication module as the first communication interface, and may connect to the source device 300 by using an upstream USB communication module as the second communication interface.

According to one or more embodiments of the disclosure, the display apparatus 100 may connect to the control device 200 by using a first frequency of a Wi-Fi communication module as the first communication interface, and may connect to the source device 300 by using a second frequency different from the first frequency of the Wi-Fi communication module as a second communication interface.

According to one or more embodiments of the disclosure, the display apparatus 100 may connect to the control device 200 and the source device 300 by time-division operating one Bluetooth communication module in a master mode and a slave mode as the first communication interface and the second communication interface.

According to one or more embodiments of the disclosure, the display apparatus 100 may connect to the control device 200 by using a first Bluetooth communication module as the first communication interface, and may connect to the source device 300 by using a second Bluetooth communication module as the second communication interface, the second Bluetooth communication module being different from the first Bluetooth communication module.

According to one or more embodiments of the disclosure, the display apparatus 100 may connect to the control device 200 by using the downstream USB communication module as the first communication interface, and may connect to the source device 300 by using the downstream USB communication module as the second communication interface.

According to one or more embodiments of the disclosure, the first communication interface used in connection to the control device 200 and the second communication interface used in connection to the source device 300 may be communication modules of different types.

According to one or more embodiments of the disclosure, the display apparatus 100 may connect to the control device 200 by using a Bluetooth communication module as the first communication interface, and may connect to the source device 300 by using the downstream USB communication module as the second communication interface.

According to one or more embodiments of the disclosure, the display apparatus 100 may connect to the control device 200 by using a Bluetooth communication module as the first communication interface, and may connect to the source device 300 by using an upstream USB communication module as the second communication interface.

According to one or more embodiments of the disclosure, the display apparatus 100 may connect to the control device 200 by using a downstream USB communication module as the first communication interface, and may connect to the source device 300 by using a Bluetooth communication module as the second communication interface.

According to one or more embodiments of the disclosure, the display apparatus 100 may connect to the control device 200 by using a Bluetooth communication module as the first communication interface, and may connect to the source device 300 by using a Wi-Fi communication module as the second communication interface.

According to one or more embodiments of the disclosure, the display apparatus 100 may connect to the control device 200 by using a Wi-Fi communication module as the first communication interface, and may connect to the source device 300 by using a Bluetooth communication module as the second communication interface.

In operation S330, the display apparatus 100 may receive a control signal from the control device 200.

According to one or more embodiments of the disclosure, the display apparatus 100 may receive the control signal from the control device 200 via the first communication interface 111 communication-connected to the control device 200. The control signal from the control device 200 may be a signal corresponding to a user input received via a user input interface provided at the control device 200. For example, when the control device 200 is a game pad, the control signal may include a signal corresponding to pressure of a button provided at the game pad, a signal corresponding to a position of a joystick, or the like. For example, when the game pad is a remote controller, the control signal may include a signal corresponding to one of various buttons provided at the remote controller.

In operation S340, the display apparatus 100 may determine whether a specified condition is satisfied.

According to one or more embodiments of the disclosure, the display apparatus 100 may determine whether the specified condition is satisfied, based on the control signal received from the control device 200 or information about settings or an environment of the display apparatus 100.

According to one or more embodiments of the disclosure, the display apparatus 100 may determine whether the specified condition is satisfied, by identifying whether the received control signal corresponds to a specified control signal of the control device 200. That is, the display apparatus 100 may store values of control signals corresponding to one or more specified buttons of the control device 200. Then, the display apparatus 100 may determine that the specified condition is satisfied when a value of the received control signal corresponds to a stored value, and may determine that the specified condition is not satisfied when a value of the received control signal does not corresponds to the stored value. Alternatively, the display apparatus 100 may store a value of a control signal corresponding to a specified input operation with respect to at least one specified button of the control device 200. For example, a value of a control signal corresponding to a long-press input operation of pressing a specified button for a preset time without taking away a finger or a double-click input operation of pressing the specified button two-sequential times may be stored. Then, the display apparatus 100 may determine that the specified condition is satisfied when a value of the received control signal corresponds to the stored value, and may determine that the specified condition is not satisfied when a value of the received control signal does not corresponds to the stored value.

According to one or more embodiments of the disclosure, the control signal corresponding to the specified button may be a signal corresponding to a button for calling a user interface screen or a button for executing a specified function of the display apparatus. The user interface screen may include an OSD screen or a home screen of the display apparatus. The OSD screen may include a screen for changing settings of the display apparatus 100, a screen for changing settings of application content displayed on a display of the display apparatus 100, or the like.

According to one or more embodiments of the disclosure, the display apparatus 100 may determine that the specified condition is satisfied, by identifying whether a specified user interface screen is being output to the display. The specified user interface screen may include an OSD screen or a home screen of the display apparatus. For example, the display apparatus 100 may identify whether the OSD screen or the home screen of the display apparatus is being output to the display, and when it is identified that the OSD screen or the home screen of the display apparatus is being output to the display, the display apparatus 100 may determine that the specified condition is satisfied.

According to an embodiment of the disclosure, the display apparatus 100 may determine whether the specified condition is satisfied, based on a source providing content being output to the display. When the source providing content is not a source device connected to the display apparatus 100, the display apparatus 100 may determine that the specified condition is satisfied.

As a result of the determination in operation S340, when it is determined that the specified condition is satisfied, the method may proceed to operation S350, and when it is determined that the specified condition is not satisfied, the method may proceed to operation S360.

In operation S350, the display apparatus 100 may consume the control signal received from the control device 200.

According to one or more embodiments of the disclosure, as a result of the determination in operation S340, when it is determined that the specified condition is satisfied, the display apparatus 100 may directly consume the control signal received from the control device 200, without bypassing the control signal to the source device 300. That the display apparatus 100 directly consumes the control signal may indicate that the display apparatus 100 directly performs a function or an operation corresponding to the control signal, based on the received control signal.

In operation S360, the display apparatus 100 may relay the control signal received from the control device 200 to the source device 300.

According to one or more embodiments of the disclosure, as a result of the determination in operation S340, when it is determined that the specified condition is not satisfied, the display apparatus 100 may perform an operation of relaying the control signal received from the control device 200 to the source device 300. That is, the display apparatus 100 does not directly perform a function or an operation corresponding to the control signal but relays the control signal of the control device 200 to the source device 300, thereby allowing the source device 300 to execute an application, based on the control signal.

Figure 4:
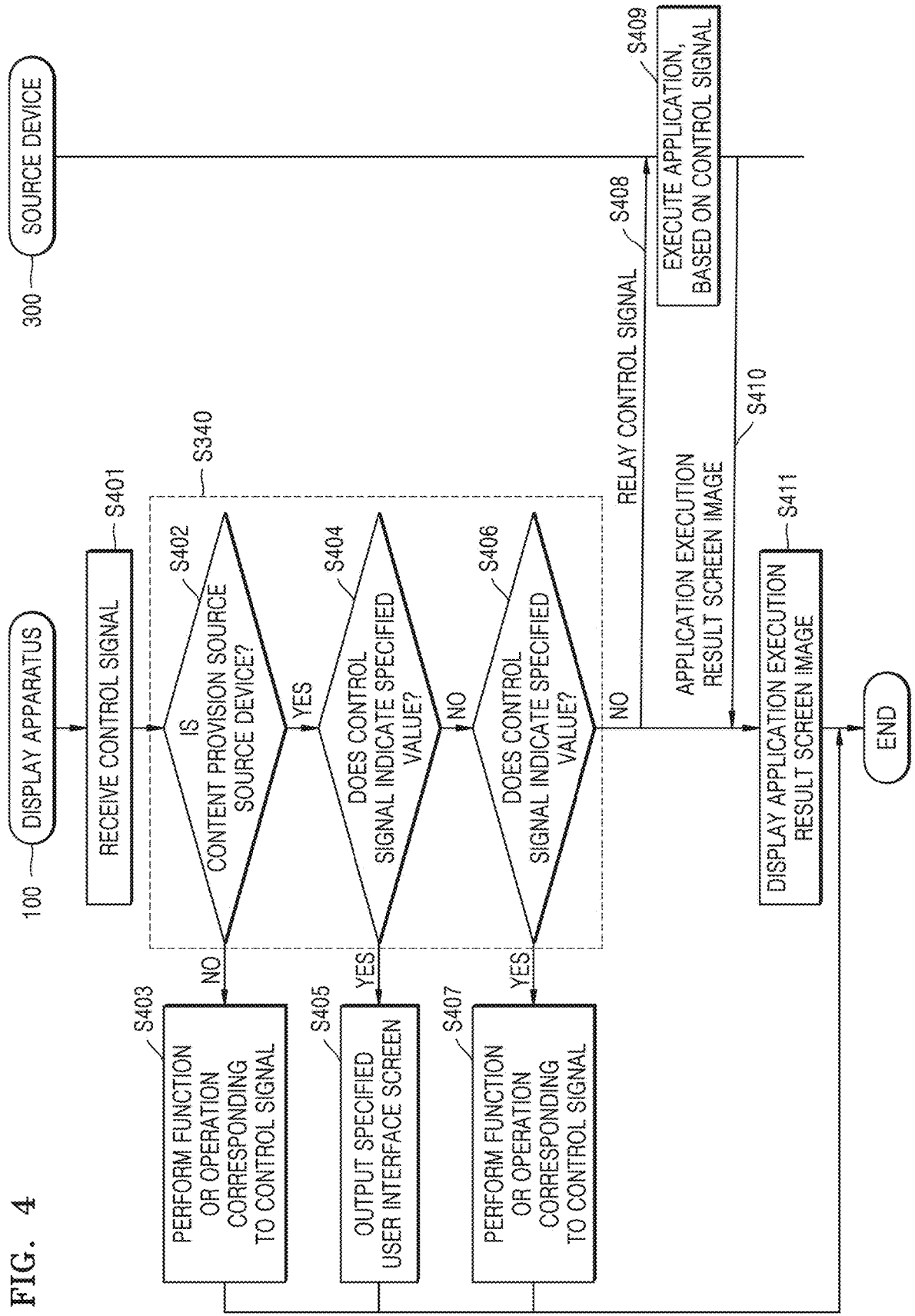
FIG. 4 illustrates a flowchart of an example of a method of operating a display apparatus, according to one or more embodiments of the disclosure.

FIG. 4 illustrates a flowchart of an example of a method of operating a display apparatus according to one or more embodiments of the disclosure.

Operations shown in FIG. 4 indicate a particular example of a method by which a display apparatus operates according to determining whether a specified condition is satisfied, in an operation shown in FIG. 3.

Referring to FIG. 4, in operation S401, the display apparatus 100 may receive a control signal from the control device 200. The display apparatus 100 interprets the received control signal, and thus, determines whether a specified condition is satisfied, and the determination operation may include, for example, operation S402, operation S404, and operation S406 which are shown in FIG. 4. Operations S402, S404, and S406 may correspond to operation S340 of FIG. 3.

In operation S402, the display apparatus 100 may determine whether a content provision source providing content displayed on the display of the display apparatus 100 is a source device connected to the display apparatus 100 according to a second communication interface. The content provision source providing content to the display apparatus 100 may include a source device connected via an input/output interface, a content provision server connected using an Internet protocol, a set-top box, a terrestrial broadcasting station server connected via a tuner, or the like. The display apparatus 100 may determine whether a source currently providing content to the display apparatus 100 from among one or more content provision sources is a source device connected according to the second communication interface or a source device connected via the input/output interface. This is because, when the content provision source is the source device connected according to the second communication interface, a control signal is transmitted to the source device so as to allow the source device to consume the control signal, and when the content provision source is not the source device, the display apparatus directly consumes the control signal. For example, a control signal of a control device which is received while the display apparatus 100 receives and displays broadcasting content according to a terrestrial broadcasting station or an Internet protocol is appropriate for a direct use by the display apparatus 100, and thus, it is necessary to determine what the content provision source is.

As a result of the determination in operation S402, when it is determined that the content provision source is not the source device, the method may proceed to operation S403.

In operation S403, the display apparatus 100 may perform a function or an operation which corresponds to the control signal. That is, the display apparatus 100 may not relay the control signal to the source device 300 but may independently consume the control signal. For example, the display apparatus 100 may perform various functions or operations including a change in a channel, a change in a volume, a change in the content provision source, or the like, according to the control signal.

As a result of the determination in operation S402, when it is determined that the content provision source is the source device 300, the method may proceed to operation S404.

In operation S404, the display apparatus 100 may determine whether the control signal indicates a specified value. The display apparatus 100 may pre-store a control signal list indicating specified values from among control signals provided by the control device 200, and may determine whether a value of the control signal received from the control device 200 corresponds to a specified value included in the control signal list. For example, the display apparatus 100 may store a value corresponding to a home button of the control device 200 in the control signal list, and may determine whether the value of the control signal received from the control device 200 is a value corresponding to the home button.

As a result of the determination in operation S404, when it is determined that the control signal indicates the specified value, the method may proceed to operation S405.

In operation S405, as the control signal indicates the specified value, the display apparatus 100 may output a specified user interface screen. The specified user interface screen may include an OSD screen or a home screen of the display apparatus 100.

As a result of the determination in operation S404, when it is determined that the control signal does not indicate the specified value, the method may proceed to operation S405.

In operation S406, as the control signal does not indicate the specified value, the display apparatus 100 may determine whether a specified user interface screen is being output to the display of the display apparatus 100. This is because the control signal of the control device 200 received while the specified user interface screen is output is appropriate for control of a menu or an item on the user interface screen displayed on the display.

As a result of the determination in operation S406, when it is determined that the specified user interface screen is being output, the method may proceed to operation S407.

In operation S407, the display apparatus 100 may perform a function or an operation which corresponds to the control signal of the control device 200. For example, when a control signal of a control device indicates one of four-direction keys, the display apparatus 100 may perform an operation of moving a cursor or a focus on items of a user interface screen, according to a direction key corresponding thereto. For example, when the control signal of the control device indicates selection of a specified item, the display apparatus 100 may perform an operation of executing a function corresponding to the selected item.

As a result of the determination in operation S406, when it is determined that the specified user interface screen is not being output, the method may proceed to operation S408.

In operation S408, the display apparatus 100 may relay the control signal of the control device 200 to the source device 300. Communication protocols of the first communication interface 111 used by the display apparatus 100 to connect to the control device 200 so as to receive a control signal and the second communication interface 112 used by the display apparatus 100 to connect to the source device 300 may be various and different from each other. Therefore, the display apparatus 100 may changelessly relay a control signal received from the first communication interface 111 via the second communication interface 112 or may perform format conversion or a particular operation to relay the control signal via the second communication interface 112. These will be described in detail below.

In operation S409, the source device 300 may execute an application, based on the control signal received from the display apparatus 100. For example, when the source device 300 is a game console, the source device 300 may execute a game application, based on the control signal.

In operation S410, the source device 300 may transmit, to the display apparatus 100, an application execution result screen image obtained by executing the application, based on the control signal.

In operation S411, the display apparatus 100 may display, on the display, the application execution result screen image received from the source device 300.

Figure 5A:
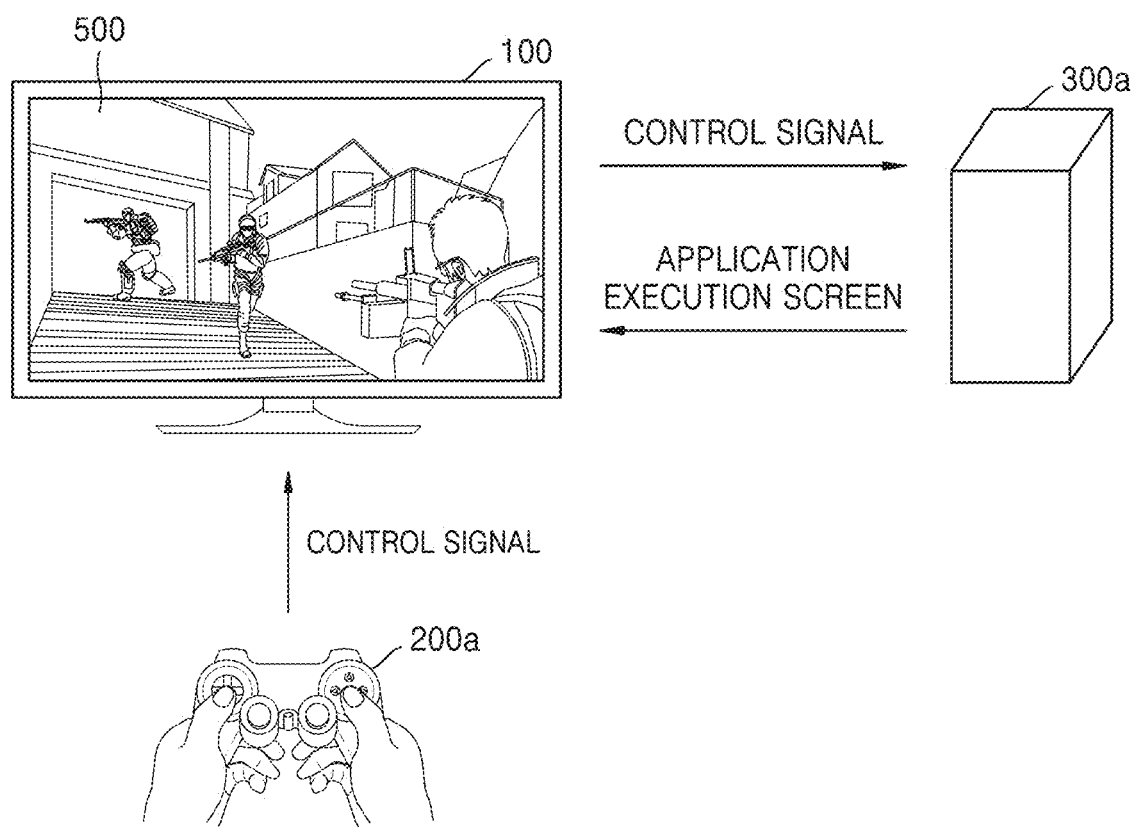
FIG. 5A is a reference diagram for describing an operation of a display apparatus to connect to a control device and a source device.
Figure 5B:
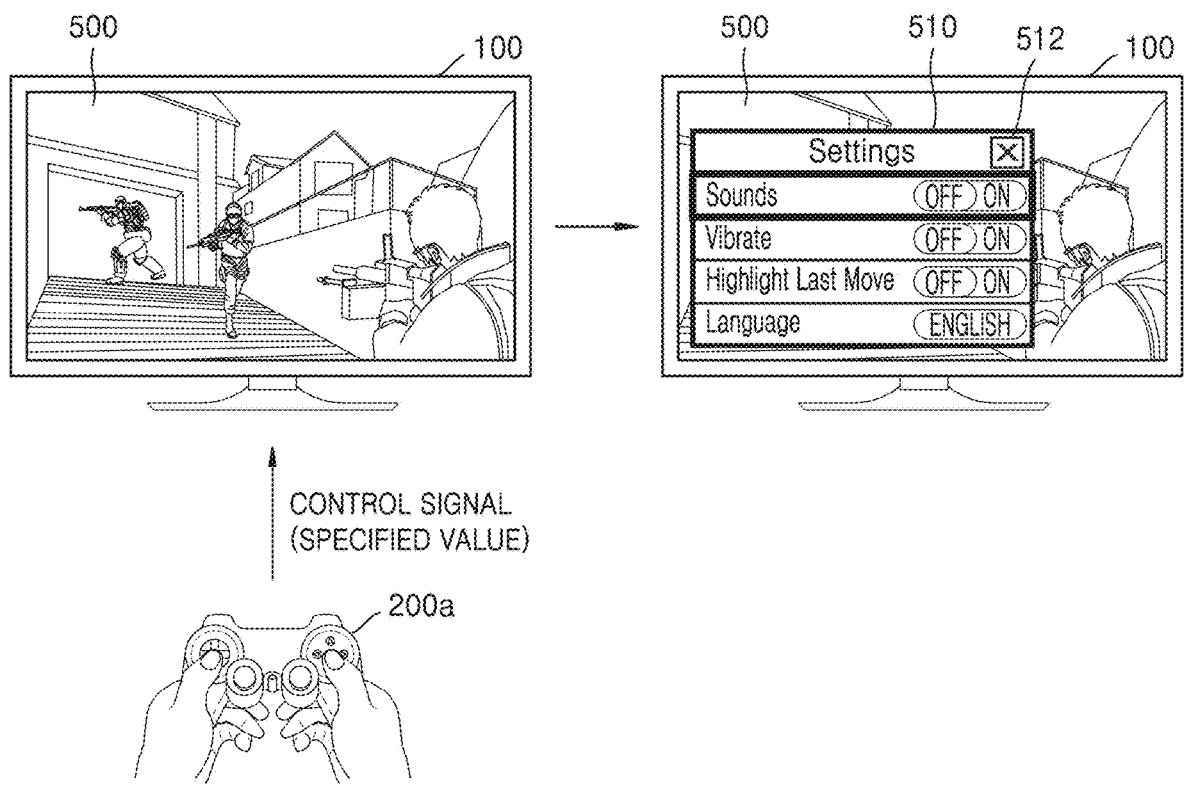
FIG. 5B is a reference diagram for describing a method by which a display apparatus receives a control signal from a control device and operates.

With reference to FIGS. 5A to 5B, an example of a method by which a display apparatus identifies a specified condition and processes a control signal, according to one or more embodiments of the disclosure, will now be described.

FIG. 5A is a reference diagram for describing an operation of the display apparatus to connect to a control device and a source device.

Referring to FIG. 5A, the display apparatus 100 may communication-connect to a game pad 200a that is an example of the control device 200 via a first communication interface, and may communication-connect to a game console 300a that is an example of the source device 300 via a second communication interface.

When the display apparatus 100 receives a control signal from the game pad 200a, the display apparatus 100 may determine whether a specified condition is satisfied, and as a result of the determination, when the display apparatus 100 determines that the specified condition is not satisfied, the display apparatus 100 may transmit the control signal to the game console 300a.

The game console 300a may execute a game application by using the control signal received from the display apparatus 100, and may transmit a game application execution result screen image 500 to the display apparatus 100. When receiving the game application execution result screen image 500 from the game console 300a, the display apparatus 100 may display the received game application execution result screen image 500 on a display.

FIG. 5B is a reference diagram for describing a method by which a display apparatus receives a control signal from a control device and operates.

Referring to FIG. 5B, the display apparatus 100 may determine whether a control signal received from the game pad 200a indicates a specified value, and when the display apparatus 100 determines that the control signal indicates the specified value, e.g., a value corresponding to a pressure of home-button, the display apparatus 100 may output an OSD screen 510 as an example of a specified user interface screen. The OSD screen 510 may be a menu screen on which settings of the display apparatus 100 can be performed in association with game application content output to the display apparatus 100. For example, the OSD screen 510 may include menu for changing settings such as adjusting of sound of the display apparatus 100, adjusting of vibration, highlighting of a last movement, changing of a language, or the like.

Figure 5C:
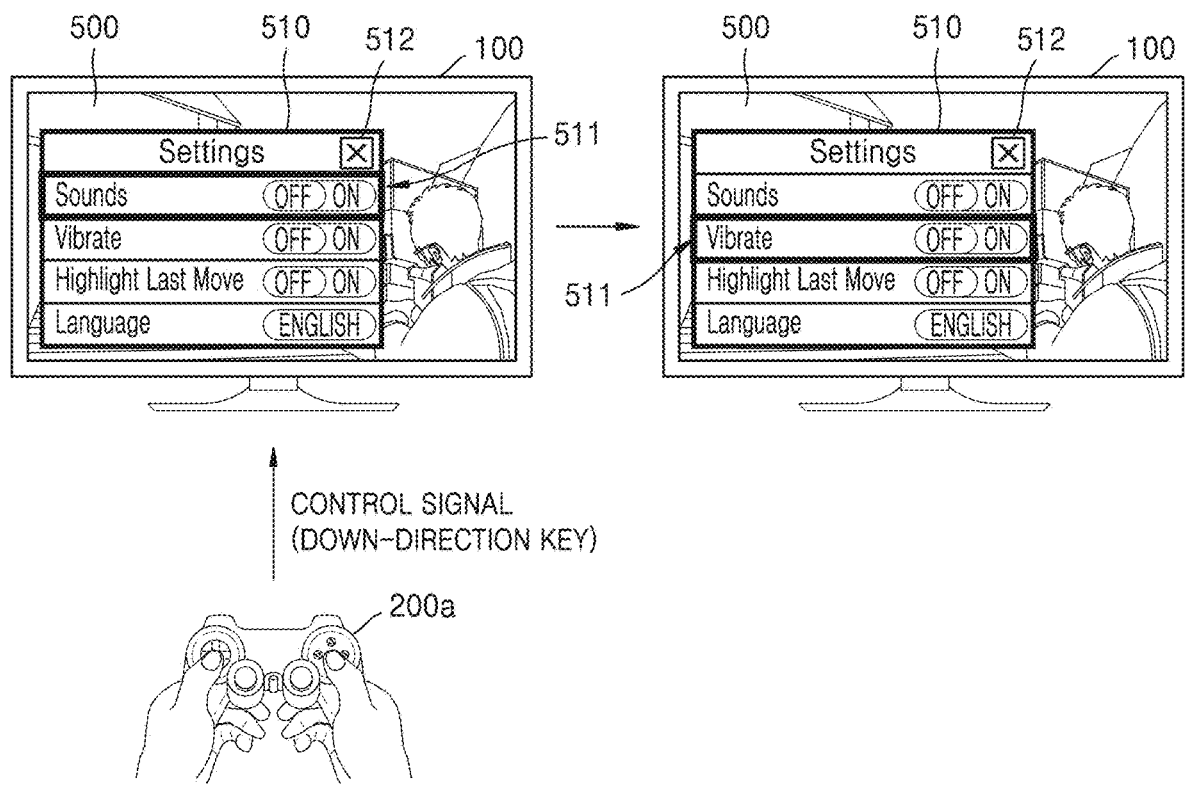
FIG. 5C is a reference diagram for describing a method by which a display apparatus receives a control signal from a control device and operates.

FIG. 5C is a reference diagram for describing a method by which a display apparatus receives a control signal from a control device and operates.

Referring to FIG. 5C, when the display apparatus 100 receives a control signal from the game pad 200a and determines that a display outputs a specified user interface screen, the display apparatus 100 does not relay the control signal to the game console 300a and may determine to directly consume the control signal. In the case of FIG. 5C, as the display apparatus 100 has a state in which the OSD screen 510 is displayed on a display, the display apparatus 100 may perform a function or an operation corresponding to the control signal, by using the control signal received from the game pad 200a. For example, in a state where a highlight 511 indicating that an item is selected is positioned as a default on a first item "Sounds" on the OSD screen 510, when a control signal indicating a down-direction key is received from the game pad 200a, the display apparatus 100 may perform an operation corresponding to the control signal. That is, the display apparatus 100 may perform an operation of moving the highlight 511 to a second item "Vibrate" that is below from the first item "Sounds".

Figure 5D:
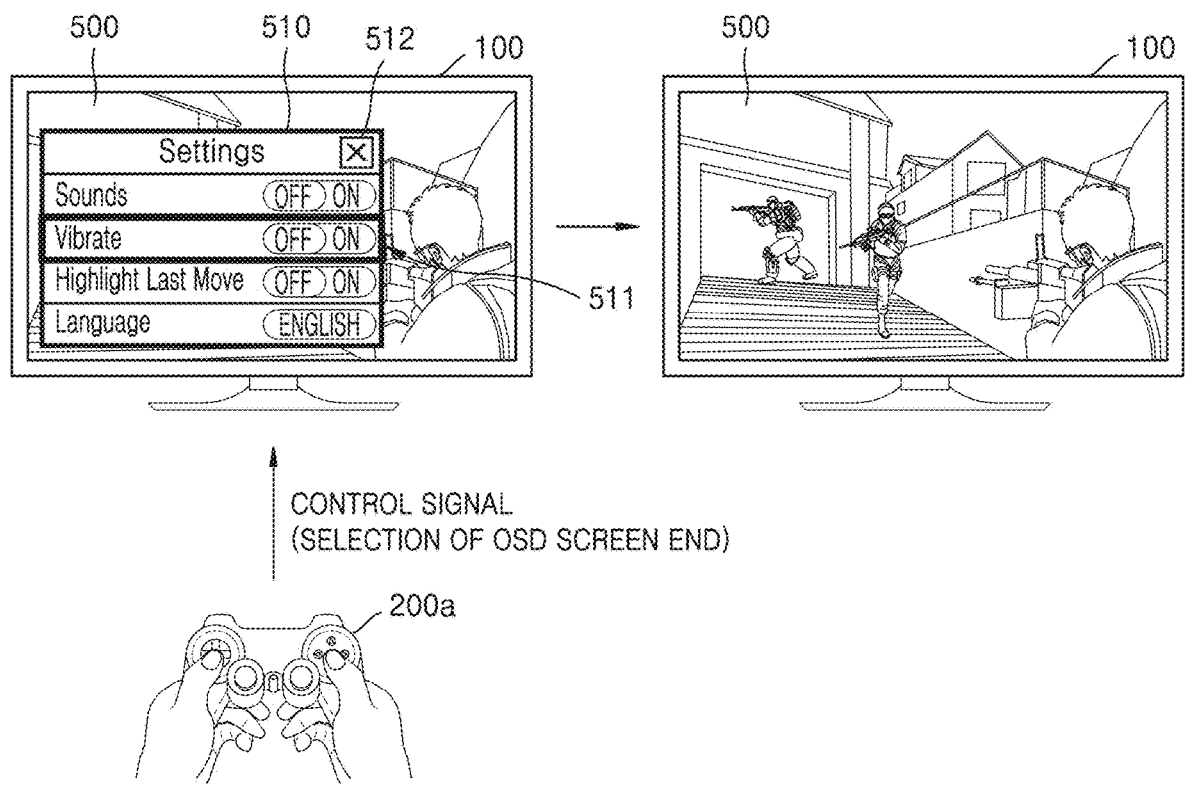
FIG. 5D is a reference diagram for describing a method by which a display apparatus receives a control signal from a control device and operates.

FIG. 5D is a reference diagram for describing a method by which a display apparatus receives a control signal from a control device and operates.

Referring to FIG. 5D, when the display apparatus 100 receives a control signal from the game pad 200a and determines that a display outputs a specified user interface screen, the display apparatus 100 does not relay the control signal to the game console 300a and may determine to directly consume the control signal. In the case of FIG. 5D, as the display apparatus 100 has a state in which the OSD screen 510 is displayed on a display, the display apparatus 100 may perform a function or an operation corresponding to the control signal, by using the control signal received from the game pad 200a. For example, when the display apparatus 100 receives a control signal indicating selection of an OSD screen end from the game pad 200a (e.g., when a control signal of selecting an item "X" 512 indicating an OSD screen end from the OSD screen 510 is received), the display apparatus 100 may perform an operation corresponding to the control signal. That is, the display apparatus 100 may perform an operation of stopping an output of the OSD screen 510 from the display so as to make the OSD screen 510 disappear from the display.

Figure 6:
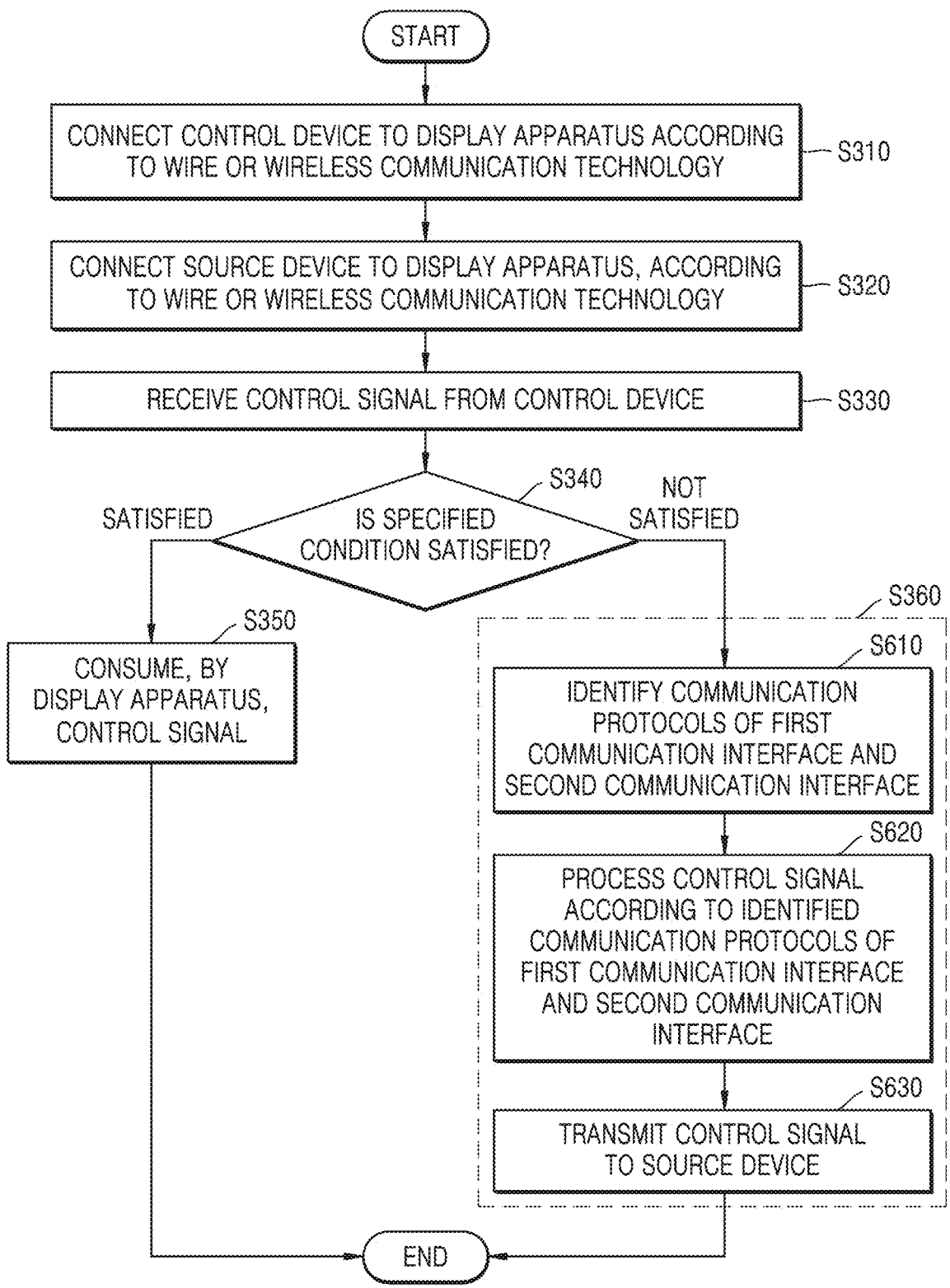
FIG. 6 illustrates a flowchart of an example of a method of operating a display apparatus, according to one or more embodiments of the disclosure.

FIG. 6 illustrates a flowchart of an example of a method of operating a display apparatus according to one or more embodiments of the disclosure.

The flowchart of the method shown in FIG. 6 is equal to the flowchart of the method shown in FIG. 3, and FIG. 6 illustrates particular operations of operation S360.

Referring to FIG. 6, when the display apparatus 100 identifies a control signal received from the control device 200 and thus determines that a specified condition is not satisfied, the display apparatus 100 may proceed to operation S610.

In operation S610, the display apparatus 100 may identify communication protocols of the first communication interface and the second communication interface.

The display apparatus 100 may identify a communication protocol of the first communication interface used to communication-connect to the control device 200 and a communication protocol of the second communication interface used to communication-connect to the source device 300.

According to one or more embodiments of the disclosure, a wireless or wired communication protocol may be used for the first communication interface and the second communication interface.

According to one or more embodiments of the disclosure, a same communication protocol may be used for the first communication interface and the second communication interface. For example, a USB communication protocol may be used for both the first communication interface and the second communication interface. In this case, a USB communication protocol using a downstream USB port may be used for the first communication interface, and a USB communication protocol using an upstream USB port may be used for the second communication interface. Alternatively, the USB communication protocol using the downstream USB port may be used for the first communication interface, and the USB communication protocol using the downstream USB port may also be used for the second communication interface. For example, a Bluetooth communication protocol may be used for both the first communication interface and the second communication interface. In this case, one Bluetooth communication module may be time-divided to operate in a master mode for the first communication interface and a slave mode for the second communication interface. Alternatively, when there are a plurality of Bluetooth communication modules, a first Bluetooth communication module may be used as the first communication interface, and a second Bluetooth communication module may be used as the second communication interface. For example, a Wi-Fi communication protocol may be used for both the first communication interface and the second communication interface. In this case, a Wi-Fi first frequency band may be used for the first communication interface, and a second frequency band may be used for the second communication interface.

According to one or more embodiments of the disclosure, different communication protocols may be used for the first communication interface and the second communication interface. Various combinations may be available for usage of different communication protocols for the first communication interface and the second communication interface. For example, a Bluetooth communication protocol may be used for the first communication interface, and a USB communication protocol using a downstream USB port may be used for the second communication interface. For example, a Bluetooth communication protocol may be used for the first communication interface, and a USB communication protocol using an upstream USB port may be used for the second communication interface. For example, a USB communication protocol may be used for the first communication interface, and a Bluetooth communication protocol may be used for the second communication interface. For example, a Bluetooth communication protocol may be used for the first communication interface, and a Wi-Fi communication protocol may be used for the second communication interface. For example, a Wi-Fi communication protocol may be used for the first communication interface, and a Bluetooth communication protocol may be used for the second communication interface.

According to one or more embodiments of the disclosure, the first communication interface and the second communication interface may be implemented as one communication module or may be implemented as two different communication modules.

According to one or more embodiments of the disclosure, a wireless or wired USB communication, a Bluetooth communication, or a Wi-Fi communication may be used as a communication protocol of the first communication interface. Equally, a wireless or wired USB communication, a Bluetooth communication, or a Wi-Fi communication may be used as a communication protocol of the second communication interface.

In operation S620, the display apparatus 100 may process the control signal according to the identified communication protocols of the first communication interface and the second communication interface.

According to one or more embodiments of the disclosure, the display apparatus 100 may bypass the control signal according to the identified communication protocols of the first communication interface and the second communication interface.

According to one or more embodiments of the disclosure, the display apparatus 100 may perform format conversion processing on the control signal according to the identified communication protocols of the first communication interface and the second communication interface.

According to one or more embodiments of the disclosure, the display apparatus 100 may perform processing on the control signal by using virtual USB device software so as to allow the source device 300 to recognize the display apparatus 100 as an HID, according to the identified communication protocols of the first communication interface and the second communication interface.

In operation S630, the display apparatus 100 may transmit the processed control signal to the source device 300.

Hereinafter, examples in which the display apparatus 100 connects the control device 200 to the first communication interface and connects the source device 300 to the second communication interface by using various communication protocols will now be described.

According to one or more embodiments of the disclosure, the display apparatus 100 may use a downstream USB port as the first communication interface to be connected to the control device 200 and may use an upstream USB port as the second communication interface to be connected to the source device 300. A first example will now be described with reference to FIGS. 7 to 10.

Figure 7:
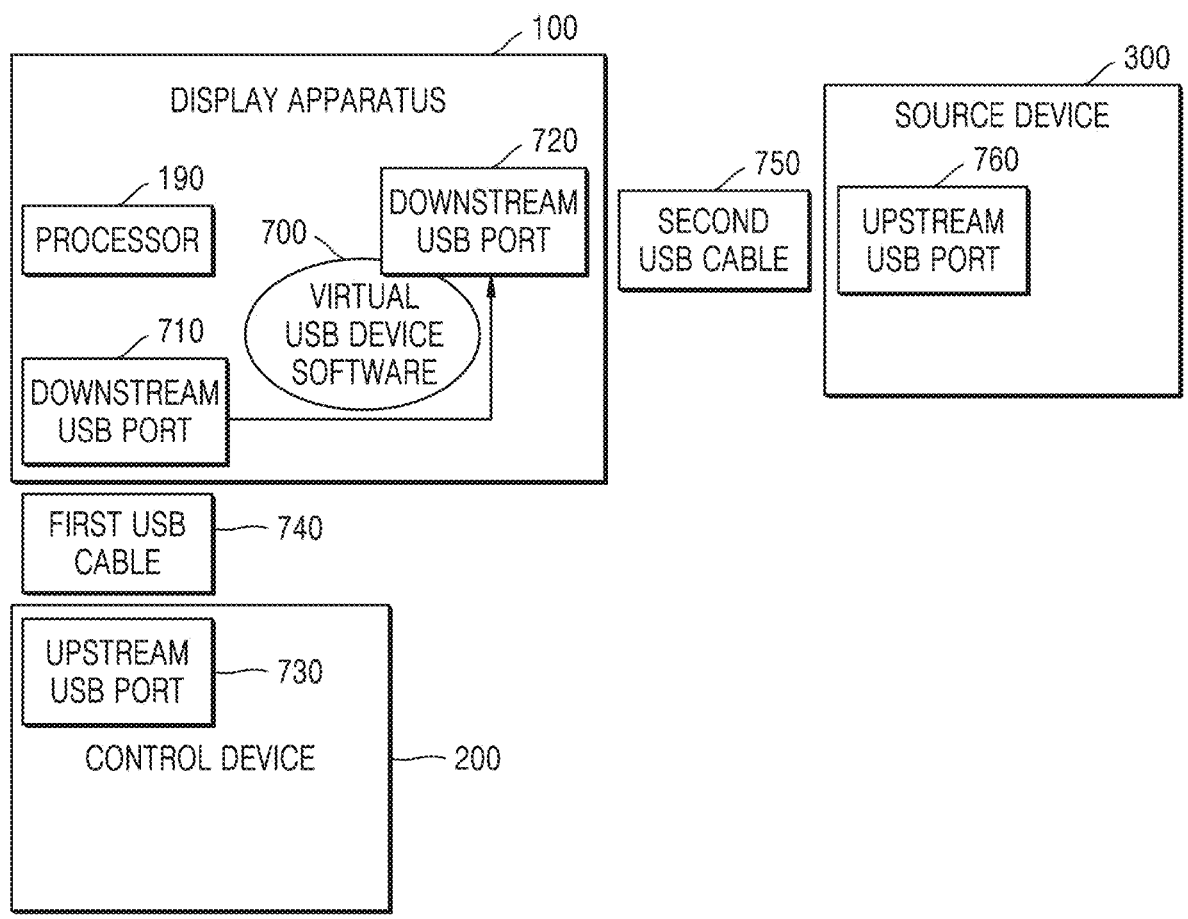
FIG. 7 illustrates an example of a system in which a display apparatus connects to a control device by using a downstream universal serial bus (USB) port and connects to a source device by using a downstream USB port, according to one or more embodiments of the disclosure.

FIG. 7 illustrates an example of a system in which the display apparatus 100 connects to the control device 200 by using a downstream USB port and connects to the source device 300 by using a downstream USB port, according to one or more embodiments of the disclosure.

Referring to FIG. 7, the display apparatus 100 may connect to the control device 200 by using a downstream USB port 710. The downstream USB port 710 of the display apparatus 100 and an upstream USB port 730 of the control device 200 may be connected to each other by using a first USB cable 740. According to the connection, the display apparatus 100 may recognize the control device 200 as an HID.

The display apparatus 100 may connect to the source device 300 by using a downstream USB port 720. The downstream USB port 720 of the display apparatus 100 may be connected to an upstream USB port 760 of the source device 300 by using a second USB cable 750. According to the connection, the source device 300 may recognize the display apparatus 100 as an HID. The display apparatus 100 may use virtual USB device software 700 to process a process for allowing the source device 300 to recognize the display apparatus 100 as an HID.

Figure 8:
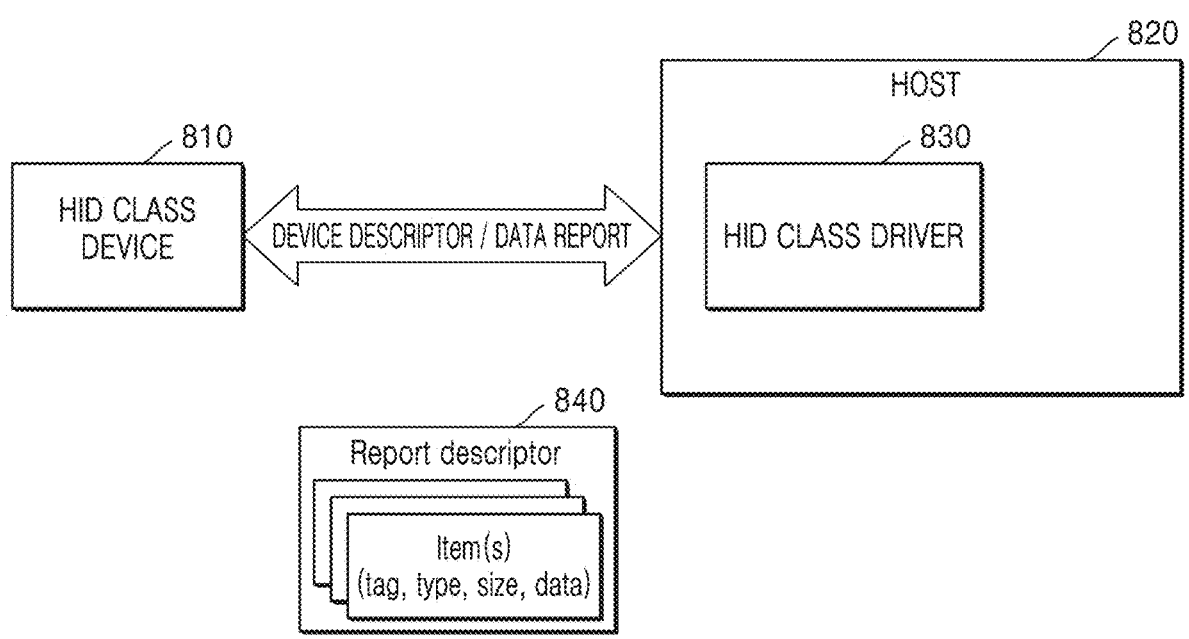
FIG. 8 is a reference diagram for describing a concept of a human interface device (HID) class device and class driver according to a USB HID protocol.

FIG. 8 is a reference diagram for describing a concept of a HID class device and a class driver according to a USB HID protocol.

Referring to FIG. 8, a HID class device 810 and a HID class driver 830 exchange a device descriptor and a data report.

A USB is a concept by which new computer peripheral devices do not have separate software drivers but devices having a similar data reporting characteristic are grouped as a device class, and each group has a class driver. Also, devices have a capability to describe what control they have to report data, to a class driver.

An HID class device 810 may indicate a device that provides a service of inputting and outputting human data to and from a host 820. An example of a HID may include a mouse, a joystick, a game pad, a keyboard, a voltmeter, a temperature sensor, or the like. The host 820 may indicate a device that uses or requests a service of the HID. The host 820 may include a personal computer, a handheld computer, a game console, a data recording device, or the like.

Information about a USB device may be stored as segments referred to as descriptors in a memory of the USB device.

The HID class device 810 may retrieve and transmit all data by using the HID class driver 830 corresponding thereto. A path and searching of data may be achieved by examining a descriptor and a data report of a device.

A report descriptor 840 describes data generated by the HID class device 810 and what is measured in the data. For example, the report descriptor 840 may define items that describe a position of an HID class device and a button state. By examining the items of the report descriptor 840, the HID class driver 830 may determine a size and configuration of a data report from the HID class device 810.

Figure 9:
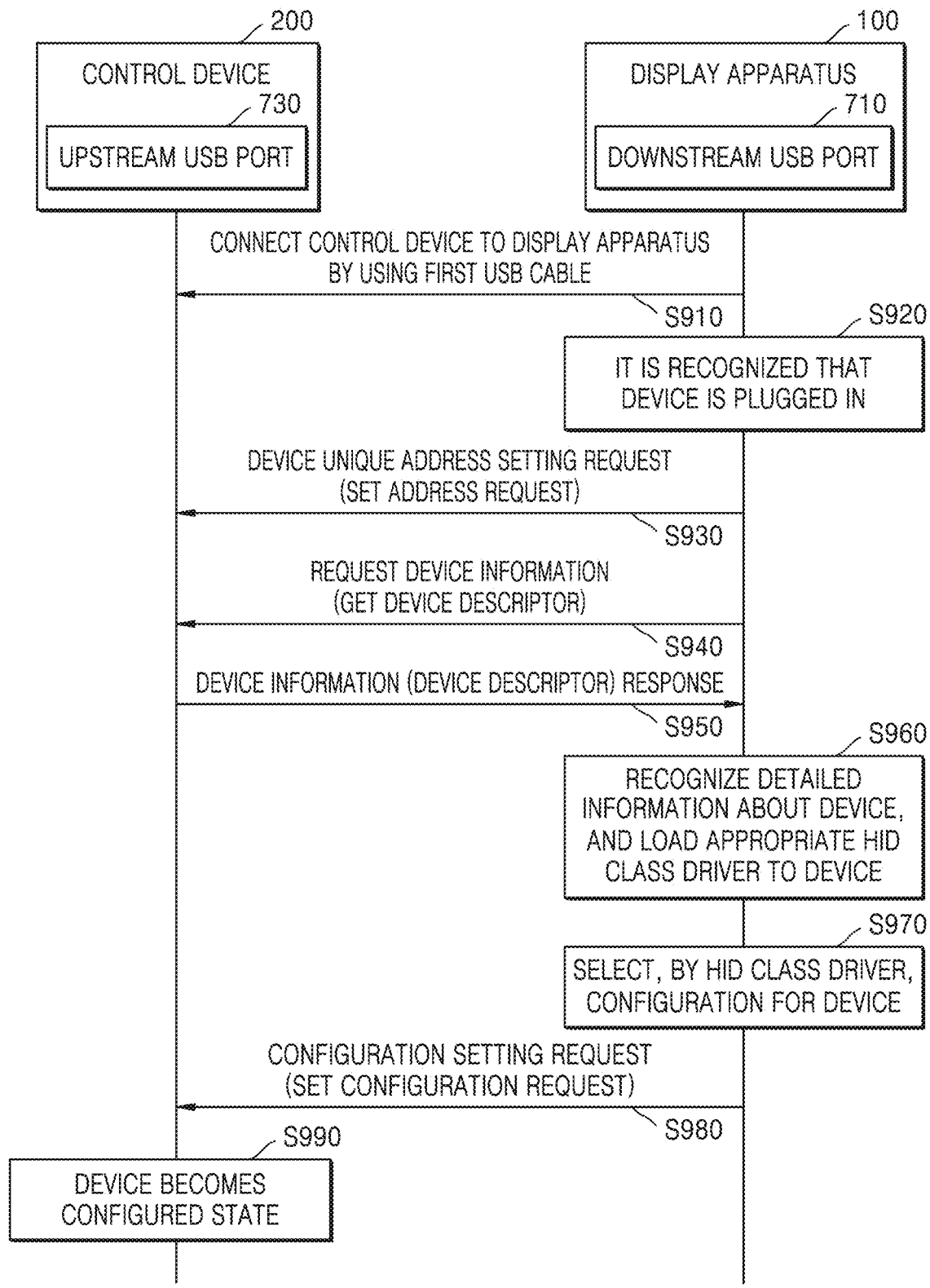
FIG. 9 illustrates an example of a procedure in which a display apparatus connects to a control device so as to recognize the control device as an HID according to a USB HID protocol, according to one or more embodiments of the disclosure.

FIG. 9 illustrates an example of a procedure in which the display apparatus 100 connects to the control device 200 so as to recognize the control device 200 as an HID according to a USB HID protocol, according to one or more embodiments of the disclosure.

Referring to FIG. 9, in operation S910, the upstream USB port 730 of the control device 200 may be connected to the display apparatus 100 by using the first USB cable 740. That is, a first USB cable connected to the control device 200 is plugged in to the downstream USB port 710 (i.e., a host) of the display apparatus 100, so that the control device 200 may be connected to the display apparatus 100.

In operation S920, when the control device 200 and the display apparatus 100 are connected by using the first USB cable 740, the display apparatus 100 may recognize that a device, i.e., the control device 200, is plugged in.

In operation S930, the display apparatus 100 may transmit a device unique address setting request to the control device 200.

In operation S940, the display apparatus 100 may request the control device 200 for device information.

In operation S950, the control device 200 may transmit a device descriptor including information about the control device 200 to the display apparatus 100. The information about the control device 200 included in the device descriptor may include vendor identification (ID), product ID, and firmware version information of the control device 200.

In operation S960, the display apparatus 100 may recognize the information about the control device 200 from the device descriptor, and may load an appropriate HID class driver to the control device 200.

In operation S970, the HID class driver may select a configuration for the device, i.e., a configuration for the control device 200.

In operation S980, the HID class driver may transmit a configuration setting request to the control device 200.

In operation S990, the control device 200 may become a state configured according to configuration setting.

According to the operation, the display apparatus 100 may recognize, as an HID, the control device 200 connected to its downstream USB port.

Figure 10:
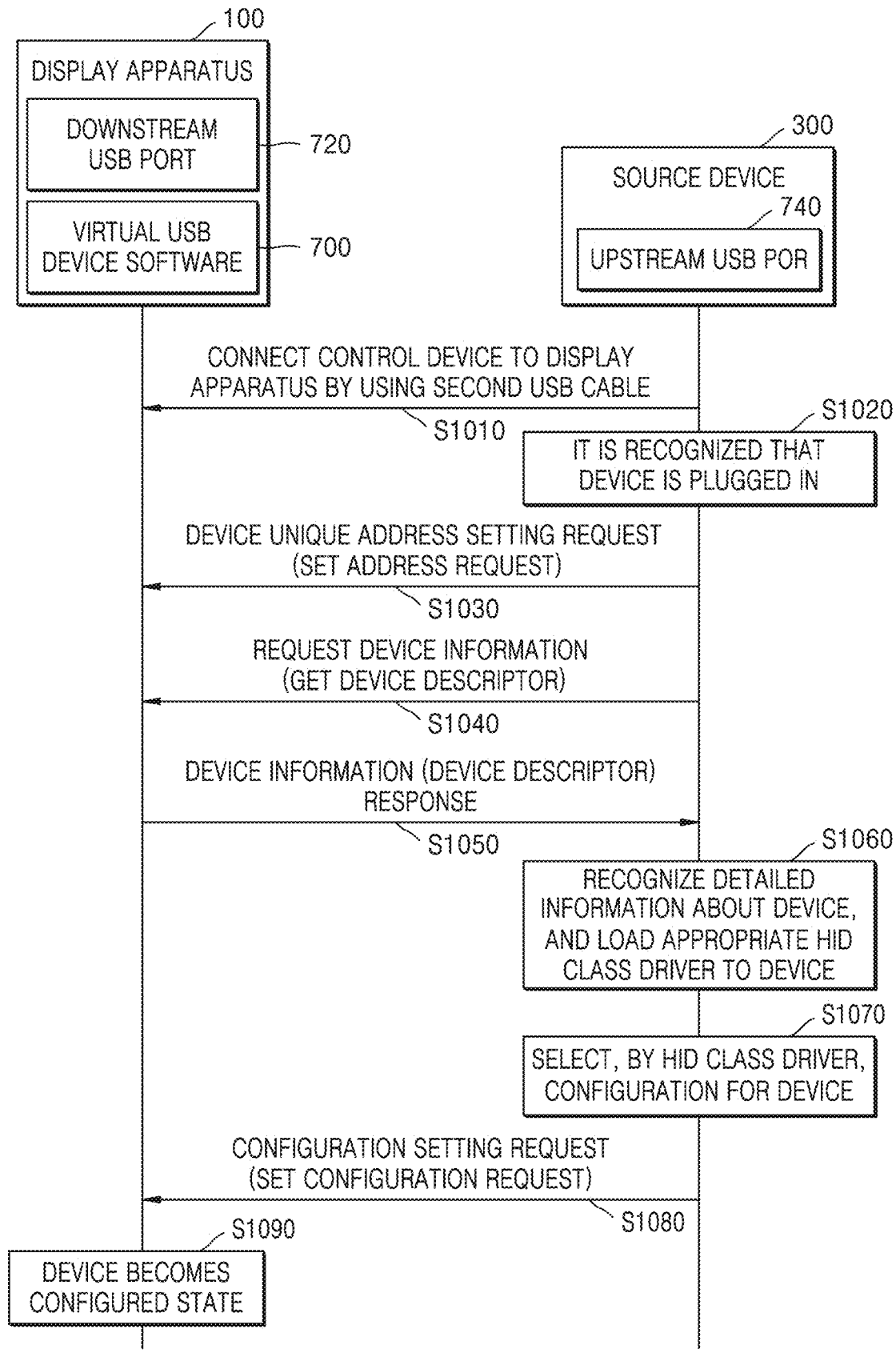
FIG. 10 illustrates an example of a procedure in which a source device is connected to a display apparatus so as to recognize the display apparatus as an HID according to a USB HID protocol, according to one or more embodiments of the disclosure.

FIG. 10 illustrates an example of a procedure in which the source device 300 is connected to the display apparatus 100 so as to recognize the display apparatus 100 as an HID according to a USB HID protocol, according to one or more embodiments of the disclosure.

In the example shown in FIG. 7, as the downstream USB port 720 of the display apparatus 100 is connected to the upstream USB port 760 of the source device 300, in general, the display apparatus 100 is recognized as a host role and the source device 300 is recognized as a device role, however, in order for the display apparatus 100 to transmit input data from the control device 200 to the source device 300 according to embodiments of the disclosure, it is necessary for the display apparatus 100 to be recognized as a device role with respect to the source device 300. That is, the display apparatus 100 may need an operation to be recognized as an HID device with respect to the source device 300. The display apparatus 100 may use the virtual USB device software 700 to perform a series of processes of allowing the display apparatus 100 to be recognized as an HID class device in correspondence to the source device 300 connected to the downstream USB port of the display apparatus 100. The virtual USB device software 700 may perform an operation of allowing the display apparatus 100 to be recognized as the HID class device in a connection operation with respect to the source device 300. Operations shown in FIG. 10 may be performed by the virtual USB device software 700.

Referring to FIG. 10, in operation S1010, the source device 300 and the display apparatus 100 may be connected by using a second USB cable. That is, an end of the second USB cable may be plugged in to the upstream USB port 760 of the source device 300, and the other end of the second USB cable may be plugged in to the downstream USB port 720 of the display apparatus 100, so that the source device 300 and the display apparatus 100 may be connected to each other.

In operation S1020, when the source device 300 and the display apparatus 100 are connected by using the second USB cable, the source device 300 may recognize that a device, i.e., the display apparatus 100, is plugged in.

In operation S1030, the source device 300 may transmit a device unique address setting request to the display apparatus 100.

In operation S1040, the source device 300 may request the display apparatus 100 for device information.

In operation S1050, the display apparatus 100 may transmit a device descriptor including information about the display apparatus 100 to the source device 300. The information about the display apparatus 100 included in the device descriptor may include vendor ID, product ID, and firmware version information of the display apparatus 100. Here, the display apparatus 100 sets a virtual HID class device by using the virtual USB device software 700, and may include vendor ID, product ID, and firmware version information about the virtual HID class device, in the device descriptor. For example, virtual USB device software may use vendor ID, product ID, and firmware version information about the virtual HID class device as vendor ID, product ID, and firmware version information about the control device 200 which are received from the control device 200. However, it is not necessary to equally use the vendor ID, the product ID, and the firmware version information about the control device 200, and virtual information that is newly generated by the virtual USB device software may be used.

In operation S1060, the source device 300 may recognize the information about the display apparatus 100 from the device descriptor, and may load an appropriate HID class driver to the display apparatus 100.

In operation S1070, the HID class driver may select a configuration for the device, i.e., a configuration for the display apparatus 100.

In operation S1080, the HID class driver may transmit a configuration setting request to the display apparatus 100.

In operation S1090, the display apparatus 100 may become a state configured according to configuration setting.

According to the operation, the display apparatus 100 may recognize itself as an HID with respect to the source device 300 connected to its downstream USB port.

Figure 11:
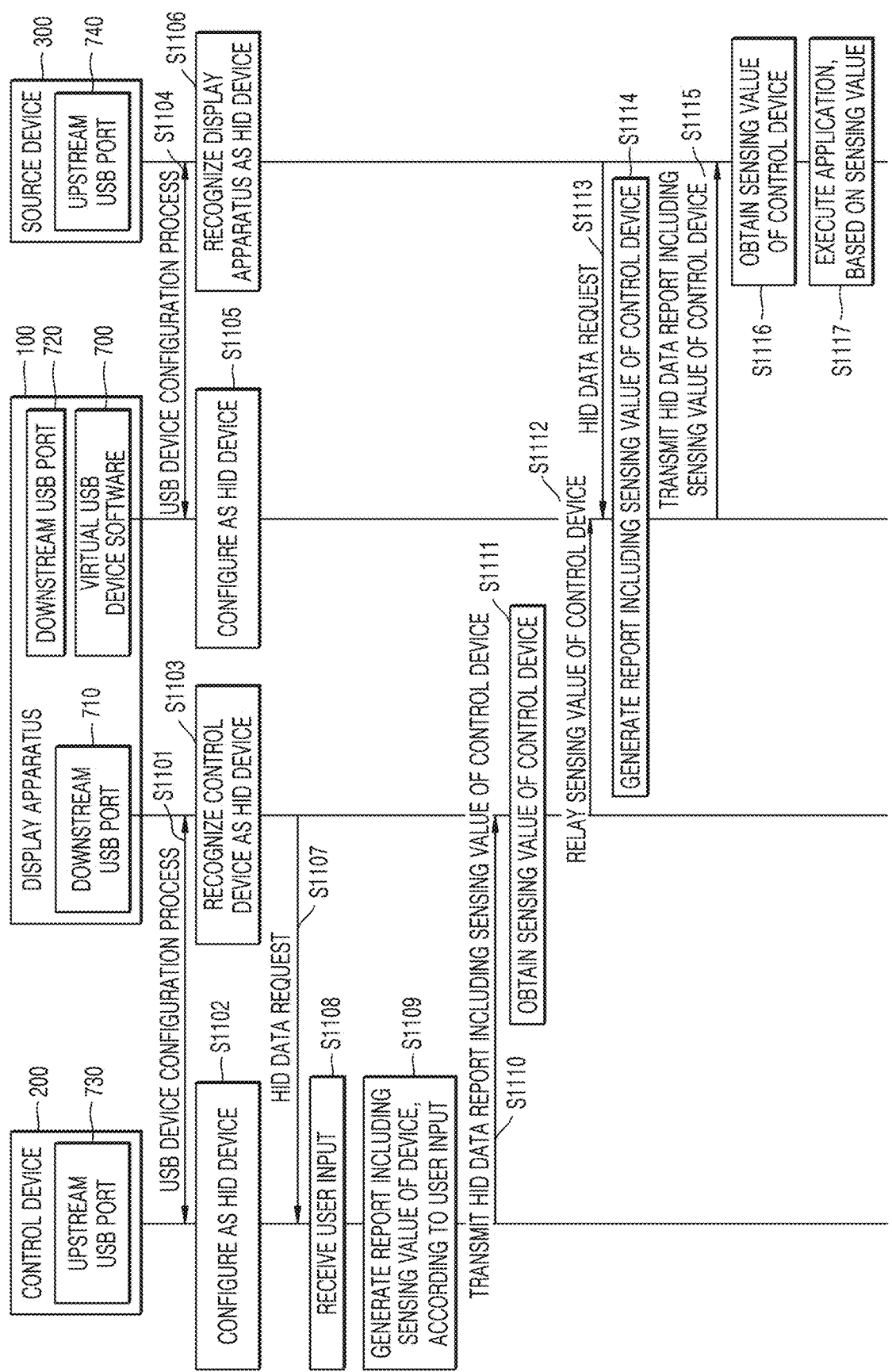
FIG. 11 illustrates an example of an operation in which a display apparatus relays a control signal in a system in which the display apparatus connects to a control device by using a downstream USB port and connects to a source device by using an upstream USB port, according to one or more embodiments of the disclosure.

FIG. 11 illustrates an example of an operation in which the display apparatus 100 relays a control signal in a system in which the display apparatus 100 connects to the control device 200 by using a downstream USB port and connects to the source device 300 by using an upstream USB port, according to one or more embodiments of the disclosure.

In operation S1101, the display apparatus 100 may perform a USB device configuration process on the control device 200 connected to the downstream USB port 710.

As the USB device configuration process is performed, in operation S1102, the control device 200 may be configured as an HID device, and in operation S1103, the display apparatus 100 may recognize the control device 200 as the HID device.

In operation S1104, the display apparatus 100 may perform a USB device configuration process on the source device 300 connected to the downstream USB port 720, by using the virtual USB device software 700.

As the USB device configuration process is performed, in operation S1105, the display apparatus 100 may be configured as an HID device, and in operation S1106, the source device 300 may recognize the display apparatus 100 as the HID device.

In operation S1107, the display apparatus 100 may transmit an HID data request (HID class report descriptor request) to the control device 200. An order of operation S1107 is not necessarily performed at a time as shown in FIG. 11. The device can transmit data in response to an HID data request from a host, according to an HID protocol, and thus, operation S1107 may be performed any time before operation S1110 is performed.

In operation S1108, the control device 200 may receive a user input. The control device 200 may receive a user input via the user input interface 230. A user input of the control device 200 implemented as a game pad may include a pressure of button, a position movement at a joystick, or the like.

In operation S1109, the control device 200 may generate an HID data report (HID class report descriptor) including a sensing value (a level of the pressure of button or position information of the joystick) of the control device 200, according to the user input.

In operation S1110, the control device 200 may transmit the HID data report including the sensing value of the control device 200 to the display apparatus 100.

In operation S1111, the downstream USB port 710 of the display apparatus 100 may obtain the sensing value of the control device 200 from the HID data report received from the control device 200.

In operation S1112, the downstream USB port 710 of the display apparatus 100 may relay the sensing value of the control device 200 to the downstream USB port 720.

In operation S1113, the downstream USB port 720 of the display apparatus 100 may receive an HID data request (HID class report descriptor request) from the source device 300.

In operation S1114, the downstream USB port 720 of the display apparatus 100 may generate an HID data report (HID class report descriptor) by using the sensing value of the control device 200 relayed from the downstream USB port 710. In detail, the display apparatus 100 may generate the HID data report (HID class report descriptor) including the sensing value of the control device 200 by using the virtual USB device software 700 of the display apparatus 100.

In operation S1115, the downstream USB port 720 of the display apparatus 100 may transmit the HID data report including the sensing value of the control device 200 to the source device 300.

In operation S1116, the source device 300 may obtain the sensing value of the control device 200 from the HID data report received from the display apparatus 100.

In operation S1117, the source device 300 may execute an application, based on the sensing value of the control device 200.

According to one or more embodiments of the disclosure, the display apparatus 100 may use the downstream USB port as the first communication interface to connect to the control device 200, and may use the upstream USB port as the second communication interface to connect to the source device 300. A second example will now be described with reference to FIGS. 12 to 14.

Figure 12:
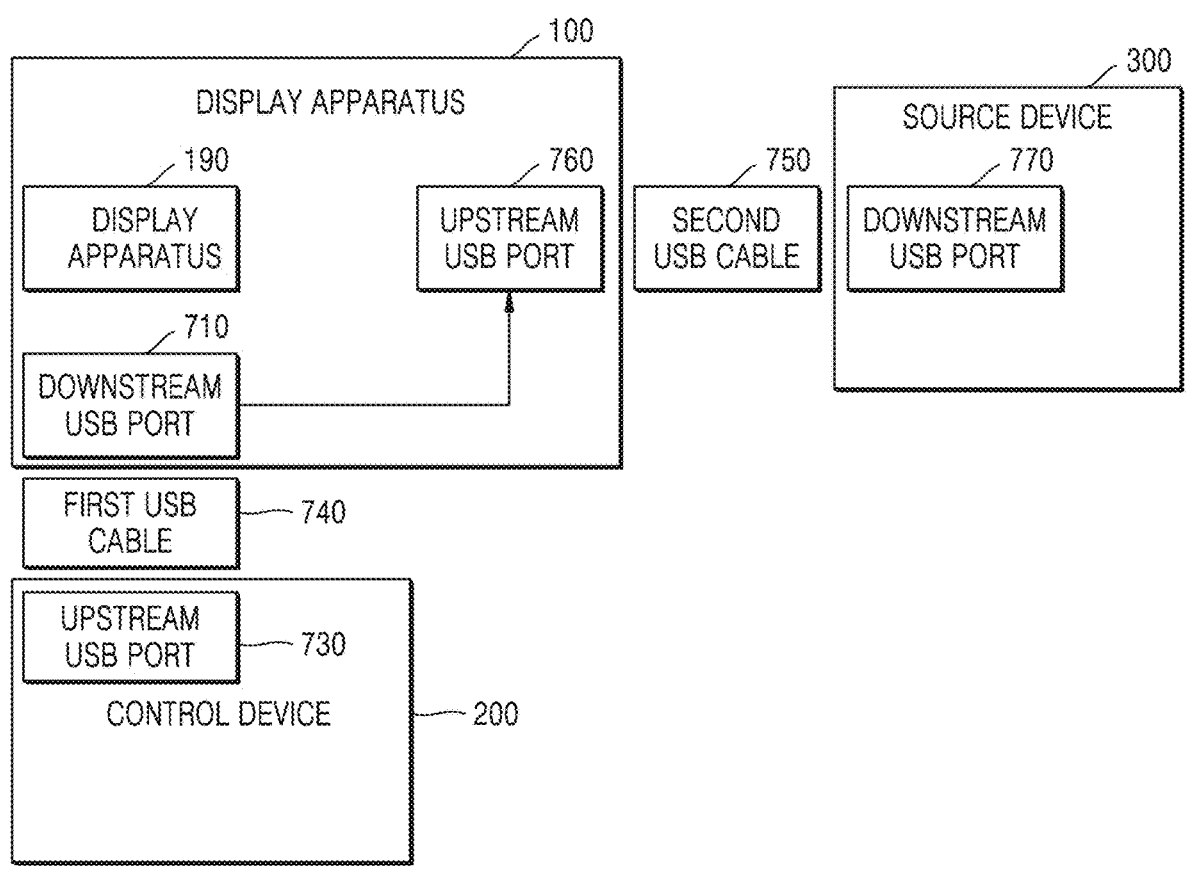
FIG. 12 illustrates an example of a system in which a display apparatus connects to a control device by using a downstream USB port and connects to a source device by using an upstream USB port.

FIG. 12 illustrates an example of a system in which the display apparatus 100 connects to the control device 200 by using a downstream USB port and connects to the source device 300 by using an upstream USB port.

Referring to FIG. 12, the display apparatus 100 may connect to the control device 200 by using the downstream USB port 710. The downstream USB port 710 of the display apparatus 100 may be connected to the upstream USB port 730 of the control device 200 by using the first USB cable 740. According to the connection, the display apparatus 100 may recognize the control device 200 as an HID.

The display apparatus 100 may connect to the source device 300 by using an upstream USB port 760. The upstream USB port 760 of the display apparatus 100 may be connected to a downstream USB port 770 of the source device 300 by using the second USB cable 750. According to the connection, the display apparatus 100 may be recognized as an HID with respect to the source device 300. The display apparatus 100 may perform a USB device configuration process on the source device 300 equally as the USB device configuration process performed on the control device 200.

Figure 13:
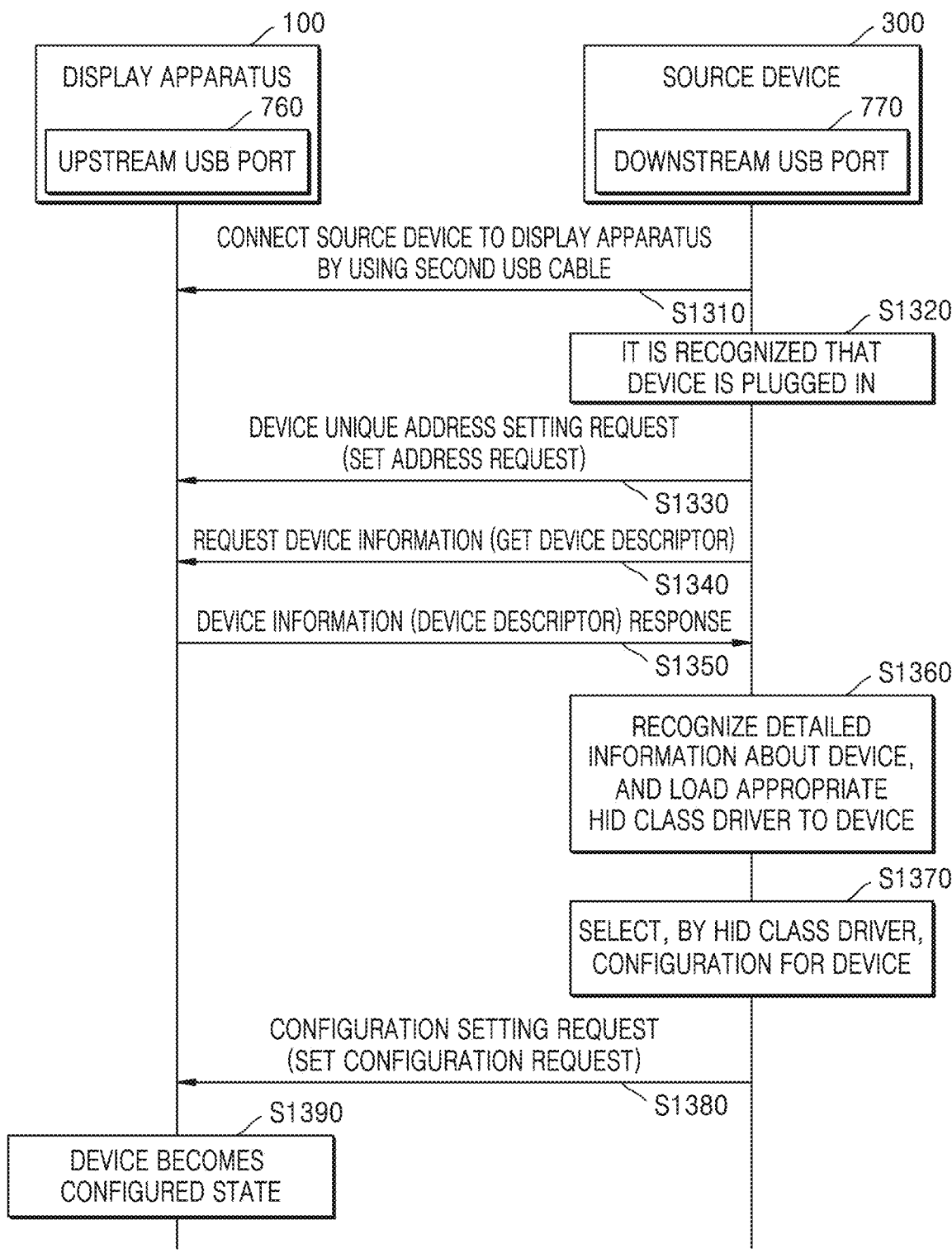
FIG. 13 illustrates an example of a procedure in which a source device is connected to a display apparatus so as to recognize the display apparatus as an HID according to a USB HID protocol, according to one or more embodiments of the disclosure.

FIG. 13 illustrates an example of a procedure in which the source device 300 is connected to the display apparatus 100 so as to recognize the display apparatus 100 as an HID according to a USB HID protocol, according to one or more embodiments of the disclosure.

Referring to FIG. 13, in operation S1310, the source device 300 and the display apparatus 100 may be connected by using a second USB cable. That is, a USB cable connected to the source device 300 is plugged in to the upstream USB port 760 of the display apparatus 100, such that the source device 300 and the display apparatus 100 may be connected to each other.

In operation S1320, when the source device 300 and the display apparatus 100 are connected by using the second USB cable, the source device 300 may recognize that a device, i.e., the display apparatus 100, is plugged in.

In operation S1330, the source device 300 may transmit a device unique address setting request to the display apparatus 100.

In operation S1340, the source device 300 may request the display apparatus 100 for device information.

In operation S1350, the display apparatus 100 may transmit a device descriptor including information about the display apparatus 100 to the source device 300. The information about the display apparatus 100 included in the device descriptor may include vendor ID, product ID, and firmware version information of the display apparatus 100.

In operation S1360, the source device 300 may recognize the information about the display apparatus 100 from the device descriptor, and may load an appropriate HID class driver to the display apparatus 100.

In operation S1370, the HID class driver may select a configuration for the device, i.e., a configuration for the display apparatus 100.

In operation S1380, the HID class driver may transmit a configuration setting request to the display apparatus 100.

In operation S1390, the display apparatus 100 may become a state configured according to configuration setting.

According to the operation, the source device 300 may recognize, as an HID, the display apparatus 100 connected to its downstream USB port.

Figure 14:
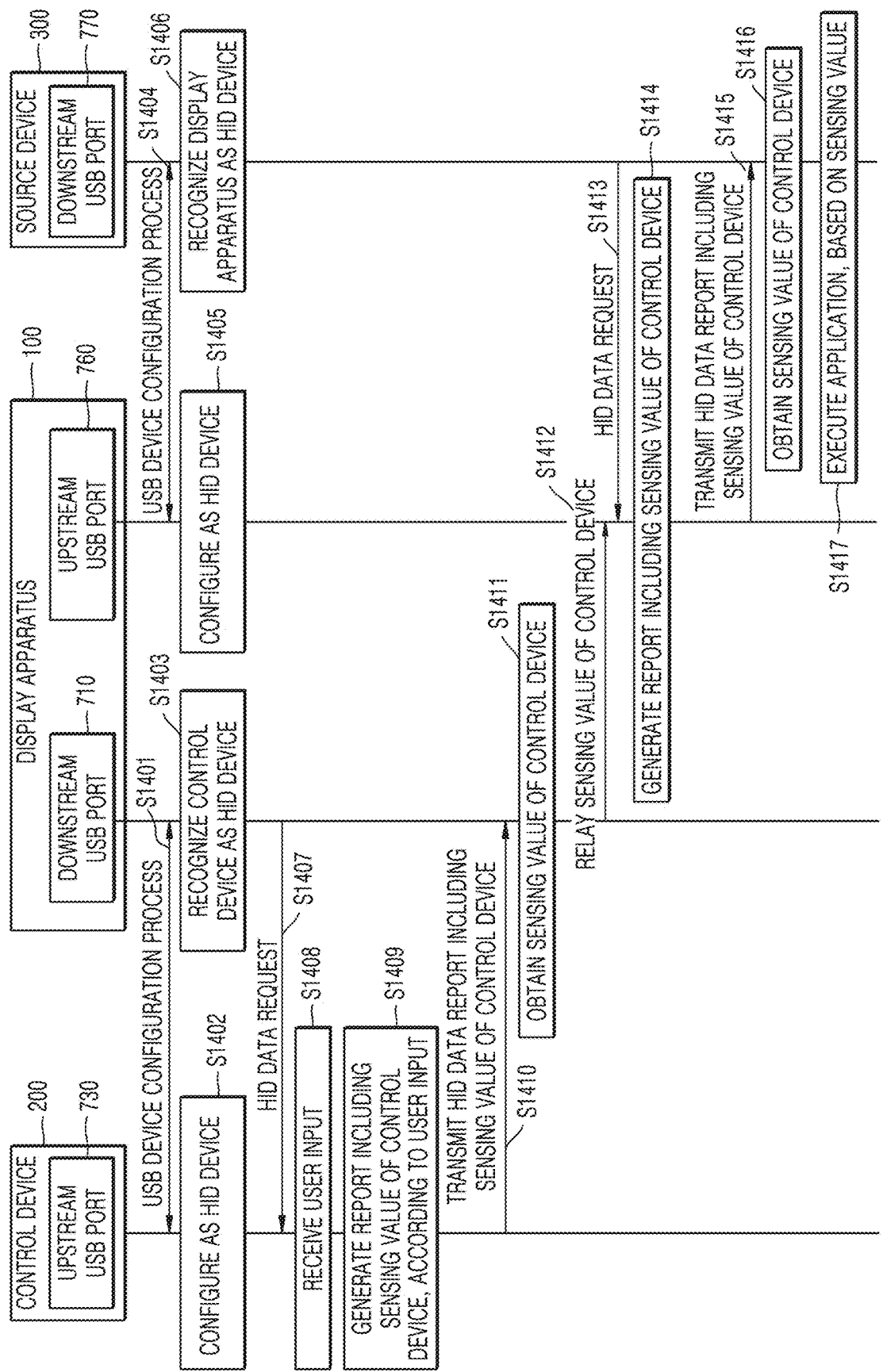
FIG. 14 illustrates an example of an operation in which a display apparatus relays a control signal in a system in which the display apparatus connects to a control device by using a downstream USB port and connects to a source device by using an upstream USB port, according to one or more embodiments of the disclosure.

FIG. 14 illustrates an example of an operation in which the display apparatus 100 relays a control signal in a system in which the display apparatus 100 connects to the control device 200 by using a downstream USB port and connects to the source device 300 by using an upstream USB port, according to one or more embodiments of the disclosure.

In operation S1401, the display apparatus 100 may perform a USB device configuration process on the control device 200 connected to the downstream USB port 710.

As the USB device configuration process is performed, in operation S1402, the control device 200 may be configured as an HID device, and in operation S1403, the display apparatus 100 may recognize the control device 200 as the HID device.

In operation S1404, the display apparatus 100 may perform a USB device configuration process on the source device 300 connected to the upstream USB port 760.

As the USB device configuration process is performed, in operation S1405, the display apparatus 100 may be configured an HID device, and in operation S1406, the source device 300 may recognize the display apparatus 100 as the HID device.

In operation S1407, the display apparatus 100 may transmit an HID data request (HID class report descriptor request) to the control device 200.

In operation S1408, the control device 200 may receive a user input. The control device 200 may receive the user input via the user input interface 230. A user input of the control device 200 implemented as a game pad may include a pressure of button, a position movement at a joystick, or the like.

In operation S1409, the control device 200 may generate an HID data report (HID class report descriptor) including a sensing value (a level of the pressure of button or position information of the joystick) of the control device 200, according to the user input.

In operation S1410, the control device 200 may transmit the HID data report including the sensing value of the control device 200 to the display apparatus 100.

In operation S1411, the downstream USB port 710 of the display apparatus 100 may obtain the sensing value of the control device 200 from the HID data report.

In operation S1412, the downstream USB port 710 of the display apparatus 100 may relay the sensing value of the control device 200 to the upstream USB port 760.

In operation S1413, the upstream USB port 760 of the display apparatus 100 may receive an HID data request (HID class report descriptor request) from the source device 300.

In operation S1414, the upstream USB port 760 of the display apparatus 100 may generate an HID data report (HID class report descriptor) by using the sensing value of the control device 200 relayed from the downstream USB port 710. In detail, the display apparatus 100 may generate the HID data report (HID class report descriptor) including the sensing value of the control device 200.

In operation S1415, the upstream USB port 760 of the display apparatus 100 may transmit the HID data report including the sensing value of the control device 200 to the source device 300. In this regard, as the display apparatus 100 changelessly relay the sensing value of the control device 200, which is received by using a downstream USB port without using virtual USB device software, to the source device 300 by using an upstream USB port, it may be referred that the sensing value of the control device 200 is bypassed.

In operation S1416, the source device 300 may obtain the sensing value of the control device 200 from the HID data report received from the display apparatus 100.

In operation S1417, the source device 300 may execute an application, based on the sensing value of the control device 200.

According to one or more embodiments of the disclosure, the display apparatus 100 may use a first Bluetooth communication module as a first communication interface to connect to the control device 200, and may use a second Bluetooth communication module as a second communication interface to connect to the source device 300. A third example will now be described with reference to FIGS. 15 to 16.

Figure 15:
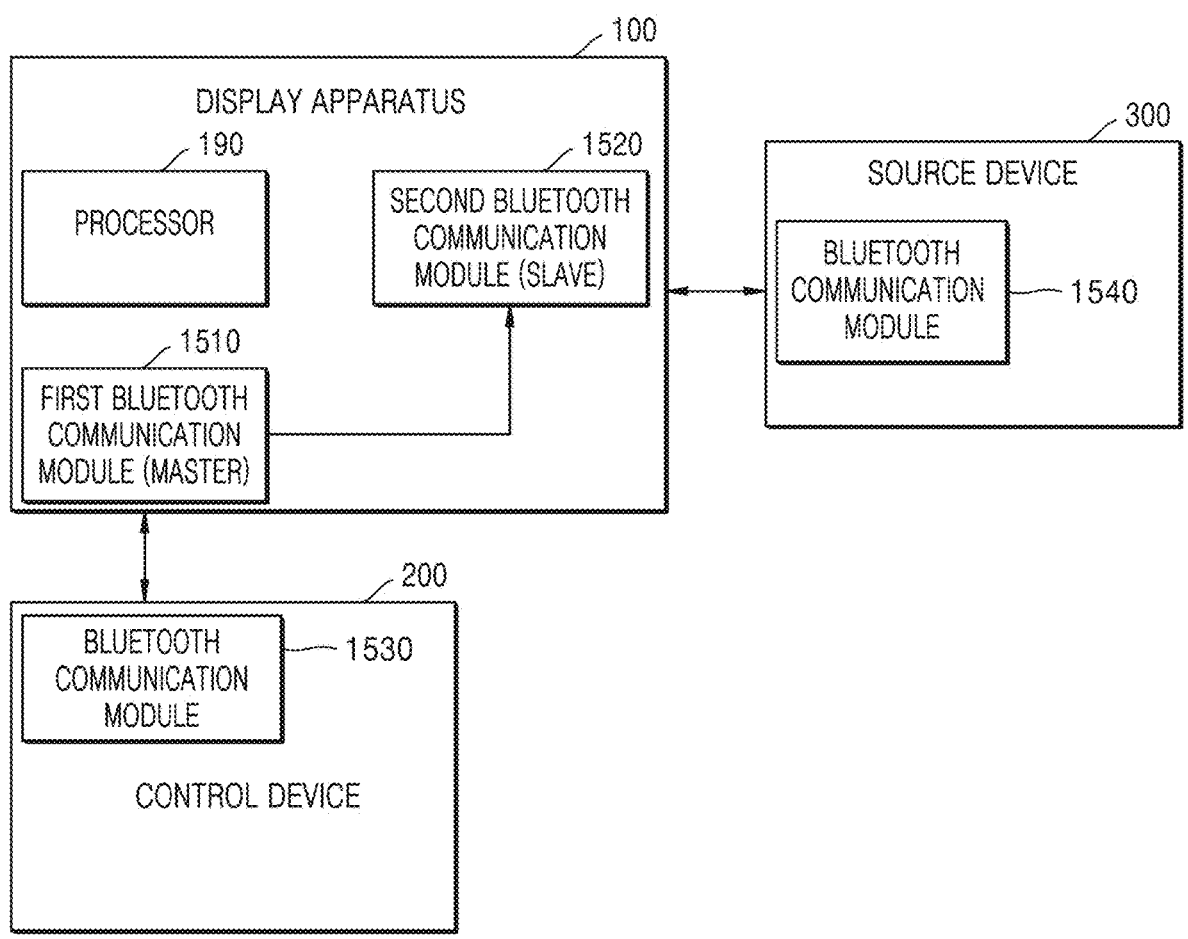
FIG. 15 illustrates an example of a system in which a display apparatus connects to a control device by using a first Bluetooth communication module and connects to a source device by using a second Bluetooth communication module, according to one or more embodiments of the disclosure.

FIG. 15 illustrates an example of a system in which the display apparatus 100 connects to the control device 200 by using the first Bluetooth communication module and connects to the source device 300 by using the second Bluetooth communication module, according to one or more embodiments of the disclosure.

Referring to FIG. 15, the display apparatus 100 may connect to the control device 200 by using a first Bluetooth communication module 1510. The first Bluetooth communication module 1510 of the display apparatus 100 may be Bluetooth communication-connected to a Bluetooth communication module 1530 of the control device 200. According to the connection, the display apparatus 100 may recognize the control device 200 as an HID. The first Bluetooth communication module 1510 of the display apparatus 100 may operate in a master mode, and the Bluetooth communication module 1530 of the control device 200 may operate in a slave mode. Bluetooth HID devices refer to devices are devices configured to provide a service that provides an input from a human to an application program being executed in a host. For example, the Bluetooth HID devices may include a mouse, a keyboard, a joystick, etc., and a plurality of HIDs may be connected to one host. Due to this reason, in general, the Bluetooth HID devices may be implemented as slaves in a Bluetooth HID protocol.

A master mode and a slave mode of a Bluetooth communication module will now be briefly described.

Bluetooth refer to a wireless communication technology that allows devices to communicate with each other, and may have two operating modes which are a master mode and a slave mode. A Bluetooth device in the master mode performs connection control on one or more Bluetooth devices in the slave mode and starts a communication. The Bluetooth device in the master mode searches for a device in the slave mode, generates connection, and performs timing control of data transmission. The Bluetooth device in the slave mode waits for a connection request from the Bluetooth device in the master mode, and responds to the connection request. After connection is established, the Bluetooth device in the slave mode follows timing and a communication protocol instructed by the Bluetooth device in the master mode.

The display apparatus 100 may connect to the source device 300 by using a second Bluetooth communication module 1520. The second Bluetooth communication module 1520 of the display apparatus 100 may be Bluetooth communication-connected to a Bluetooth communication module 1540 of the source device 300. According to the connection, the source device 300 may recognize the display apparatus 100 as an HID. The second Bluetooth communication module 1520 of the display apparatus 100 may operate in the slave mode, the Bluetooth communication module 1540 of the source device 300 may operate in the master mode.

In this manner, when the display apparatus 100 includes two or more Bluetooth communication modules, one may operate in the master mode to receive a control device sensing value from the control device 200 and the other one may operate in the slave mode to transmit the control device sensing value received from the control device 200 to the source device 300.

Figure 16:
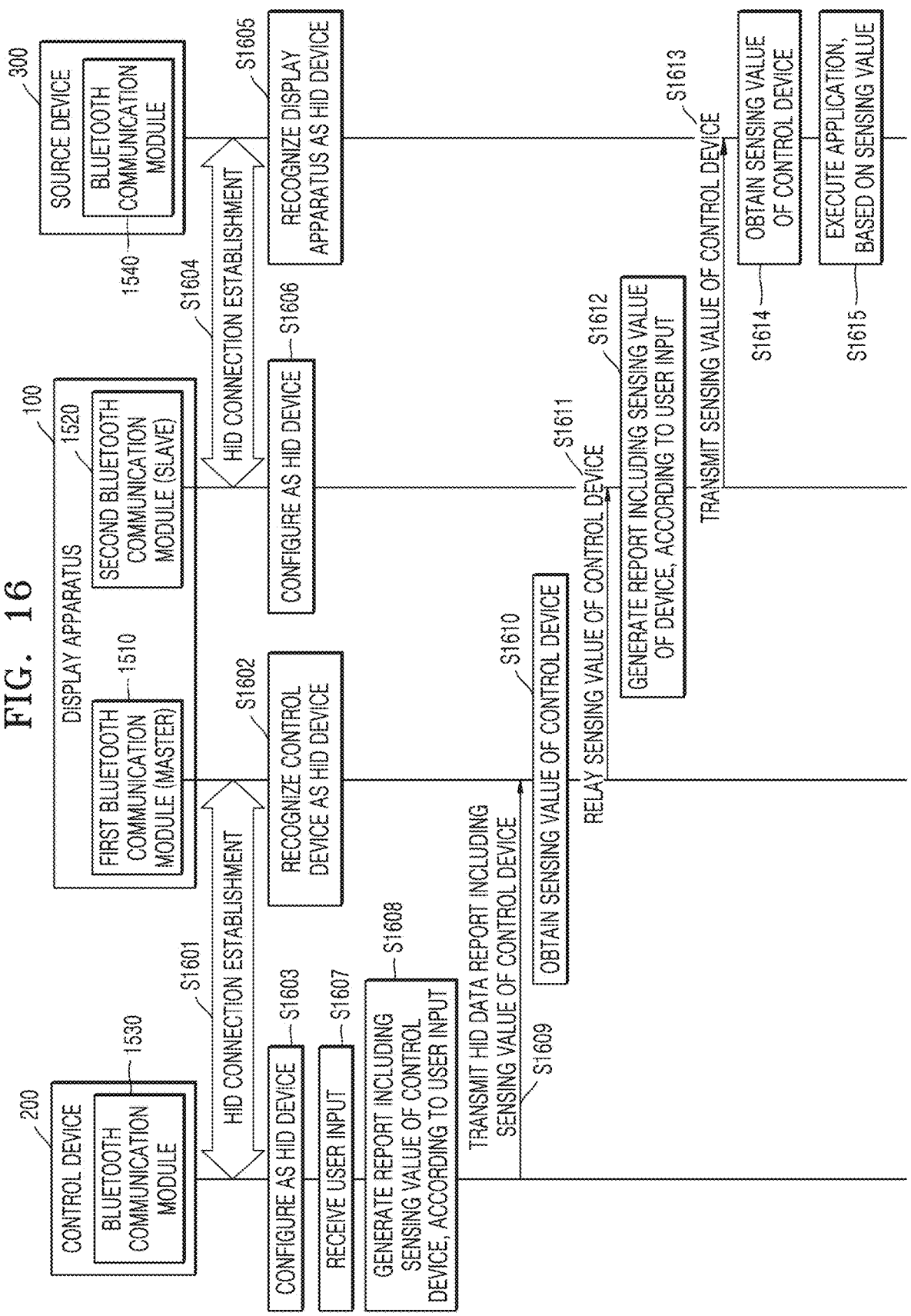
FIG. 16 illustrates an example of an operation in which a display apparatus relays a control signal in a system in which the display apparatus connects to a control device by using a first Bluetooth communication module and connects to a source device by using a second Bluetooth communication module, according to one or more embodiments of the disclosure.

FIG. 16 illustrates an example of an operation in which the display apparatus 100 relays a control signal in a system in which the display apparatus 100 connects to the control device 200 by using a first Bluetooth communication module and connects to the source device 300 by using a second Bluetooth communication module, according to one or more embodiments of the disclosure.

In operation S1601, the first Bluetooth communication module 1510 of the display apparatus 100 and the Bluetooth communication module 1530 of the control device 200 may perform a connection establishment operation according to a Bluetooth HID profile according to a Bluetooth communication procedure. The Bluetooth HID (BT-HID) profile defines a wireless interface for HID devices, and uses a Bluetooth RF interface standard for a communication with a host system.

For example, the control device 200 is an HID device, and when a power is input, the control device 200 may enter a standby state as a default and become an inquiry state to discover a neighboring device connectable thereto. The control device 200 in the inquiry state may transmit an inquiry message by using an ID packet one time or at specified regular intervals so as to discover a neighboring device connectable thereto. The first Bluetooth communication module 1510 of the display apparatus 100 may become an inquiry scan state to receive an ID packet being transmitted from a neighboring device in an inquiry state. The first Bluetooth communication module 1510 of the display apparatus 100 which functions in a master mode may receive the ID packet transmitted from the Bluetooth communication module 1530 of the control device 200, may transmit a Frequency Hopping Sequence (FHS) for Bluetooth pairing with the control device 200, and when required, e.g., when there is data to be transmitted, may transmit an Extended Inquiry Response (EIR). When a neighboring device connectable thereto is found via the inquiry procedure, a paging procedure may be performed. The paging procedure indicates a stage in which actual connection is performed by synchronizing a hopping sequence with an address, clock information, etc. When the inquiry procedure and the paging procedure are completed, the display apparatus 100 and the control device 200 may pass a security establishment procedure and then a L2CAP connection and service discovery stage. After passing the L2CAP connection and service discovery stage, the control device 200 may become a state capable of transmitting data input from a user to the display apparatus 100.

When the Bluetooth communication is connected according to the HID profile in operation S1601, class information and vendor ID (VID) and product ID (PID) of a device that is the control device 200 connected as an HID may be provided to the display apparatus 100.

Therefore, in operation S1602 according to Bluetooth communication connection according to the HID profile, the display apparatus 100 may recognize the control device 200 as an HID device. Also, in operation S1603, the control device 200 may be configured as an HID device.

Operations corresponding to operations S1601 to S1603 may be performed between the second Bluetooth communication module 1520 of the display apparatus 100 and the Bluetooth communication module 1540 of the source device 300. However, the second Bluetooth communication module 1520 may operate in the slave mode, in correspondence to the Bluetooth communication module 1540 of the source device 300 which operates in the master mode.

In operation S1604, the second Bluetooth communication module 1520 of the display apparatus 100 and the Bluetooth communication module 1540 of the source device 300 may perform a connection establishment operation according to a Bluetooth HID profile according to a Bluetooth communication procedure. As operation S1604 corresponds to operation S1601, descriptions thereof are not provided.

When the Bluetooth communication is connected according to the HID profile in operation S1604, class information and vendor ID (VID) and product ID (PID) of a device that is the display apparatus 100 connected as an HID may be provided to the source device 300.

Therefore, in operation S1605 according to Bluetooth communication connection according to the HID profile, the source device 300 may recognize the display apparatus 100 as an HID device. Also, in operation S1606, the display apparatus 100 may be configured as an HID device.

In operation S1607, the control device 200 may receive a user input. The control device 200 may receive the user input via the user input interface 230. A user input of the control device 200 implemented as a game pad may include a pressure of button, a position movement at a joystick, or the like.

In operation S1608, the control device 200 may generate an HID data report (HID class report descriptor) including a sensing value (a level of the pressure of button or position information of the joystick) of the control device 200, according to the user input.

In operation S1609, the control device 200 may transmit the HID data report including the sensing value of the control device 200 to the display apparatus 100. A header of all messages being relayed between an HID device and a host according to a Bluetooth communication protocol may be added a BT-HID Transaction Header (THdr). Therefore, the HID data report transmitted according to the Bluetooth communication protocol is generally similar to the HID data report transmitted according to the USB protocol, and is merely added a header to a head of a data packet.

In operation S1610, the first Bluetooth communication module 1510 of the display apparatus 100 may obtain a sensing value of the control device 200 from the HID data report.

In operation S1611, the first Bluetooth communication module 1510 of the display apparatus 100 may relay the sensing value of the control device 200 to the second Bluetooth communication module 1520.

In operation S1612, the second Bluetooth communication module 1520 of the display apparatus 100 may generate an HID data report (HID class report descriptor) by using the sensing value of the control device 200 relayed from the first Bluetooth communication module 1510.

In operation S1613, the second Bluetooth communication module 1520 of the display apparatus 100 may transmit the HID data report including the sensing value of the control device 200 to the source device 300.

In operation S1614, the source device 300 may obtain the sensing value of the control device 200 from the HID data report received from the display apparatus 100.

In operation S1615, the source device 300 may execute an application, based on the sensing value of the control device 200.

According to one or more embodiments of the disclosure, the display apparatus 100 may use one Bluetooth communication module to connect to the control device 200 and the source device 300 by time-division operating the one Bluetooth communication module. A fourth example will now be described with reference to FIGS. 17 to 18.

Figure 17:
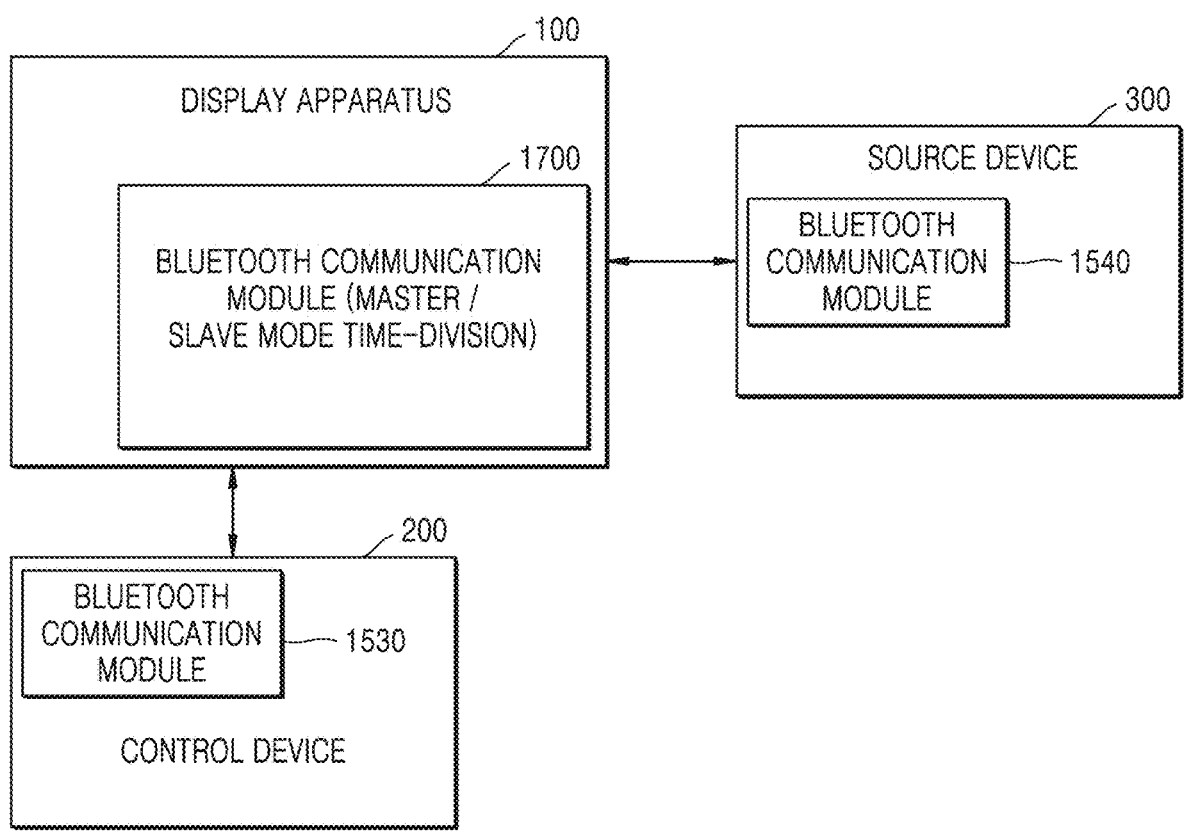
FIG. 17 illustrates an example of a system in which a display apparatus connects to a control device and a source device by using one Bluetooth communication module.

FIG. 17 illustrates an example of a system in which the display apparatus 100 connects to the control device 200 and the source device 300 by using one Bluetooth communication module.

Referring to FIG. 17, the display apparatus 100 may time-division operate a Bluetooth communication module 1700 in a master mode and a slave mode, may perform a data transception operation by connecting to the control device 200 in the master mode of the Bluetooth communication module 1700, and may perform a data transception operation by connecting to the source device 300 in the slave mode of the Bluetooth communication module 1700.

In the master mode of the Bluetooth communication module 1700 of the display apparatus 100, the Bluetooth communication module 1700 is connected to the control device 200, and thus, the display apparatus 100 may recognize the control device 200 as an HID device. In the slave mode of the Bluetooth communication module 1700 of the display apparatus 100, the Bluetooth communication module 1700 is connected to the source device 300, and thus, the display apparatus 100 may be recognized as an HID device with respect to the source device 300.

For the time-division operation of the Bluetooth communication module 1700, the Bluetooth communication module 1700 may be configured to switch between the master mode and the slave mode by using firmware or software. In order for one Bluetooth communication module to switch between a master mode and a slave mode, a configuration may be changed or a command may be transmitted to the Bluetooth communication module to perform switching, and thus, firmware or software may be reconfigured to operate in the master mode or the slave mode.

Figure 18:
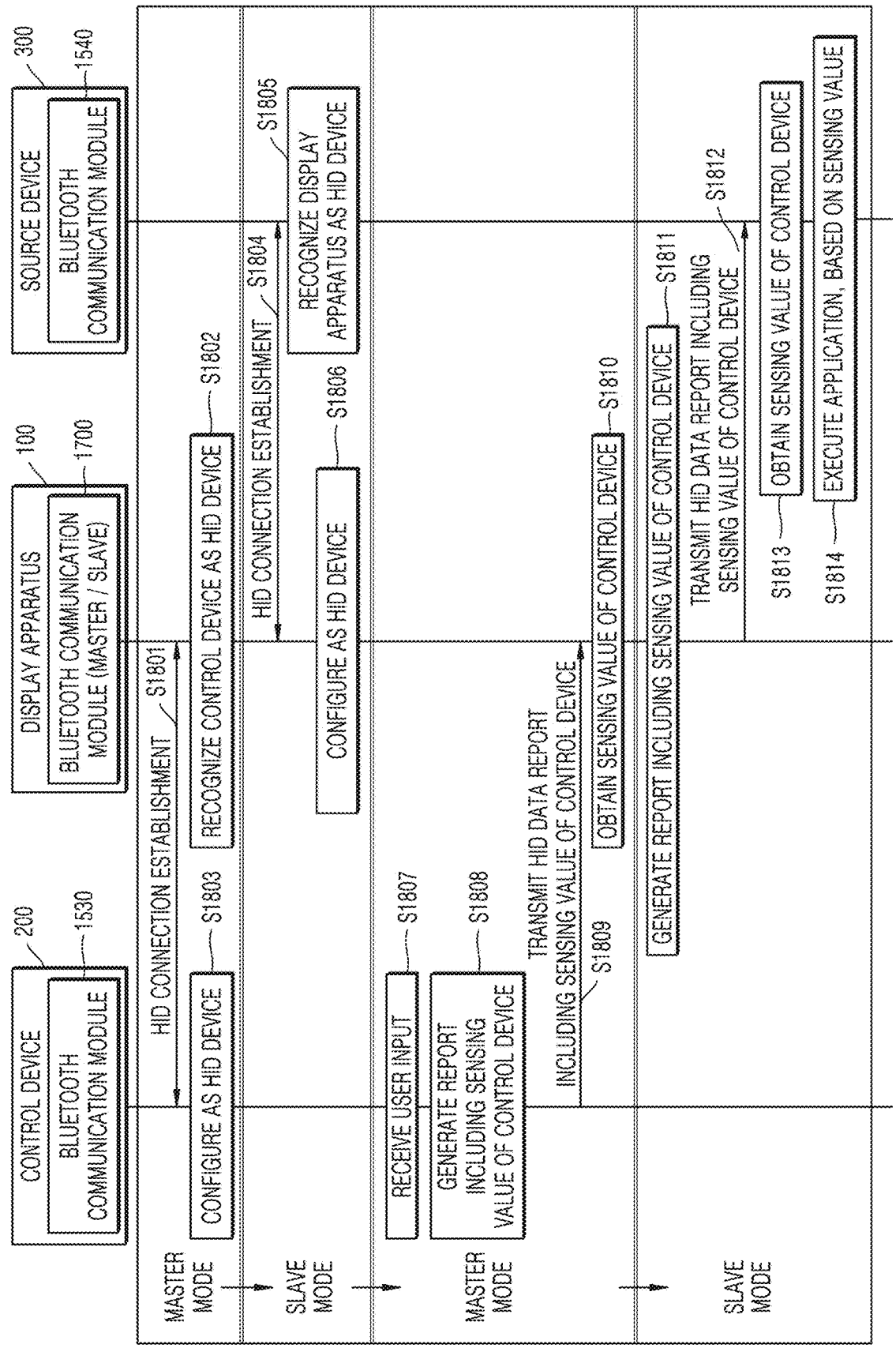
FIG. 18 illustrates an example of an operation in which a display apparatus relays a control signal in a system in which the display apparatus connects to a control device and a source device by using a Bluetooth communication module master/slave mode time-division operation, according to one or more embodiments of the disclosure.

FIG. 18 illustrates an example of an operation in which the display apparatus 100 relays a control signal in a system in which the display apparatus 100 connects to the control device 200 and the source device 300 by using a Bluetooth communication module master/slave mode time-division operation, according to one or more embodiments of the disclosure.

First, the display apparatus 100 may operate the Bluetooth communication module 1700 in a master mode to communication-connect to the control device 200.

In operation S1801, the Bluetooth communication module 1700 of the display apparatus 100 and the Bluetooth communication module 1530 of the control device 200 may perform a connection establishment operation according to a Bluetooth HID profile according to a Bluetooth communication procedure.

When the Bluetooth communication is connected according to the HID profile in operation S1801, class information and vendor ID (VID) and product ID (PID) of a device that is the control device 200 connected as an HID may be provided to the display apparatus 100.

Therefore, in operation S1802 according to Bluetooth communication connection according to the HID profile, the display apparatus 100 may recognize the control device 200 as an HID device. Also, in operation S1803, the control device 200 may be configured as an HID device.

Next, the display apparatus 100 may switch the Bluetooth communication module 1700 to a slave mode to communication-connect to the source device 300.

In operation S1804, the Bluetooth communication module 1700 of the display apparatus 100 and the Bluetooth communication module 1540 of the source device 300 may perform a connection establishment operation according to a Bluetooth HID profile according to a Bluetooth communication procedure.

When the Bluetooth communication is connected according to the HID profile in operation S1804, class information and vendor ID (VID) and product ID (PID) of a device that is the display apparatus 100 connected as an HID may be provided to the source device 300.

Therefore, in operation S1805 according to Bluetooth communication connection according to the HID profile, the source device 300 may recognize the display apparatus 100 as an HID device. Also, in operation S1806, the display apparatus 100 may be configured as an HID device.

Next, the display apparatus 100 may switch the Bluetooth communication module 1700 to a master mode to communicate with the control device 200.

In operation S1807, the control device 200 may receive a user input. The control device 200 may receive the user input via the user input interface 230. A user input of the control device 200 implemented as a game pad may include a pressure of button, a position movement at a joystick, or the like.

In operation S1808, the control device 200 may generate an HID data report (HID class report descriptor) including a sensing value (a level of the pressure of button or position information of the joystick) of the control device 200, according to the user input.

In operation S1809, the control device 200 may transmit the HID data report including the sensing value of the control device 200 to the display apparatus 100. A header of all messages being relayed between an HID device and a host according to a Bluetooth communication protocol may be added a BT-HID Transaction Header (THdr). Therefore, the HID data report transmitted according to the Bluetooth communication protocol is generally similar to the HID data report transmitted according to the USB protocol, and is merely added a header to a head of a data packet.

In operation S1810, the Bluetooth communication module 1700 of the display apparatus 100 may obtain a sensing value of the control device 200 from the HID data report.

Next, the display apparatus 100 may switch the Bluetooth communication module 1700 to a slave mode to communicate with the source device 300.

In operation S1811, the Bluetooth communication module 1700 of the display apparatus 100 may generate an HID data report (HID class report descriptor) by using the sensing value of the control device 200.

In operation S1812, the Bluetooth communication module 1700 of the display apparatus 100 may transmit the HID data report including the sensing value of the control device 200 to the source device 300.

In operation S1813, the source device 300 may obtain the sensing value of the control device 200 from the HID data report received from the display apparatus 100.

In operation S1814, the source device 300 may execute an application, based on the sensing value of the control device 200.

According to one or more embodiments of the disclosure, the display apparatus 100 may use a first frequency band of a Wi-Fi communication module as a first communication interface to connect to the control device 200, and may use a second frequency band of the Wi-Fi communication module as a second communication interface to connect to the source device 300. A fifth example will now be described with reference to FIGS. 19 to 20.

Figure 19:
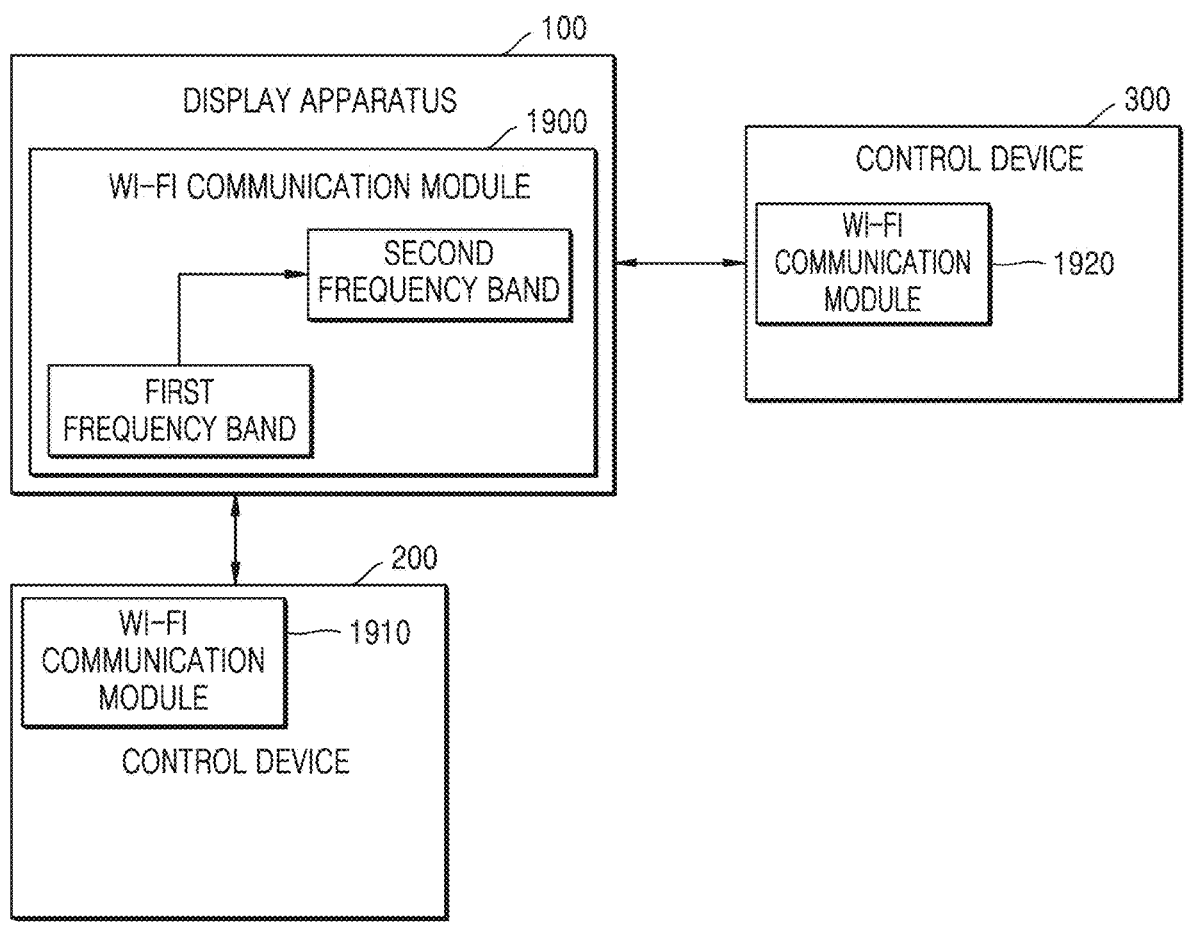
FIG. 19 illustrates an example of a system in which a display apparatus connects to a control device by using a first frequency band of a Wi-Fi communication module, and connects to a source device by using a second frequency band of the Wi-Fi communication module, according to one or more embodiments of the disclosure.

FIG. 19 illustrates an example of a system in which the display apparatus 100 connects to the control device 200 by using a first frequency band of a Wi-Fi communication module, and connects to the source device 300 by using a second frequency band of the Wi-Fi communication module, according to one or more embodiments of the disclosure.

Referring to FIG. 19, the display apparatus 100 may connect to the control device 200 including a Wi-Fi communication module 1910, according to a Wi-Fi direct communication, by using a first frequency band of a Wi-Fi communication module 1900. The display apparatus 100 may connect to the source device 300 including a Wi-Fi communication module 1920, according to the Wi-Fi direct communication, by using a second frequency band of the Wi-Fi communication module 1900.

Wi-Fi is a brand name of Wi-Fi Alliance, and indicates a series of technologies that support wireless LAN connection based on IEEE 802.11, connection between devices (Wi-Fi P2P), Personal Area Network (PAN)/Local Area Network (LAN)/Wide Area Network (WAN) configuration, and the like. Wi-Fi Direct indicates that devices having Wi-Fi embedded therein directly communicate with each other without passing an access point (AP) that supports an access between Wi-Fi devices. The name of the technology is <Wi-Fi Peer-to-Peer (P2P) Technical Specification>. Wi-Fi uses frequencies of a 2.4-GHz band and a 5-GHz band which are designated as an Industrial Scientific and Medical Band (ISM band).

The first frequency band of the Wi-Fi communication module 1900 may indicate one of the 2.4-GHz band and the 5-GHz band, and the second frequency band may indicate the other one of the 2.4-GHz band and the 5-GHz band.

Figure 20:
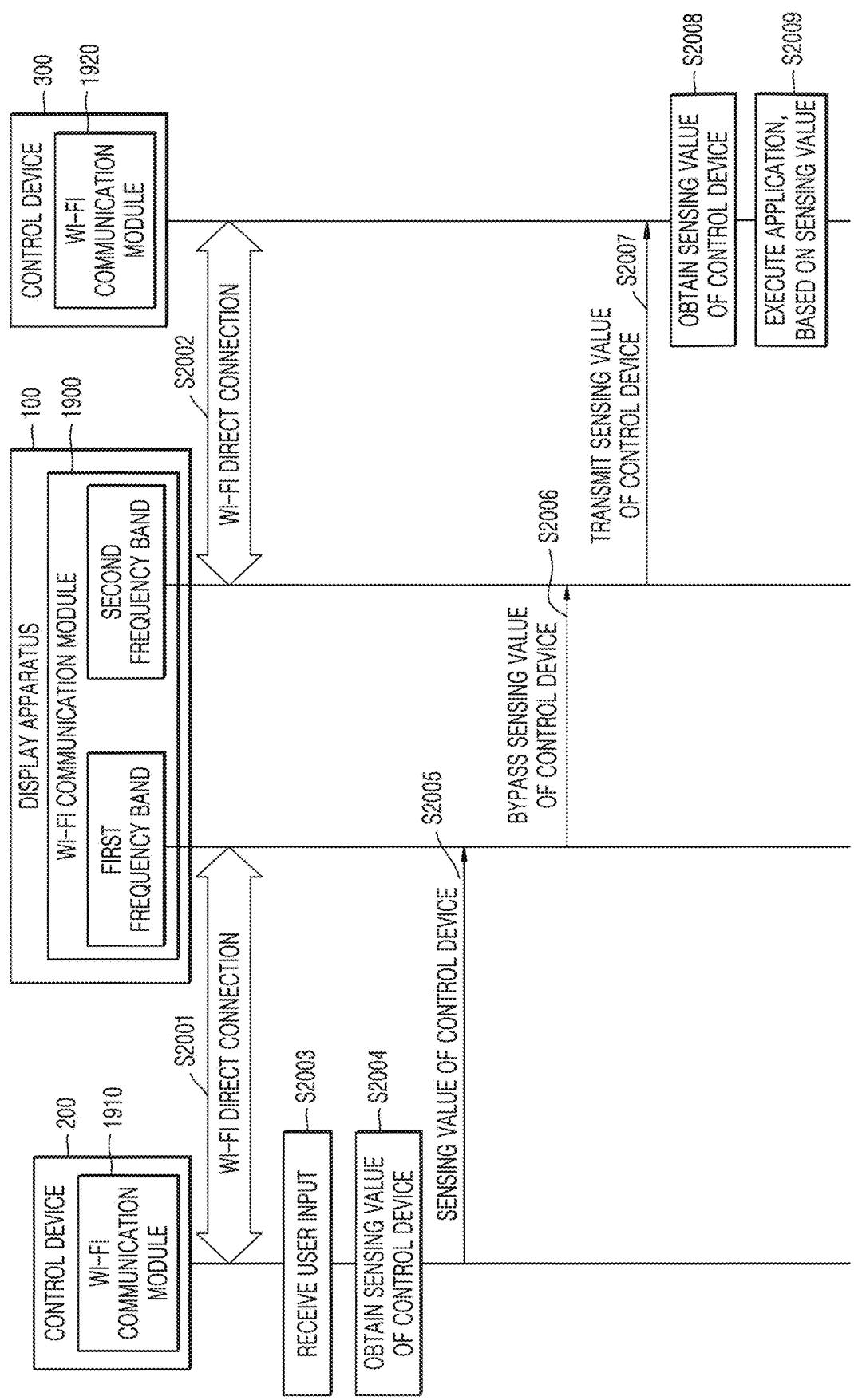
FIG. 20 illustrates an example of an operation in which a display apparatus relays a control signal in a system in which the display apparatus connects to a control device by using a first frequency band of a Wi-Fi communication module and connects to a source device by using a second frequency band of the Wi-Fi communication module, according to one or more embodiments of the disclosure.

FIG. 20 illustrates an example of an operation in which the display apparatus 100 relays a control signal in a system in which the display apparatus 100 connects to the control device 200 by using a first frequency band of a Wi-Fi communication module and connects to the source device 300 by using a second frequency band of the Wi-Fi communication module, according to one or more embodiments of the disclosure.

In operation S2001, the display apparatus 100 may Wi-Fi Direct communication-connect to the Wi-Fi communication module 1910 of the control device 200 in the first frequency band of the Wi-Fi communication module 1900.

A P2P device discovery indicates that two P2P devices access a common channel and exchange device information such as a device name and a device type, so that a device discovers a neighboring device and establishes connection. The device discovery may include a scan operation, a find operation, and a group set operation. In the scan operation, the control device 200 and the display apparatus 100 transmit a probe request frame to each other. In the find operation, the control device 200 transmits a probe response frame to the display apparatus 100, in response to the probe request frame transmitted from the display apparatus 100 to the control device 200, so that the display apparatus 100 and the control device 200 find each other. The find operation is used for two P2P devices that simultaneously perform searching are guaranteed to access a common channel and be enabled for communication. A P2P device in the scan operation may find a P2P device in a listen state. In the group set operation, one device may become a P2P group owner and determine whether to form a new P2P group. Through these operations, the display apparatus 100 may Wi-Fi communication-connect to the control device 200 in the first frequency band.

In operation S2002, the display apparatus 100 may Wi-Fi Direct communication-connect to the Wi-Fi communication module 1920 of the source device 300 in the second frequency band of the Wi-Fi communication module 1900. As operation S2002 corresponds to content of operation S2001, descriptions thereof are not provided here.

In operation S2003, the control device 200 may receive a user input. The control device 200 may receive the user input via the user input interface 230. A user input of the control device 200 implemented as a game pad may include a pressure of button, a position movement at a joystick, or the like.

In operation S2004, the control device 200 may generate a sensing value (a level of the pressure of button or position information of the joystick) of the control device 200, according to the user input.

In operation S2005, the control device 200 may transmit the sensing value of the control device 200 to the display apparatus 100.

In operation S2006, the Wi-Fi communication module 1900 of the display apparatus 100 may bypass the sensing value of the control device 200 received in the first frequency band to the second frequency band.

In operation S2007, the Wi-Fi communication module 1900 of the display apparatus 100 may transmit the sensing value of the control device 200 in the second frequency band to the source device 300.

In operation S2008, the source device 300 may obtain the sensing value of the control device 200 which is received from the display apparatus 100.

In operation S2009, the source device 300 may execute an application, based on the sensing value of the control device 200.

According to one or more embodiments of the disclosure, the display apparatus 100 may use a Bluetooth communication module as the first communication interface to connect to the control device 200, and may use an upstream USB port as the second communication interface to connect to the source device 300. A sixth example will now be described with reference to FIGS. 21 to 22.

Figure 21:
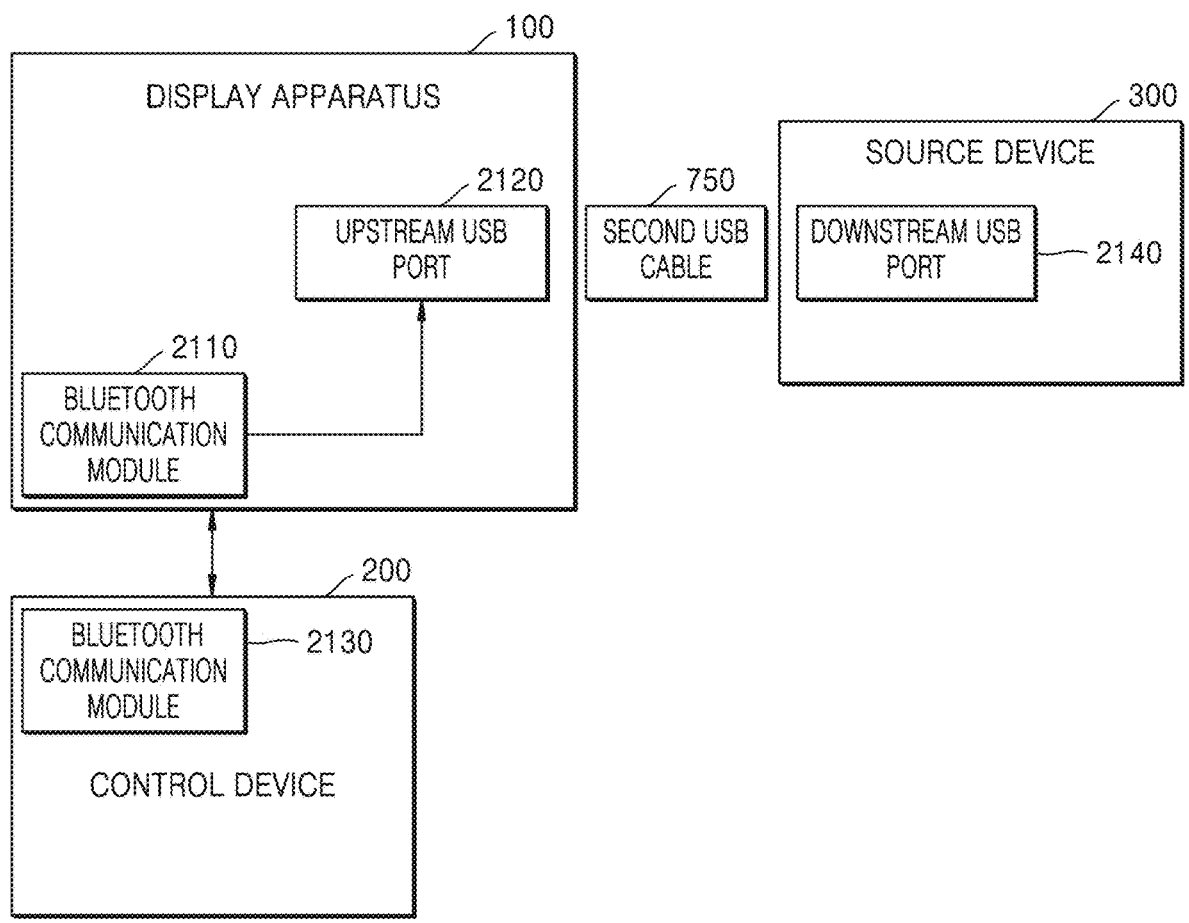
FIG. 21 illustrates an example of a system in which a display apparatus connects to a control device by using a Bluetooth communication module and connects to a source device by using an upstream USB port, according to one or more embodiments of the disclosure.

FIG. 21 illustrates an example of a system in which the display apparatus 100 connects to the control device 200 by using a Bluetooth communication module and connects to the source device 300 by using an upstream USB port, according to one or more embodiments of the disclosure.

Referring to FIG. 21, the display apparatus 100 may connect to the control device 200 by using a Bluetooth communication module 2110. The Bluetooth communication module 2110 of the display apparatus 100 may be Bluetooth communication-connected to a Bluetooth communication module 2130 of the control device 200. According to the connection, the display apparatus 100 may recognize the control device 200 as an HID. The Bluetooth communication module 2110 of the display apparatus 100 may operate in a master mode, and the Bluetooth communication module 2130 of the control device 200 may operate in a slave mode. Bluetooth HID devices refer to devices are devices configured to provide a service that provides an input from a human to an application program being executed in a host. For example, the Bluetooth HID devices may include a mouse, a keyboard, a joystick, etc., and a plurality of HIDs may be connected to one host. Due to this reason, in general, the Bluetooth HID devices may be implemented as slaves in a Bluetooth HID protocol.

The display apparatus 100 may connect to the source device 300 by using an upstream USB port 2120. The upstream USB port 2120 of the display apparatus 100 may be USB communication-connected to a downstream USB port 2140 of the source device 300. According to the connection, the source device 300 may recognize the display apparatus 100 as an HID.

Figure 22:
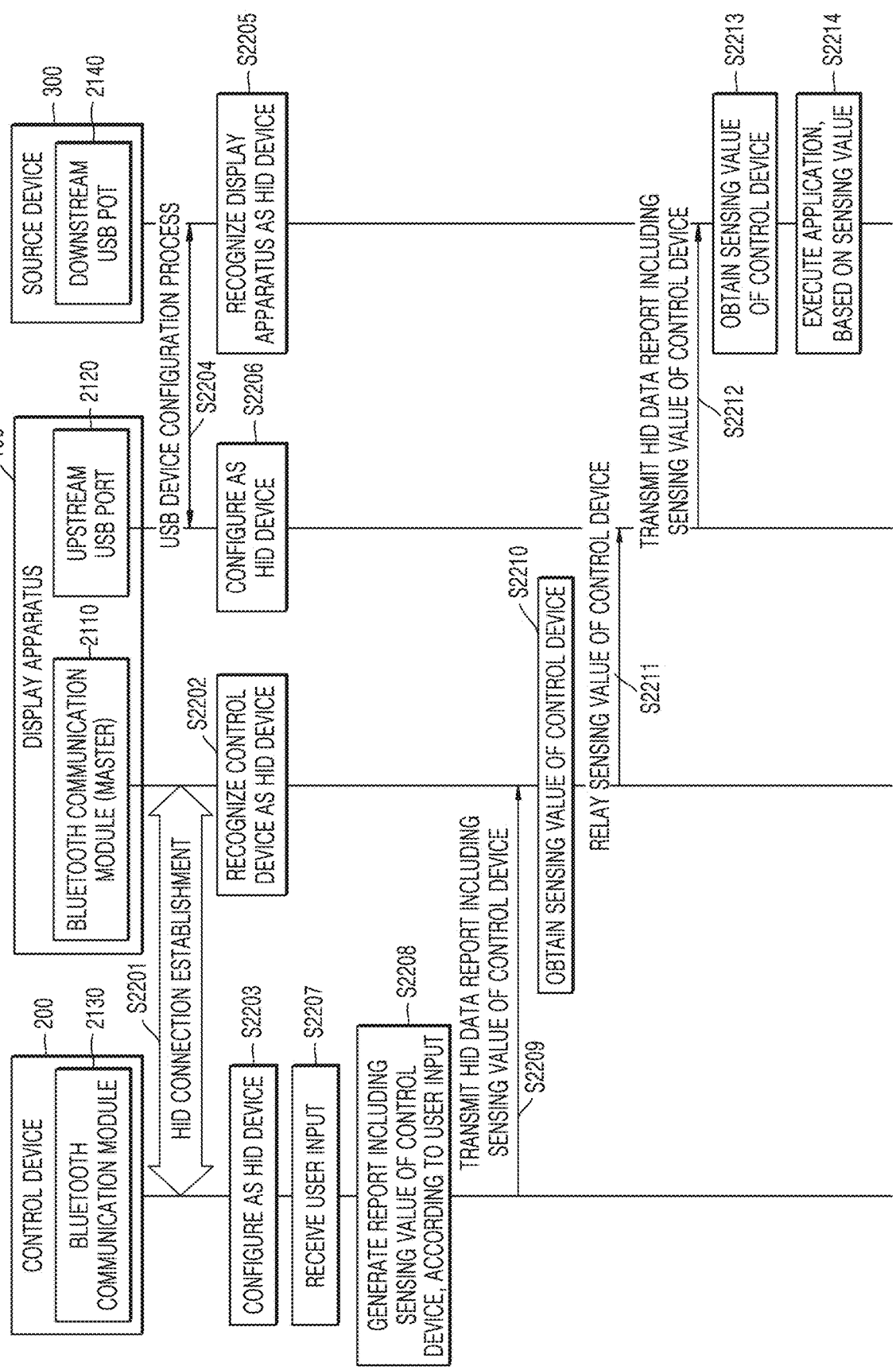
FIG. 22 illustrates an example of an operation in which a display apparatus relays a control signal in a system in which the display apparatus connects to a control device by using a Bluetooth communication module and connects to a source device by using a downstream USB port, according to one or more embodiments of the disclosure.

FIG. 22 illustrates an example of an operation in which the display apparatus 100 relays a control signal in a system in which the display apparatus 100 connects to the control device 200 by using a Bluetooth communication module and connects to the source device 300 by using a downstream USB port, according to one or more embodiments of the disclosure.

In operation S2201, the Bluetooth communication module 2110 of the display apparatus 100 and the Bluetooth communication module 2130 of the control device 200 may perform a connection establishment operation according to a Bluetooth HID profile according to a Bluetooth communication procedure. The Bluetooth HID (BT-HID) profile defines a wireless interface for HID devices, and uses a Bluetooth RF interface standard for a communication with a host system.

For example, the control device 200 is an HID device, and when a power is input, the control device 200 may enter a standby state as a default and become an inquiry state to discover a neighboring device connectable thereto. The control device 200 in the inquiry state may transmit an inquiry message by using an ID packet one time or at specified regular intervals so as to discover a neighboring device connectable thereto. The Bluetooth communication module 2110 of the display apparatus 100 may become an inquiry scan state to receive an ID packet being transmitted from a neighboring device in an inquiry state. The Bluetooth communication module 2110 of the display apparatus 100 which functions in a master mode may receive the ID packet transmitted from the Bluetooth communication module 2130 of the control device 200, may transmit a FHS for Bluetooth pairing with the control device 200, and when required, e.g., when there is data to be transmitted, may transmit an EIR. When a neighboring device connectable thereto is found via the inquiry procedure, a paging procedure may be performed. The paging procedure indicates a stage in which actual connection is performed by synchronizing a hopping sequence with an address, clock information, etc. When the inquiry procedure and the paging procedure are completed, the display apparatus 100 and the control device 200 may pass a security establishment procedure and then a L2CAP connection and service discovery stage. After passing the L2CAP connection and service discovery stage, the control device 200 may become a state capable of transmitting data input from a user to the display apparatus 100.

When the Bluetooth communication is connected according to the HID profile in operation S2201, class information and vendor ID (VID) and product ID (PID) of a device that is the control device 200 connected as an HID may be provided to the display apparatus 100.

Therefore, in operation S2202 according to Bluetooth communication connection according to the HID profile, the display apparatus 100 may recognize the control device 200 as an HID device. Also, in operation S2203, the control device 200 may be configured as an HID device.

In operation S2204, the display apparatus 100 may perform a USB device configuration process on the source device 300 connected to the upstream USB port 2120.

As the USB device configuration process is performed, in operation S2205, the source device 300 may recognize the display apparatus 100 as an HID device, and in operation S2206, the display apparatus 100 may be configured as the HID device.

In operation S2207, the control device 200 may receive a user input. The control device 200 may receive the user input via the user input interface 230. A user input of the control device 200 implemented as a game pad may include a pressure of button, a position movement at a joystick, or the like.

In operation S2208, the control device 200 may generate an HID data report (HID class report descriptor) including a sensing value (a level of the pressure of button or position information of the joystick) of the control device 200, according to the user input.

In operation S2209, the control device 200 may transmit the HID data report including the sensing value of the control device 200 to the display apparatus 100. A header of all messages being relayed between an HID device and a host according to a Bluetooth communication protocol may be added a BT-HID Transaction Header (THdr). Therefore, the HID data report transmitted according to the Bluetooth communication protocol is generally similar to the HID data report transmitted according to the USB protocol, and is merely added a header to a head of a data packet.

In operation S2210, the Bluetooth communication module 2110 of the display apparatus 100 may obtain a sensing value of the control device 200 from the HID data report.

In operation S2211, the Bluetooth communication module 2110 of the display apparatus 100 may bypass the sensing value of the control device 200 to the upstream USB port 2120.

In operation S2212, the upstream USB port 2120 of the display apparatus 100 may receive an HID data request (HID class report descriptor request) from the source device 300.

In operation S2213, the upstream USB port 2120 of the display apparatus 100 may generate an HID data report (HID class report descriptor) by using the sensing value of the control device 200 relayed from the Bluetooth communication module 2110. In detail, the display apparatus 100 may generate the HID data report (HID class report descriptor) including the sensing value of the control device 200.

In operation S2214, the upstream USB port 2120 of the display apparatus 100 may transmit the HID data report including the sensing value of the control device 200 to the source device 300. In this regard, as the display apparatus 100 changelessly relay the sensing value of the control device 200, which is received by using a downstream USB port without using virtual USB device software, to the source device 300 by using an upstream USB port, it may be referred that the sensing value of the control device 200 is bypassed.

In operation S2215, the source device 300 may obtain the sensing value of the control device 200 from the HID data report received from the display apparatus 100.

In operation S2216, the source device 300 may execute an application, based on the sensing value of the control device 200.

According to one or more embodiments of the disclosure, the display apparatus 100 may use a Bluetooth communication module as a first communication interface to connect to the control device 200, and may use a downstream USB port as a second communication interface to connect to the source device 300. A seventh example will now be described with reference to FIGS. 23 to 24.

Figure 23:
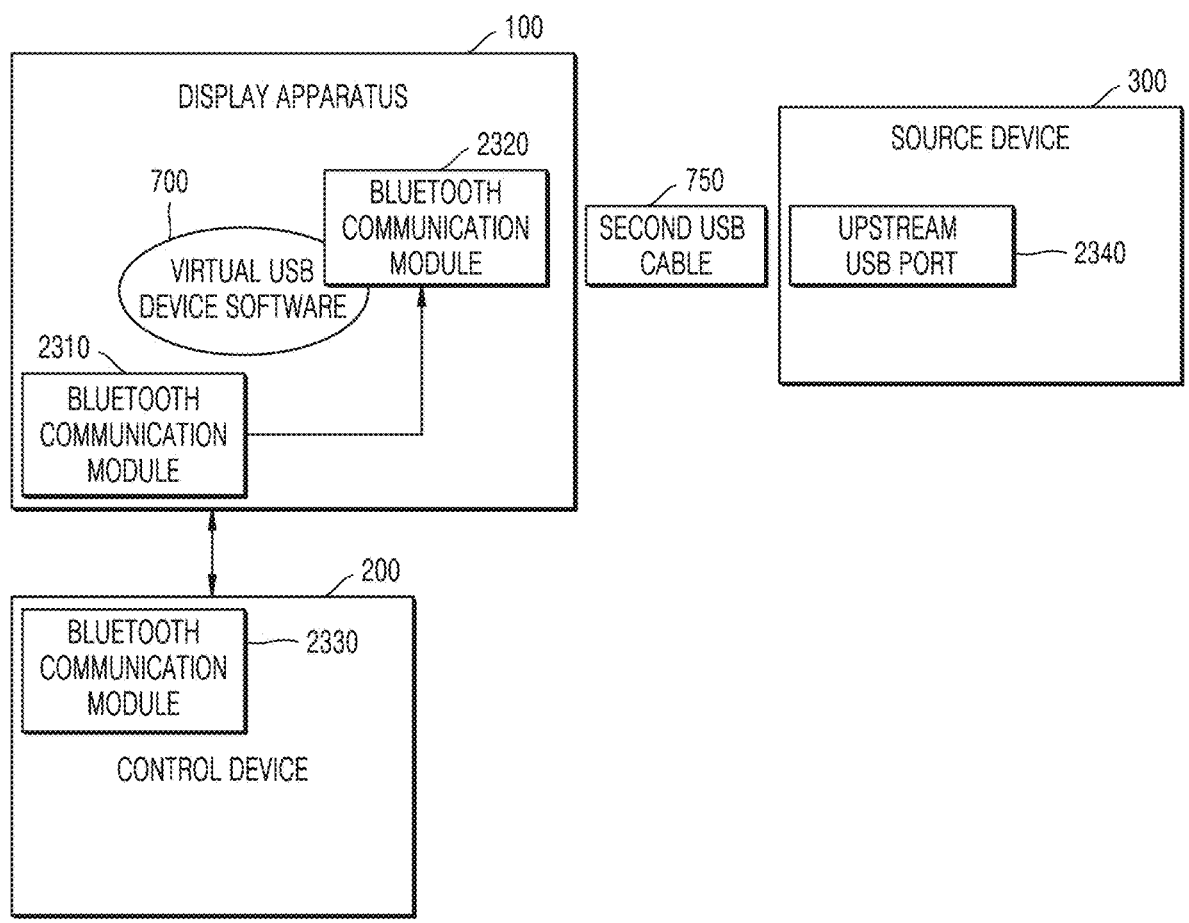
FIG. 23 illustrates an example of a system in which a display apparatus connects to a control device by using a Bluetooth communication module and connects to a source device by using a downstream USB port, according to one or more embodiments of the disclosure.

FIG. 23 illustrates an example of a system in which the display apparatus 100 connects to the control device 200 by using the Bluetooth communication module and connects to the source device 300 by using the downstream USB port, according to one or more embodiments of the disclosure.

Referring to FIG. 23, the display apparatus 100 may connect to the control device 200 by using a Bluetooth communication module 2310. The Bluetooth communication module 2310 of the display apparatus 100 may be Bluetooth communication-connected to a Bluetooth communication module 2330 of the control device 200. According to the connection, the display apparatus 100 may recognize the control device 200 as an HID. The Bluetooth communication module 2310 of the display apparatus 100 may operate in a master mode, and the Bluetooth communication module 2330 of the control device 200 may operate in a slave mode. Bluetooth HID devices refer to devices are devices configured to provide a service that provides an input from a human to an application program being executed in a host. For example, the Bluetooth HID devices may include a mouse, a keyboard, a joystick, etc., and a plurality of HIDs may be connected to one host. Due to this reason, in general, the Bluetooth HID devices may be implemented as slaves in a Bluetooth HID protocol.

The display apparatus 100 may connect to the source device 300 by using a downstream USB port 2320. The downstream USB port 2320 of the display apparatus 100 may be USB communication-connected to an upstream USB port 2340 of the source device 300. According to the connection, the source device 300 may recognize the display apparatus 100 as an HID. The display apparatus 100 may use the virtual USB device software 700 to process a process for allowing the source device 300 to recognize the display apparatus 100 as an HID.

Figure 24:
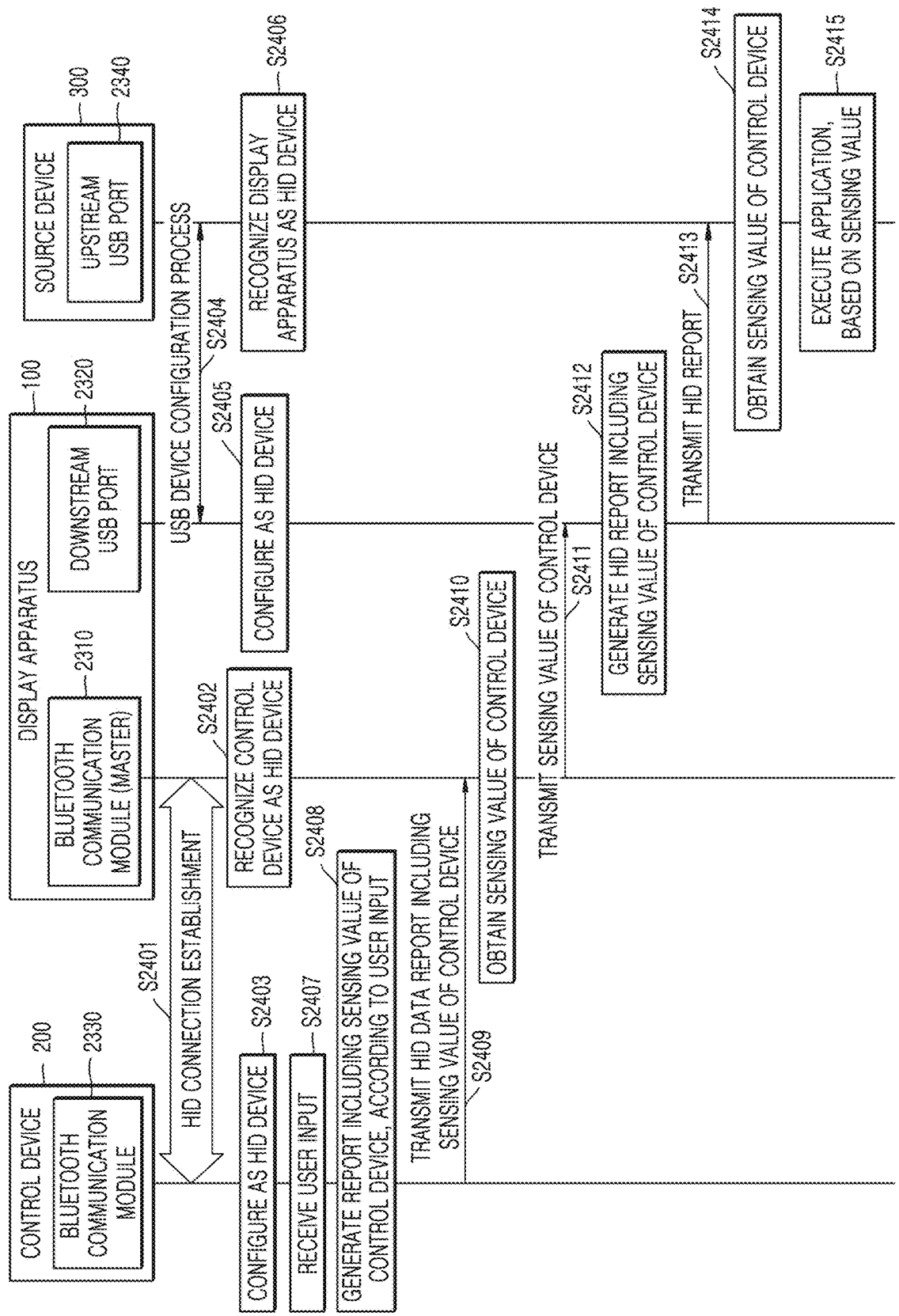
FIG. 24 illustrates an example of an operation in which a display apparatus relays a control signal in a system in which the display apparatus connects to a control device by using a Bluetooth communication module and connects to a source device by using a downstream USB port, according to one or more embodiments of the disclosure.

FIG. 24 illustrates an example of an operation in which the display apparatus 100 relays a control signal in a system in which the display apparatus 100 connects to the control device 200 by using a Bluetooth communication module and connects to the source device 300 by using a downstream USB port, according to one or more embodiments of the disclosure.

In operation S2401, the Bluetooth communication module 2310 of the display apparatus 100 and the Bluetooth communication module 2330 of the control device 200 may perform a connection establishment operation according to a Bluetooth HID profile according to a Bluetooth communication procedure. The Bluetooth HID (BT-HID) profile defines a wireless interface for HID devices, and uses a Bluetooth RF interface standard for a communication with a host system.

For example, the control device 200 is an HID device, and when a power is input, the control device 200 may enter a standby state as a default and become an inquiry state to discover a neighboring device connectable thereto. The control device 200 in the inquiry state may transmit an inquiry message by using an ID packet one time or at specified regular intervals so as to discover a neighboring device connectable thereto. The Bluetooth communication module 2310 of the display apparatus 100 may become an inquiry scan state to receive an ID packet being transmitted from a neighboring device in an inquiry state. The Bluetooth communication module 2310 of the display apparatus 100 which functions in a master mode may receive the ID packet transmitted from the Bluetooth communication module 2330 of the control device 200, may transmit a FHS for Bluetooth pairing with the control device 200, and when required, e.g., when there is data to be transmitted, may transmit an EIR. When a neighboring device connectable thereto is found via the inquiry procedure, a paging procedure may be performed. The paging procedure indicates a stage in which actual connection is performed by synchronizing a hopping sequence with an address, clock information, etc. When the inquiry procedure and the paging procedure are completed, the display apparatus 100 and the control device 200 may pass a security establishment procedure and then a L2CAP connection and service discovery stage. After passing the L2CAP connection and service discovery stage, the control device 200 may become a state capable of transmitting data input from a user to the display apparatus 100.

When the Bluetooth communication is connected according to the HID profile in operation S2401, class information and vendor ID (VID) and product ID (PID) of a device that is the control device 200 connected as an HID may be provided to the display apparatus 100.

Therefore, in operation S2402 according to Bluetooth communication connection according to the HID profile, the display apparatus 100 may recognize the control device 200 as an HID device. Also, in operation S2403, the control device 200 may be configured as an HID device.

In operation S2404, the display apparatus 100 may perform a USB device configuration process on the source device 300 connected to the downstream USB port 2320.

As the USB device configuration process is performed, in operation S2405, the display apparatus 100 may be configured as an HID device, and in operation S2406, the source device 300 may recognize the display apparatus 100 as the HID device. Here, the display apparatus 100 may perform the USB device configuration process by using virtual USB device software as described with reference to FIG. 10, so as to allow the source device 300 to recognize the display apparatus 100 as an HID.

In operation S2407, the control device 200 may receive a user input. The control device 200 may receive the user input via the user input interface 230. A user input of the control device 200 implemented as a game pad may include a pressure of button, a position movement at a joystick, or the like.

In operation S2408, the control device 200 may generate an HID data report (HID class report descriptor) including a sensing value (a level of the pressure of button or position information of the joystick) of the control device 200, according to the user input.

In operation S2409, the control device 200 may transmit the HID data report including the sensing value of the control device 200 to the display apparatus 100. A header of all messages being relayed between an HID device and a host according to a Bluetooth communication protocol may be added a BT-HID Transaction Header (THdr). Therefore, the HID data report transmitted according to the Bluetooth communication protocol is generally similar to the HID data report transmitted according to the USB protocol, and is merely added a header to a head of a data packet.

In operation S2410, the Bluetooth communication module 2310 of the display apparatus 100 may obtain the sensing value of the control device 200 from the HID data report.

In operation S2411, the Bluetooth communication module 2310 of the display apparatus 100 may relay the sensing value of the control device 200 to the downstream USB port 2320.

In operation S2412, the downstream USB port 2320 of the display apparatus 100 may generate an HID data report (HID class report descriptor) by using the sensing value of the control device 200 relayed from the Bluetooth communication module 2310. In detail, the display apparatus 100 may generate the HID data report (HID class report descriptor) including the sensing value of the control device 200 by using the virtual USB device software 700 of the display apparatus 100.

In operation S2413, the downstream USB port 2320 of the display apparatus 100 may transmit the HID data report including the sensing value of the control device 200 to the source device 300.

In operation S2414, the source device 300 may obtain the sensing value of the control device 200 from the HID data report received from the display apparatus 100.

In operation S2415, the source device 300 may execute an application, based on the sensing value of the control device 200.

According to one or more embodiments of the disclosure, the display apparatus 100 may use a Bluetooth communication module as a first communication interface to connect to the control device 200, and may use a Wi-Fi communication module as a second communication interface to connect to the source device 300. An eighth example will now be described with reference to FIGS. 25 to 26.

Figure 25:
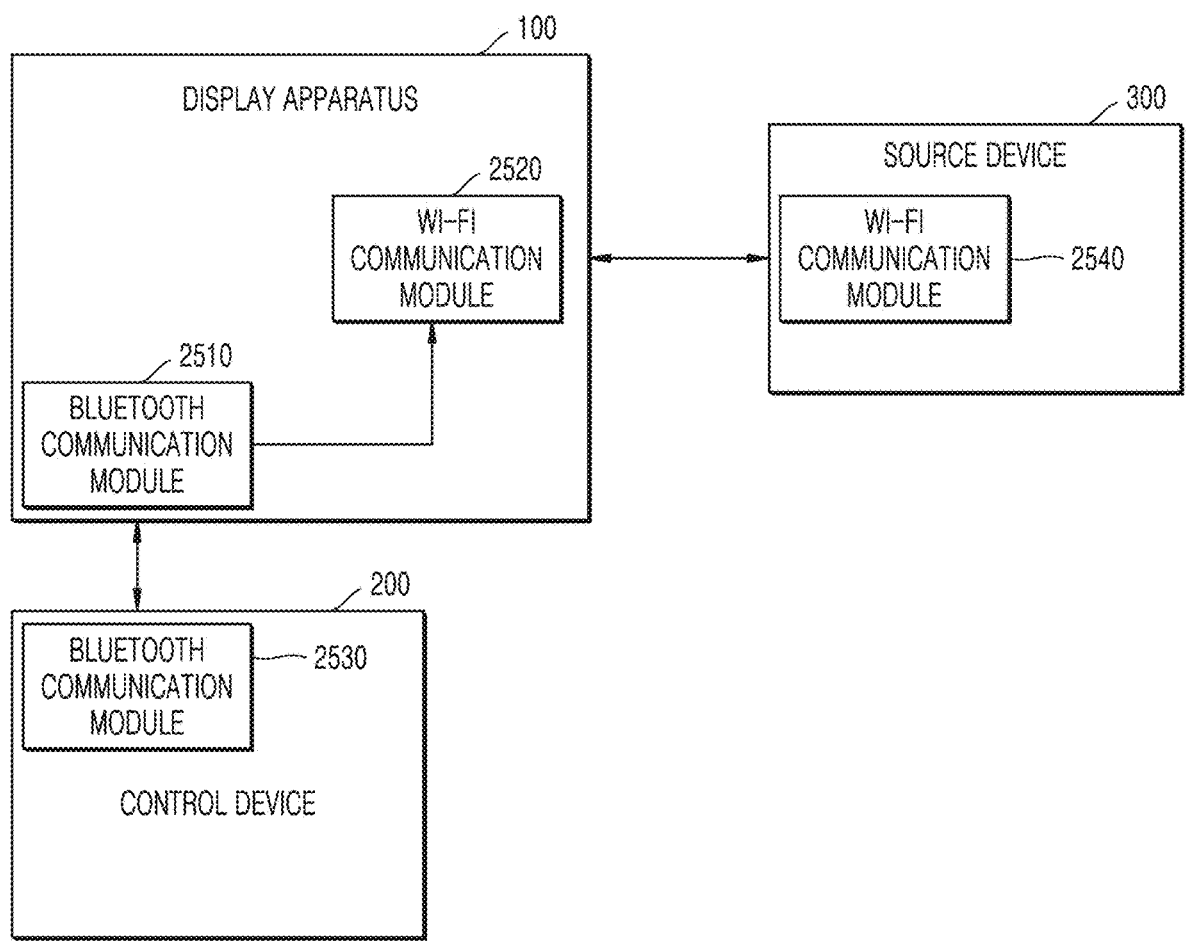
FIG. 25 illustrates an example of a system in which a display apparatus connects to a control device by using a Bluetooth communication module and connects to a source device by using a Wi-Fi communication module, according to one or more embodiments of the disclosure.

FIG. 25 illustrates an example of a system in which the display apparatus 100 connects to the control device 200 by using the Bluetooth communication module and connects to the source device 300 by using the Wi-Fi communication module, according to one or more embodiments of the disclosure.

Referring to FIG. 25, the display apparatus 100 may connect to the control device 200 by using a Bluetooth communication module 2510. The Bluetooth communication module 2510 of the display apparatus 100 may be Bluetooth communication-connected to a Bluetooth communication module 2530 of the control device 200. According to the connection, the display apparatus 100 may recognize the control device 200 as an HID. The Bluetooth communication module 2510 of the display apparatus 100 may operate in a master mode, and the Bluetooth communication module 2530 of the control device 200 may operate in a slave mode. Bluetooth HID devices refer to devices are devices configured to provide a service that provides an input from a human to an application program being executed in a host. For example, the Bluetooth HID devices may include a mouse, a keyboard, a joystick, etc., and a plurality of HIDs may be connected to one host. Due to this reason, in general, the Bluetooth HID devices may be implemented as slaves in a Bluetooth HID protocol.

The display apparatus 100 may connect to the source device 300 by using a Wi-Fi communication module 2520. The Wi-Fi communication module 2520 of the display apparatus 100 may be Wi-Fi communication-connected to a Wi-Fi communication module 2540 of the source device 300.

Figure 26:
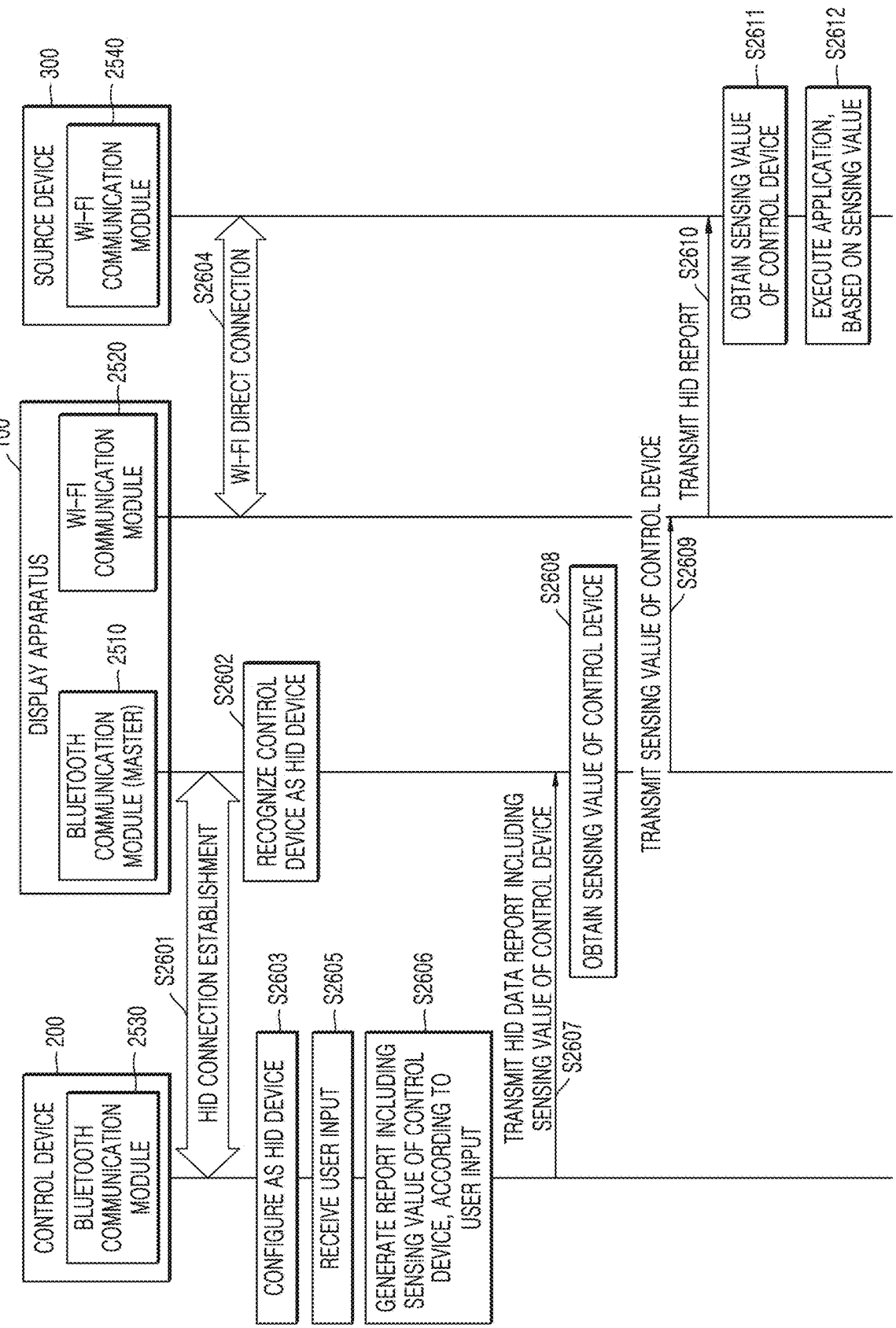
FIG. 26 illustrates an example of an operation in which a display apparatus relays a control signal in a system in which the display apparatus connects to a control device by using a Bluetooth communication module and connects to a source device by using a Wi-Fi communication module, according to one or more embodiments of the disclosure.

FIG. 26 illustrates an example of an operation in which the display apparatus 100 relays a control signal in a system in which the display apparatus 100 connects to the control device 200 by using a Bluetooth communication module and connects to the source device 300 by using a Wi-Fi communication module, according to one or more embodiments of the disclosure.

In operation S2601, the Bluetooth communication module 2510 of the display apparatus 100 and the Bluetooth communication module 2530 of the control device 200 may perform a connection establishment operation according to a Bluetooth HID profile according to a Bluetooth communication procedure. The Bluetooth HID (BT-HID) profile defines a wireless interface for HID devices, and uses a Bluetooth RF interface standard for a communication with a host system.

For example, the control device 200 is an HID device, and when a power is input, the control device 200 may enter a standby state as a default and become an inquiry state to discover a neighboring device connectable thereto. The control device 200 in the inquiry state may transmit an inquiry message by using an ID packet one time or at specified regular intervals so as to discover a neighboring device connectable thereto. The Bluetooth communication module 2510 of the display apparatus 100 may become an inquiry scan state to receive an ID packet being transmitted from a neighboring device in an inquiry state. The Bluetooth communication module 2510 of the display apparatus 100 which functions in a master mode may receive the ID packet transmitted from the Bluetooth communication module 2530 of the control device 200, may transmit a FHS for Bluetooth pairing with the control device 200, and when required, e.g., when there is data to be transmitted, may transmit an EIR. When a neighboring device connectable thereto is found via the inquiry procedure, a paging procedure may be performed. The paging procedure indicates a stage in which actual connection is performed by synchronizing a hopping sequence with an address, clock information, etc. When the inquiry procedure and the paging procedure are completed, the display apparatus 100 and the control device 200 may pass a security establishment procedure and then a L2CAP connection and service discovery stage. After passing the L2CAP connection and service discovery stage, the control device 200 may become a state capable of transmitting data input from a user to the display apparatus 100.

When the Bluetooth communication is connected according to the HID profile in operation S2601, class information and vendor ID (VID) and product ID (PID) of a device that is the control device 200 connected as an HID may be provided to the display apparatus 100.

Therefore, in operation S2602 according to Bluetooth communication connection according to the HID profile, the display apparatus 100 may recognize the control device 200 as an HID device. Also, in operation S2603, the control device 200 may be configured as an HID device.

In operation S2603, the display apparatus 100 may Wi-Fi Direct communication-connect to the source device 300 by using the Wi-Fi communication module 2520.

A P2P device discovery indicates that two P2P devices access a common channel and exchange device information such as a device name and a device type, so that a device discovers a neighboring device and establishes connection. The device discovery may include a scan operation, a find operation, and a group set operation. In the scan operation, the source device 300 and the display apparatus 100 transmit a probe request frame to each other. In the find operation, the source device 300 transmits a probe response frame to the display apparatus 100, in response to the probe request frame transmitted from the display apparatus 100 to the source device 300, so that the display apparatus 100 and the source device 300 find each other. The find operation is used for two P2P devices that simultaneously perform searching are guaranteed to access a common channel and be enabled for communication. A P2P device in the scan operation may find a P2P device in a listen state. In the group set operation, one device may become a P2P group owner and determine whether to form a new P2P group. Through these operations, the display apparatus 100 may Wi-Fi communication-connect to the source device 300.

In operation S2605, the control device 200 may receive a user input. The control device 200 may receive the user input via the user input interface 230. A user input of the control device 200 implemented as a game pad may include a pressure of button, a position movement at a joystick, or the like.

In operation S2606, the control device 200 may generate an HID data report (HID class report descriptor) including a sensing value (a level of the pressure of button or position information of the joystick) of the control device 200, according to the user input.

In operation S2607, the control device 200 may transmit the HID data report including the sensing value of the control device 200 to the display apparatus 100. A header of all messages being relayed between an HID device and a host according to a Bluetooth communication protocol may be added a BT-HID Transaction Header (THdr). Therefore, the HID data report transmitted according to the Bluetooth communication protocol is generally similar to the HID data report transmitted according to the USB protocol, and is merely added a header to a head of a data packet.

In operation S2608, the Bluetooth communication module 2510 of the display apparatus 100 may obtain a sensing value of the control device 200 from the HID data report.

In operation S2609, the Bluetooth communication module 2510 of the display apparatus 100 may transmit the sensing value of the control device 200 to the Wi-Fi communication module 2520.

In operation S2610, the Wi-Fi communication module 2520 of the display apparatus 100 may relay, to the source device 300, the sensing value of the control device 200 received from the Bluetooth communication module 2510.

In operation S2611, the source device 300 may obtain the sensing value of the control device 200 received from the display apparatus 100.

In operation S2612, the source device 300 may execute an application, based on the sensing value of the control device 200.

According to one or more embodiments of the disclosure, the display apparatus 100 may use a downstream USB port as a first communication interface to connect to the control device 200, and may use a Bluetooth communication module as a second communication interface to connect to the source device 300. A ninth example will now be described with reference to FIGS. 27 to 28.

Figure 27:
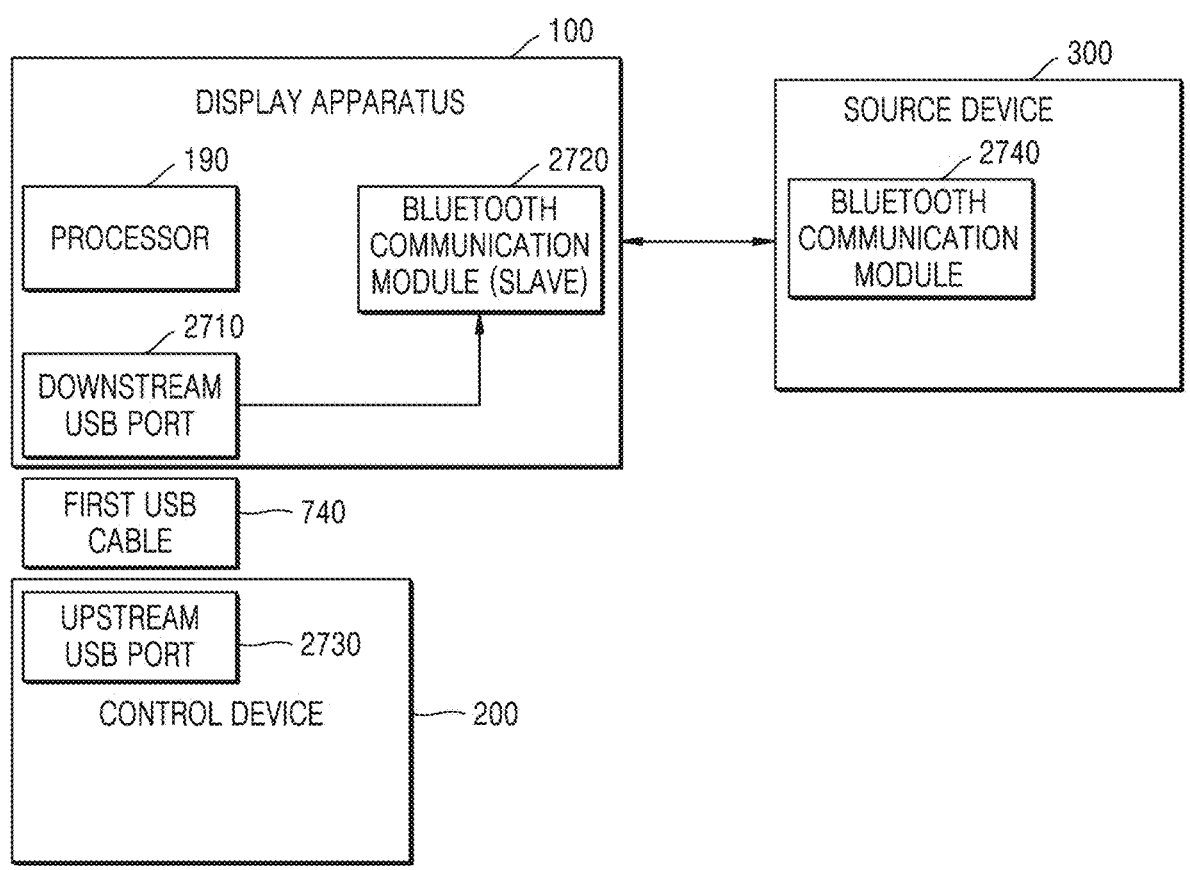
FIG. 27 illustrates an example of a system in which a display apparatus connects to a control device by using a downstream USB port and connects to a source device by using a Bluetooth communication module, according to one or more embodiments of the disclosure.

FIG. 27 illustrates an example of a system in which the display apparatus 100 connects to the control device 200 by using the downstream USB port and connects to the source device 300 by using the Bluetooth communication module, according to one or more embodiments of the disclosure.

Referring to FIG. 27, the display apparatus 100 may connect to the control device 200 by using a downstream USB port 2710. The downstream USB port 2710 of the display apparatus 100 may be connected to an upstream USB port 2730 of the control device 200 by using a first USB cable 740. According to the connection, the display apparatus 100 may recognize the control device 200 as an HID.

The display apparatus 100 may connected to the source device 300 by using a Bluetooth communication module 2720. The Bluetooth communication module 2720 of the display apparatus 100 may be Bluetooth communication-connected to a Bluetooth communication module 2740 of the source device 300. According to the connection, the source device 300 may recognize the display apparatus 100 as an HID.

Figure 28:
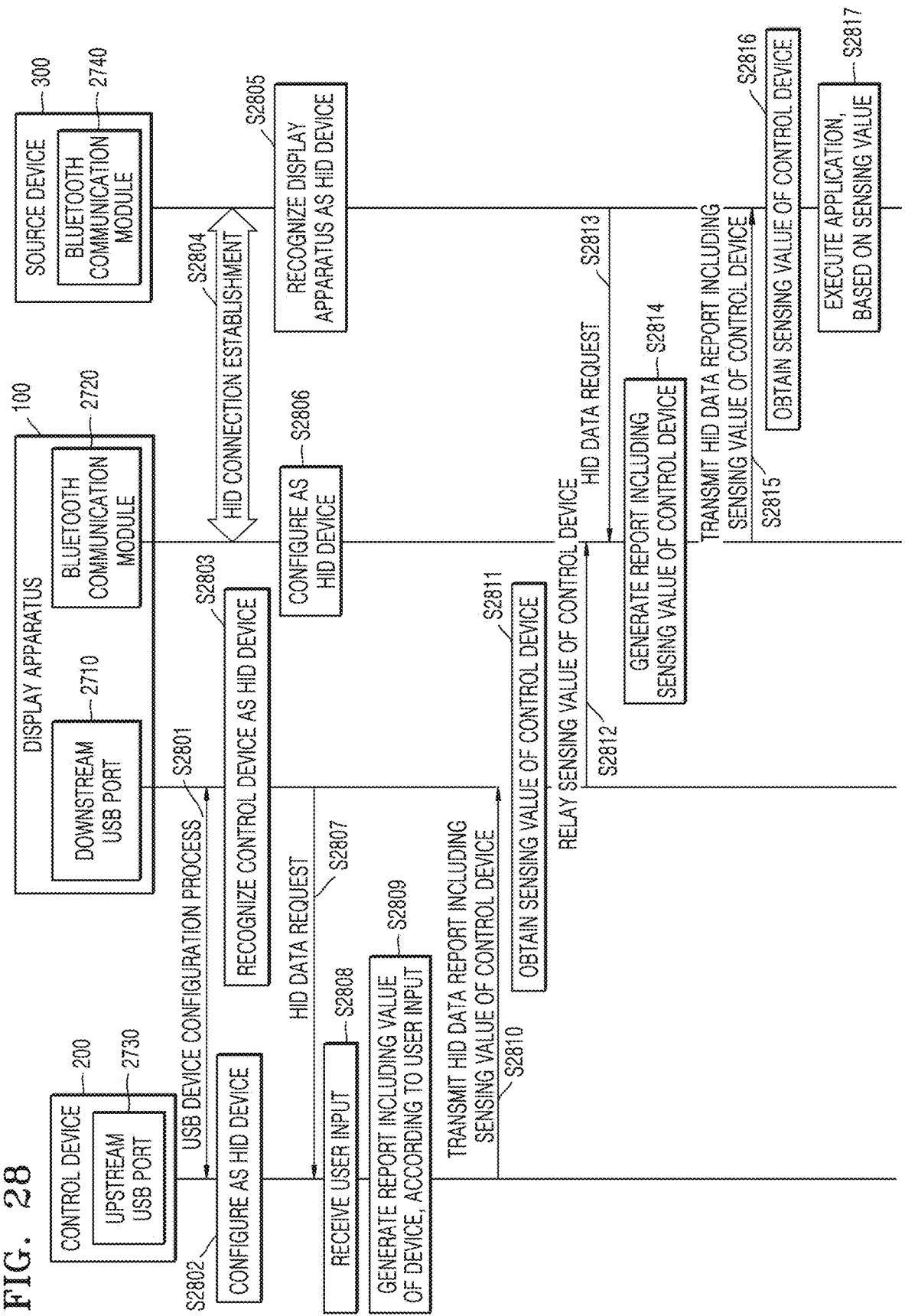
FIG. 28 illustrates an example of an operation in which a display apparatus relays a control signal in a system in which the display apparatus connects to a control device by using a downstream USB port and connects to a source device by using a Bluetooth communication module, according to one or more embodiments of the disclosure.

FIG. 28 illustrates an example of an operation in which the display apparatus 100 relays a control signal in a system in which the display apparatus 100 connects to the control device 200 by using a downstream USB port and connects to the source device 300 by using a Bluetooth communication module, according to one or more embodiments of the disclosure.

In operation S2801, the display apparatus 100 may perform a USB device configuration process on the control device 200 connected to the downstream USB port 2710. An operation in which the display apparatus 100 performs a USB device configuration process on a control device by using a downstream USB port is the same as what is described with reference to FIG. 9, and thus, detailed descriptions thereof are not provided here.

As the USB device configuration process is performed, in operation S2802, the control device 200 may be configured as an HID device, and in operation S1103, the display apparatus 100 may recognize the control device 200 as the HID device.

In operation S2804, the Bluetooth communication module 2720 of the display apparatus 100 and the Bluetooth communication module 2740 of the source device 300 may perform a connection establishment operation according to a Bluetooth HID profile according to a Bluetooth communication procedure. As operation S2804 is the same as what is described with reference to FIG. 16, detailed descriptions thereof are not provided here.

When the Bluetooth communication is connected according to the HID profile in operation S2804, class information and vendor ID (VID) and product ID (PID) of a device that is the display apparatus 100 connected as an HID may be provided to the source device 300. Therefore, in operation S2805 according to Bluetooth communication connection according to the HID profile, the source device 300 may recognize the display apparatus 100 as an HID device. Also, in operation S2806, the display apparatus 100 may be configured as an HID device.

In operation S2806, the display apparatus 100 may transmit an HID data request (HID class report descriptor request) to the control device 200.

In operation S2807, the control device 200 may receive a user input. The control device 200 may receive the user input via the user input interface 230. A user input of the control device 200 implemented as a game pad may include a pressure of button, a position movement at a joystick, or the like.

In operation S2808, the control device 200 may generate an HID data report (HID class report descriptor) including a sensing value (a level of the pressure of button or position information of the joystick) of the control device 200, according to the user input.

In operation S2809, the control device 200 may transmit the HID data report including the sensing value of the control device 200 to the display apparatus 100.

In operation S2810, the downstream USB port 2710 of the display apparatus 100 may obtain the sensing value of the control device 200 from the HID data report.

In operation S2811, the downstream USB port 2710 of the display apparatus 100 may relay the sensing value of the control device 200 to the Bluetooth communication module 2720.

In operation S2812, the Bluetooth communication module 2720 of the display apparatus 100 may receive an HID data request (HID class report descriptor request) from the source device 300.

In operation S2813, the Bluetooth communication module 2720 of the display apparatus 100 may generate an HID data report (HID class report descriptor) by using the sensing value of the control device 200 relayed from the downstream USB port 2710.

In operation S2814, the Bluetooth communication module 2720 of the display apparatus 100 may transmit the HID data report including the sensing value of the control device 200 to the source device 300.

In operation S2815, the source device 300 may obtain the sensing value of the control device 200 from the HID data report received from the display apparatus 100.

In operation S2816, the source device 300 may execute an application, based on the sensing value of the control device 200.

According to one or more embodiments of the disclosure, the display apparatus 100 may use a Wi-Fi communication module as a first communication interface to connect to the control device 200, and may use a Bluetooth communication module as a second communication interface to connect to the source device 300. A tenth example will now be described with reference to FIGS. 29 to 30.

Figure 29:
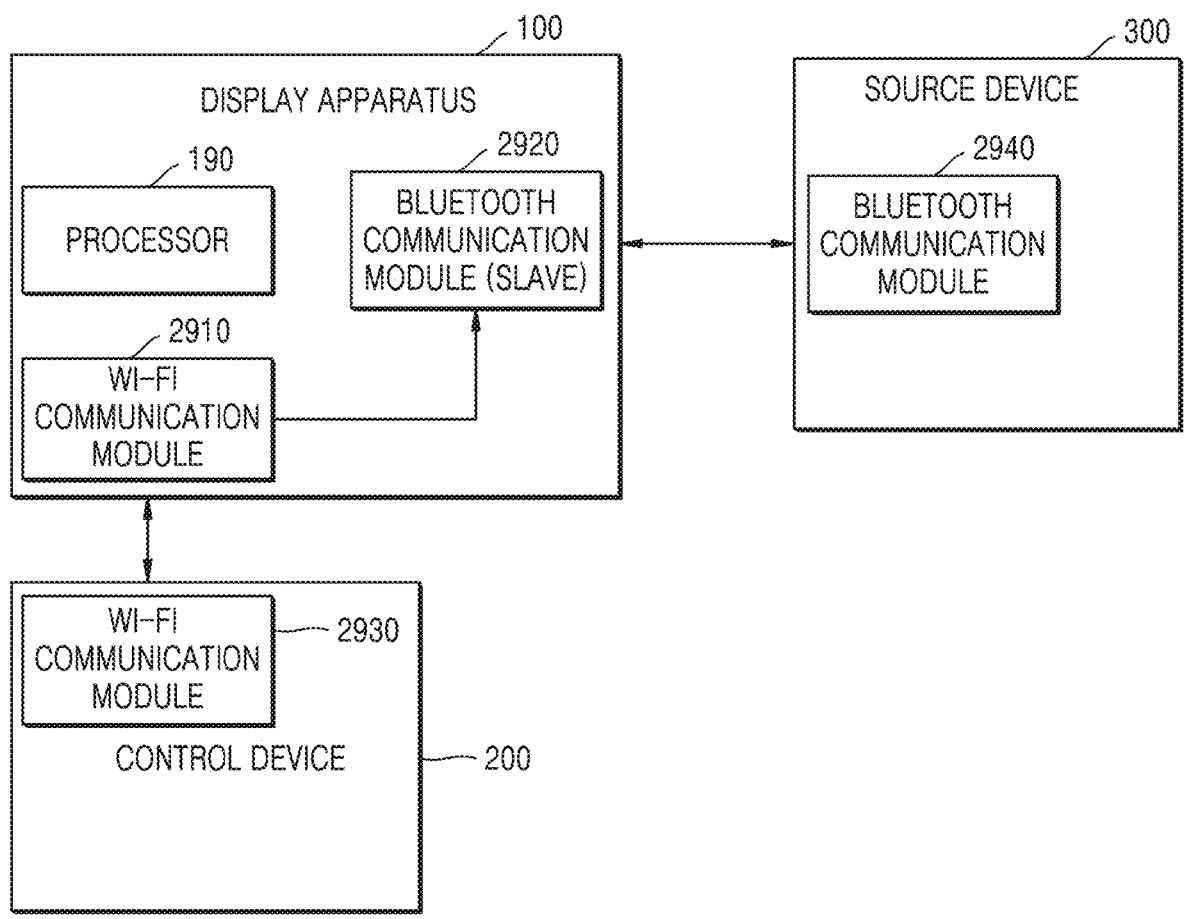
FIG. 29 illustrates an example of a system in which a display apparatus connects to a control device by using a Wi-Fi communication module and connects to a source device by using a Bluetooth communication module, according to one or more embodiments of the disclosure.

FIG. 29 illustrates an example of a system in which the display apparatus 100 connects to the control device 200 by using the Wi-Fi communication module and connects to the source device 300 by using the Bluetooth communication module, according to one or more embodiments of the disclosure.

Referring to FIG. 29, the display apparatus 100 may connect to the control device 200 by using a Wi-Fi communication module 2910. The Wi-Fi communication module 2910 of the display apparatus 100 may be Wi-Fi communication-connected to a Wi-Fi communication module 2930 of the control device 200.

The display apparatus 100 may connect to the source device 300 by using a Bluetooth communication module 2920. The Bluetooth communication module 2920 of the display apparatus 100 may be Bluetooth communication-connected to a Bluetooth communication module 2940 of the source device 300. According to the connection, the display apparatus 100 may be recognized as an HID with respect to the source device 300. The Bluetooth communication module 2920 of the display apparatus 100 may operate in a slave mode, the Bluetooth communication module 2940 of the source device 300 may operate in a master mode. Bluetooth HID devices refer to devices are devices configured to provide a service that provides an input from a human to an application program being executed in a host. For example, the Bluetooth HID devices may include a mouse, a keyboard, a joystick, etc., and a plurality of HIDs may be connected to one host. Due to this reason, in general, the Bluetooth HID devices may be implemented as slaves in a Bluetooth HID protocol.

Figure 30:
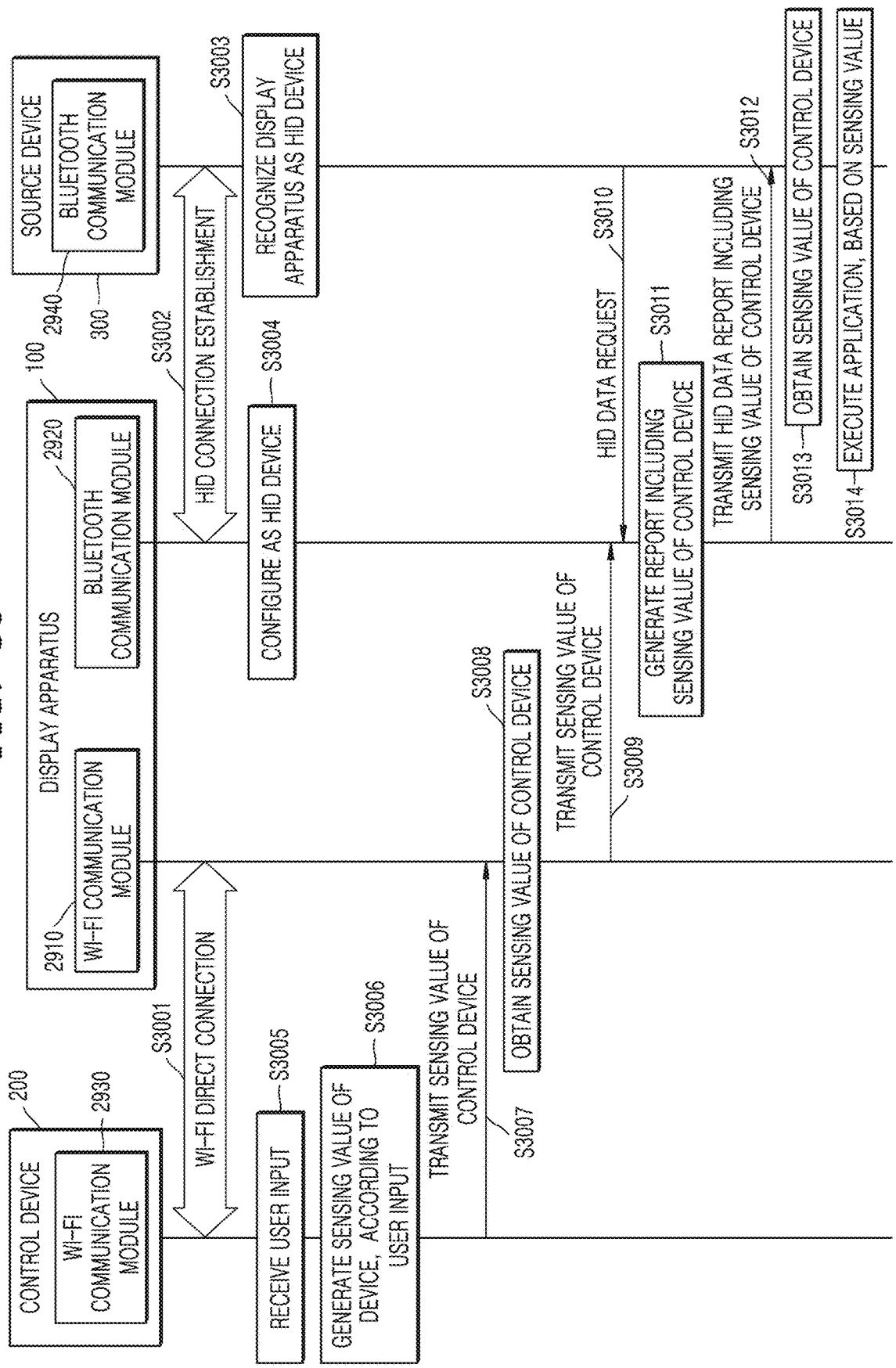
FIG. 30 illustrates an example of an operation in which a display apparatus relays a control signal in a system in which the display apparatus connects to a control device by using a Wi-Fi communication module and connects to a source device by using a Bluetooth communication module, according to one or more embodiments of the disclosure.

FIG. 30 illustrates an example of an operation in which the display apparatus 100 relays a control signal in a system in which the display apparatus 100 connects to the control device 200 by using a Wi-Fi communication module and connects to the source device 300 by using a Bluetooth communication module, according to one or more embodiments of the disclosure.

In operation S3001, the display apparatus 100 may Wi-Fi Direct communication-connect to the control device 200 by using the Wi-Fi communication module 2910.

A P2P device discovery indicates that two P2P devices access a common channel and exchange device information such as a device name and a device type, so that a device discovers a neighboring device and establishes connection. The device discovery may include a scan operation, a find operation, and a group set operation. In the scan operation, the control device 200 and the display apparatus 100 transmit a probe request frame to each other. In the find operation, the control device 200 transmits a probe response frame to the display apparatus 100, in response to the probe request frame transmitted from the display apparatus 100 to the control device 200, so that the display apparatus 100 and the control device 200 find each other. The find operation is used for two P2P devices that simultaneously perform searching are guaranteed to access a common channel and be enabled for communication. A P2P device in the scan operation may find a P2P device in a listen state. In the group set operation, one device may become a P2P group owner and determine whether to form a new P2P group. Through these operations, the display apparatus 100 may Wi-Fi communication-connect to the control device 200.

In operation S3002, the Bluetooth communication module 2920 of the display apparatus 100 and the Bluetooth communication module 2940 of the source device 300 may perform a connection establishment operation according to a Bluetooth HID profile according to a Bluetooth communication procedure. The Bluetooth HID (BT-HID) profile defines a wireless interface for HID devices, and uses a Bluetooth RF interface standard for a communication with a host system.

For example, after the display apparatus 100 as the HID device enters a standby state, the display apparatus 100 may become an inquiry state to discover a neighboring device connectable thereto. The display apparatus 100 in the inquiry state may transmit an inquiry message by using an ID packet one time or at specified regular intervals so as to discover a neighboring device connectable thereto. The Bluetooth communication module 2940 of the source device 300 may become an inquiry scan state to receive an ID packet being transmitted from a neighboring device in an inquiry state. The Bluetooth communication module 2940 of the source device 300 which functions in a master mode may receive the ID packet transmitted from the Bluetooth communication module 2920 of the display apparatus 100, may transmit a FHS for Bluetooth pairing with the display apparatus 100, and when required, e.g., when there is data to be transmitted, may transmit an EIR. When a neighboring device connectable thereto is found via the inquiry procedure, a paging procedure may be performed. The paging procedure indicates a stage in which actual connection is performed by synchronizing a hopping sequence with an address, clock information, etc. When the inquiry procedure and the paging procedure are completed, the display apparatus 100 and the source device 300 may pass a security establishment procedure and then a L2CAP connection and service discovery stage. After passing the L2CAP connection and service discovery stage, the display apparatus 100 may become a state capable of transmitting a control signal to the source device 300.

When the Bluetooth communication is connected according to the HID profile in operation S3002, class information and vendor ID (VID) and product ID (PID) of a device that is the display apparatus 100 connected as an HID may be provided to the source device 300.

Therefore, in operation S3003 according to Bluetooth communication connection according to the HID profile, the source device 300 may recognize the display apparatus 100 as an HID device. Also, in operation S3004, the display apparatus 100 may be configured as an HID device.

In operation S3005, the control device 200 may receive a user input. The control device 200 may receive the user input via the user input interface 230. A user input of the control device 200 implemented as a game pad may include a pressure of button, a position movement at a joystick, or the like.

In operation S3006, the control device 200 may generate a sensing value (a level of the pressure of button or position information of the joystick) of the control device 200, according to the user input.

In operation S3007, the control device 200 may transmit data including the sensing value of the control device 200 to the display apparatus 100 by using Wi-Fi Direct communication.

In operation S3008, the Wi-Fi communication module 2910 of the display apparatus 100 may obtain the sensing value of the control device 200.

In operation S3009, the Wi-Fi communication module 2910 of the display apparatus 100 may transmit the sensing value of the control device 200 to the Bluetooth communication module 2920.

In operation S3010, the Bluetooth communication module 2920 of the display apparatus 100 may receive an HID data request (HID class report descriptor request) from the source device 300.

In operation S3011, the Bluetooth communication module 2920 of the display apparatus 100 may generate an HID data report (HID class report descriptor) by using the sensing value of the control device 200 relayed from the Wi-Fi communication module 2910.

In operation S3012, the Bluetooth communication module 2920 of the display apparatus 100 may transmit the HID data report including the sensing value of the control device 200 to the source device 300.

In operation S3013, the source device 300 may obtain the sensing value of the control device 200 from the HID data report received from the display apparatus 100.

In operation S3014, the source device 300 may execute an application, based on the sensing value of the control device 200.

Figure 31:
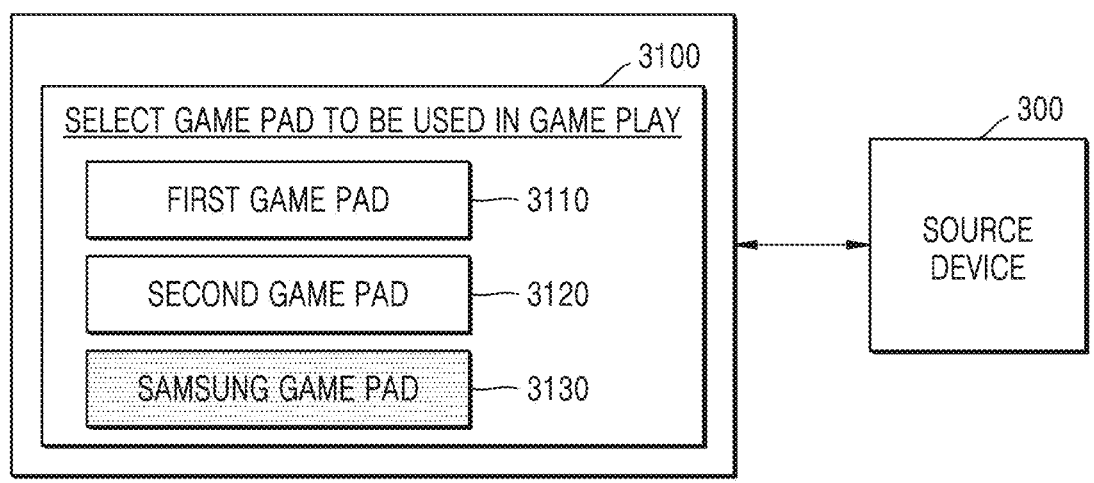
FIG. 31 illustrates an example of a user interface configured to select a control device to be used in control of an application executed in a source device, according to one or more embodiments of the disclosure.

FIG. 31 illustrates an example of a user interface configured to select a control device to be used in control of an application executed in a source device, according to one or more embodiments of the disclosure.

According to one or more embodiments of the disclosure, the display apparatus 100 communication-connected to the source device 300 may receive and display an application execution result screen image obtained by executing the application in the source device 300 and may also receive and display a screen for control device settings used for execution control of the application executed in the source device 300. The display apparatus 100 may be connected via a high-definition multimedia interface (HDMI) so as to receive content from the source device 300.

Referring to FIG. 31, when the source device 300 is a game console, the display apparatus 100 may output a graphical user interface 3100 for selection of a game pad to be used in playing of a game. The graphical user interface 3100 may include an item 3110 indicating first game pad, an item 3120 indicating second game pad, and an item 3130 indicating Samsung game pad. Selection of the item 3110 indicating first game pad may indicate that a first game pad is directly connected to the source device 300 so as to be used in game control, and selection of the item 3120 indicating second game pad may indicate that a second game pad is directly connected to the source device 300 so as to be used in game control. Selection of the item 3130 indicating Samsung game pad may indicate that a Samsung game pad is connected to the display apparatus 100, and a control signal that is received from the game pad and then is relayed via the display apparatus 100 is used in game control by the source device 300.

In a case where the Samsung game pad is used, a graphical user interface configured for a user to select a communication protocol to be used between a control device and a display apparatus, and a communication protocol to be used between the display apparatus and a source device may be provided.

Figure 32:
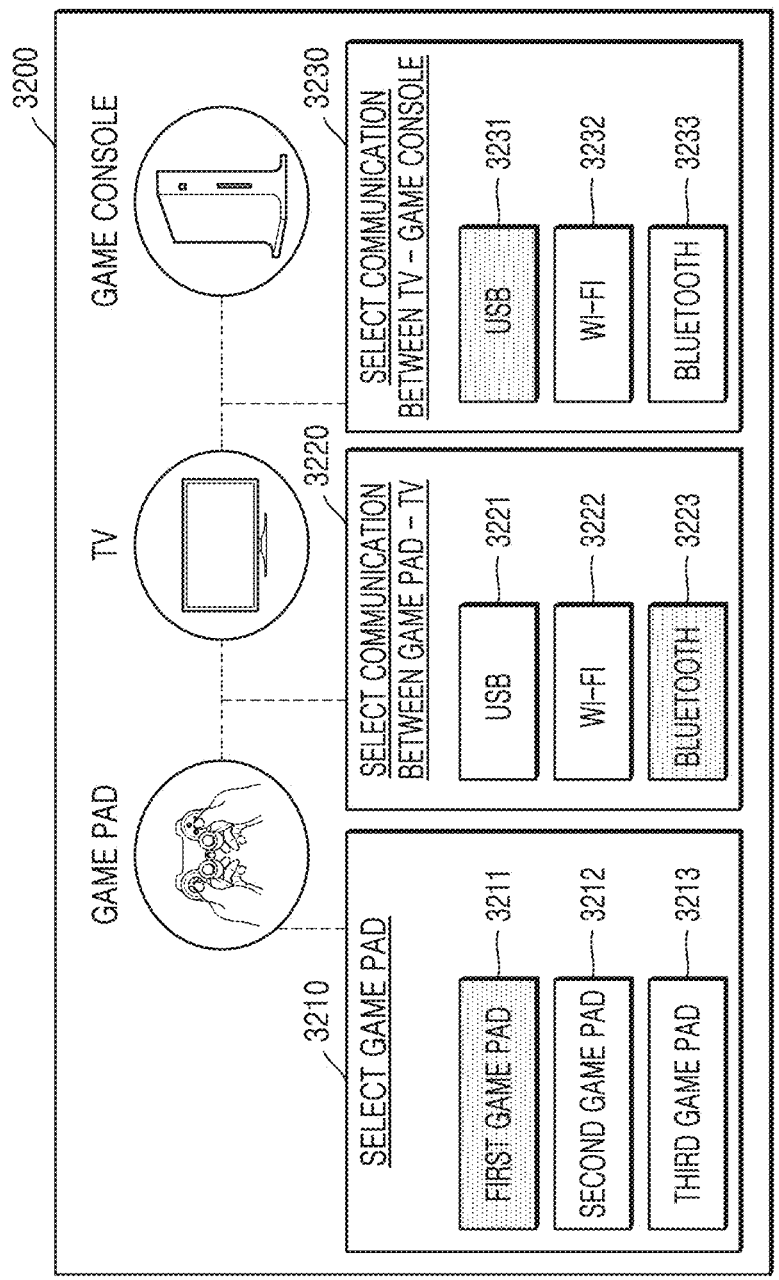
FIG. 32 illustrates an example of a graphical user interface configured for a user to select a communication protocol to be used between a control device and a display apparatus, and a communication protocol to be used between the display apparatus and a source device, according to one or more embodiments of the disclosure.

FIG. 32 illustrates an example of a graphical user interface configured for a user to select a communication protocol to be used between a control device and a display apparatus, and a communication protocol to be used between the display apparatus and a source device, according to one or more embodiments of the disclosure.

Referring to FIG. 32, in a case where the source device 300 is a game console and the control device 200 is a game pad, the display apparatus 100 may provide a graphical user interface 3200 configured for a user to select a communication protocol to be used between a control device and a display apparatus, and a communication protocol to be used between the display apparatus and a source device.

The graphical user interface 3200 may include a menu 3210 for selection of game pad, a menu 3220 for selection of communication protocol between game pad and TV, and a menu 3230 for selection of communication protocol between TV and game console.

The menu 3210 for selection of game pad may include an item 3211 indicating first game pad, an item 3212 indicating second game pad, and an item 3213 indicating third game pad.

The menu 3220 for selection of communication protocol between game pad and TV may include an item 3221 indicating USB communication, an item 3222 indicating Wi-Fi communication, and an item 3223 indicating Bluetooth communication.

The menu 3230 for selection of communication protocol between TV and game console may include an item 3231 indicating USB communication, an item 3232 indicating Wi-Fi communication, and an item 3233 indicating Bluetooth communication.

For example, in a case where an input of selecting the item 3211 indicating first game pad as the game pad, selecting the item 3223 indicating Bluetooth communication as a communication protocol between the game pad and a TV, and selecting the item 3231 indicating USB communication as a communication protocol between the TV and the game console is received, the display apparatus 100 may perform, as described above in the sixth example or the seventh example, an operation of connecting to the first game pad by using a Bluetooth communication module as a first communication interface and connecting to the game console by using a USB port as a second communication interface.

Some embodiments of the disclosure may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include a computer storage medium. The computer storage medium includes all volatile and non-volatile media, and detachable and non-detachable media which are technically implemented to store information including computer-readable instructions, data structures, program modules or other data.

The embodiments of the disclosure may be implemented in a software (S/W) program including instructions stored in a computer-readable storage medium.

The computer is a device capable of calling the stored instructions from the storage medium and operating according to the embodiments of the disclosure in accordance with the called instructions, and may include an electronic device according to the embodiments.

The computer-readable storage medium may be provided in the form of a non-transitory storage medium. Here, the term 'non-transitory' means that the storage medium is tangible and does not refer to a transitory electrical signal, but does not distinguish that data is stored semi-permanently or temporarily on the storage medium.

Furthermore, a control method according to the embodiments of the disclosure may be provided in a computer program product. The computer program product may be traded between a seller and a purchaser as a commodity.

The computer program product may include an S/W program and a computer-readable storage medium having stored therein the S/W program. For example, the computer program product may include a product (e.g. a downloadable application) in an S/W program distributed electronically through a manufacturer of an electronic device or an electronic market (e.g., Google Play Store and App Store). For electronic distribution, at least a part of the S/W program may be stored on the storage medium or may be generated temporarily. In this case, the storage medium may be a storage medium of a server of the manufacturer, a server of the electronic market, or a relay server for temporarily storing the S/W program.

The computer program product may include a storage medium of a server or a storage medium of an electronic device, in a system including the server and the electronic device. Alternatively, when there is a third device (e.g., a smartphone) that communicates with the server or the electronic device, the computer program product may include a storage medium of the third device. Alternatively, the computer program product may include an S/W program that is transmitted from the server to the electronic device or the third device or from the third device to the electronic device.

In this case, one of the server, the electronic device, and the third device may perform the method according to the embodiments of the disclosure by executing the computer program product. Alternatively, at least two of the server, the electronic device, and the third device may divide and perform the method according to the embodiments of the disclosure by executing the computer program product.

For example, the server (e.g., a cloud server, an AI server, or the like) may execute the computer program product stored in the server, thereby controlling the electronic device to perform the method according to the embodiments of the disclosure, the electronic device communicating with the server.

As another example, the third device may execute the computer program product, thereby controlling the electronic device to perform the method according to the embodiments of the disclosure, the electronic device communicating with the third device. When the third device executes the computer program product, the third device may download the computer program product from the server, and may execute the downloaded computer program product. Alternatively, the third device may perform the method according to the embodiments of the disclosure by executing a pre-loaded computer program product.

Throughout the specification, the term "unit" may indicate a hardware component such as a processor or a circuit, and/or may indicate a software component that is executed by a hardware configuration such as a processor.

While the disclosure has been particularly shown and described with reference to the accompanying drawings, in which embodiments of the disclosure are shown, it is obvious to one of ordinary skill in the art that the disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

While certain embodiments of the disclosure has been particularly shown and described, it will be understood that various changes in form and details may be made therein without departing from the spirit and scope of the following claims.

What is claimed is:

1. A display apparatus comprising:
   a communication interface comprising a first communication interface and a second communication interface;
   at least one memory storing at least one instruction; and
   at least one processor configured to execute the at least one instruction to cause the display apparatus to:
   control the first communication interface to connect, according to a wired or wireless communication technology, the display apparatus to a control device for providing a control signal;
   control the second communication interface to connect the display apparatus to a source device, according to a wired or wireless communication technology;
   control the first communication interface to receive the control signal from the control device;
   identify that the control device is connected to a downstream universal serial bus (USB) port of the display apparatus;
   based on the source device being connected to an upstream USB port of the display apparatus, whereby the source device is set as an input source currently providing content to the display apparatus, control the control signal which is received via the downstream USB port to be bypassed to the upstream USB port so as to be transmitted to the source device; and based on the source device not being connected to the upstream USB port of the display apparatus, whereby the source device is not set as the input source currently providing content to the display apparatus, control the display apparatus using the control signal.

2. The display apparatus of claim 1, wherein the at least one processor is further configured to execute the at least one instruction to cause the display apparatus to:

identify whether the control signal corresponds to a specified button of the control device;

based on the control signal being identified to correspond to the specified button, control the control signal not to be relayed to the source device but to be used by the display apparatus; and based on the control signal being identified not to correspond to the specified button, control the control signal to be relayed to the source device.

3. The display apparatus of claim 2, wherein the specified button indicates to output a specified graphical user interface to a display, and the specified graphical user interface comprises an on screen display (OSD) or a home screen.

4. The display apparatus of claim 3, wherein the at least one processor is further configured to execute the at least one instruction to cause the display apparatus to:

identify whether the specified graphical user interface is displayed on the display;

based on the specified graphical user interface being displayed on the display, control the control signal not to be relayed to the source device but to be used by the display apparatus; and based on the specified graphical user interface being not displayed, control the control signal to be relayed to the source device.

5. A method of operating a display apparatus comprising a communication interface comprising a first communication interface and a second communication interface, the method comprising:

controlling the first communication interface to connect, according to a wired or wireless communication technology, the display apparatus to a control device for providing a control signal;

controlling the second communication interface to connect the display apparatus to a source device, according to a wired or wireless communication technology;

controlling the first communication interface to receive the control signal from the control device;

identifying that the control device is connected to a downstream universal serial bus (USB) port of the display apparatus;

based on the source device being connected to an upstream USB port of the display apparatus, whereby the source device is set as an input source currently providing content to the display apparatus, controlling the control signal which is received via the downstream USB port to be bypassed to the upstream USB port so as to be transmitted to the source device; and based on the source device not being connected to the upstream USB port of the display apparatus, whereby the source device is not set as the input source currently providing content to the display apparatus, controlling the display apparatus using the control signal.

6. The method of claim 5, further comprising:

identifying whether the control signal corresponds to a specified button of the control device;

based on the control signal being identified to correspond to the specified button, control the control signal not to be relayed to the source device but to be used by the display apparatus; and based on the control signal being identified not to correspond to the specified button, controlling the control signal to be relayed to the source device.

7. The method of claim 6, wherein the specified button indicates to output a specified graphical user interface to a display, and the specified graphical user interface comprises an on screen display (OSD) or a home screen.

8. The method of claim 7, further comprising:

identifying whether the specified graphical user interface is displayed on the display;

based on the specified graphical user interface being displayed on the display, control the control signal not to be relayed to the source device but to be used by the display apparatus; and based on the specified graphical user interface being not displayed, controlling the control signal to be relayed to the source device.

9. A non-transitory computer-readable recording medium having recorded thereon at least one instruction executable by at least one processor of a display apparatus to cause the display apparatus comprising a first communication interface and a second communication interface to:

control the first communication interface to connect, according to a wired or wireless communication technology, the display apparatus to a control device for providing a control signal;

control the second communication interface to connect the display apparatus to a source device, according to a wired or wireless communication technology;

control the first communication interface to receive the control signal from the control device;

identify that the control device is connected to a downstream universal serial bus (USB) port of the display apparatus;

based on the source device being connected to an upstream USB port of the display apparatus, whereby the source device is set as an input source currently providing content to the display apparatus, control the control signal which is received via the downstream USB port to be bypassed to the upstream USB port so as to be transmitted to the source device; and based on the source device not being connected to the upstream USB port of the display apparatus, whereby the source device is not set as the input source currently providing content to the display apparatus, control the display apparatus using the control signal.

* * * * *